(12) United States Patent
Faccin et al.

(10) Patent No.: US 12,462,699 B2
(45) Date of Patent: Nov. 4, 2025

(54) MECHANISM FOR UNMANNED VEHICLE AUTHORIZATION FOR OPERATION OVER CELLULAR NETWORKS

(71) Applicant: QUALCOMM INCORPORATED, San Diego, CA (US)

(72) Inventors: Stefano Faccin, San Ysidro, CA (US); Haris Zisimopoulos, London (GB); Hong Cheng, Basking Ridge, NJ (US)

(73) Assignee: Qualcomm Incorporated, San Diego, CA (US)

( * ) Notice: Subject to any disclaimer, the term of this patent is extended or adjusted under 35 U.S.C. 154(b) by 432 days.

(21) Appl. No.: 17/759,500

(22) PCT Filed: Feb. 23, 2021

(86) PCT No.: PCT/US2021/019282
§ 371 (c)(1),
(2) Date: Jul. 26, 2022

(87) PCT Pub. No.: WO2021/173583
PCT Pub. Date: Sep. 2, 2021

(65) Prior Publication Data
US 2023/0102300 A1    Mar. 30, 2023

(30) Foreign Application Priority Data
Feb. 24, 2020 (GR) .................. 20200100097

(51) Int. Cl.
*G08G 5/72* (2025.01)
*G08G 5/26* (2025.01)
(Continued)

(52) U.S. Cl.
CPC .............. *G08G 5/723* (2025.01); *G08G 5/26* (2025.01); *G08G 5/55* (2025.01); *G08G 5/56* (2025.01);
(Continued)

(58) Field of Classification Search
CPC ... H04W 76/10; H04W 12/108; H04W 12/06; H04W 60/00; G08G 5/0078; G08G 5/0013; G08G 5/0043; G08G 5/0069
(Continued)

(56) References Cited

U.S. PATENT DOCUMENTS

| 9,717,004 B2 | 7/2017 | Lee et al. |
| 9,906,992 B1 * | 2/2018 | Youtz ............... H04W 36/0033 |

(Continued)

FOREIGN PATENT DOCUMENTS

| CN | 109757129 A | 5/2019 |
| CN | 110663074 A | 1/2020 |

(Continued)

OTHER PUBLICATIONS

Anonymous: "International Mobile Station Equipment Identity—Wikipedia, The Free Encyclopedia", Nov. 28, 2012, XP055286133, pp. 1-7.
International Search Report and Written Opinion—PCT/US2021/019282—ISA/EPO—May 10, 2021.

Primary Examiner — Joel Ajayi
(74) Attorney, Agent, or Firm — Holland & Hart LLP

(57) ABSTRACT

Methods, systems, and devices for wireless communications are described. A wireless network may receive a message from a wireless device that is coupled with an aerial vehicle. The message may include a network identifier, an aerial identifier, and operational information for the aerial vehicle. The wireless network may send a message to an aerial function management system requesting that the aerial function management system authenticate an identity of the aerial vehicle. The wireless network may also request that the aerial function management system approve a flight path for the aerial vehicle. The wireless network may establish a data session with the wireless device based on an authentication of the aerial vehicle and an approval of the flight path.

51 Claims, 22 Drawing Sheets

(51) Int. Cl.
*G08G 5/55* (2025.01)
*G08G 5/56* (2025.01)
*G08G 5/57* (2025.01)
*H04W 12/06* (2021.01)
*H04W 12/108* (2021.01)
*H04W 60/00* (2009.01)
*H04W 76/10* (2018.01)

(52) U.S. Cl.
CPC ............. *G08G 5/57* (2025.01); *H04W 12/06* (2013.01); *H04W 12/108* (2021.01); *H04W 60/00* (2013.01); *H04W 76/10* (2018.02)

(58) Field of Classification Search
USPC ....................................... 455/435.1
See application file for complete search history.

(56) References Cited

U.S. PATENT DOCUMENTS

| | | |
|---|---|---|
| 10,142,432 B2 | 11/2018 | Vasanthasenan et al. |
| 2019/0289613 A1* | 9/2019 | Fanelli ................... H04W 4/40 |

FOREIGN PATENT DOCUMENTS

| | | |
|---|---|---|
| EP | 3671694 A1 | 6/2020 |
| WO | WO-2016148902 | 9/2016 |
| WO | WO-2018147918 | 8/2018 |
| WO | WO-2020033905 A1 | 2/2020 |

* cited by examiner

MECHANISM FOR UNMANNED VEHICLE AUTHORIZATION FOR OPERATION OVER CELLULAR NETWORKS

CROSS REFERENCE

The present Application is a 371 national stage filing of International PCT Application No. PCT/US2021/019282 by FACCIN et al. entitled "A MECHANISM FOR UNMANNED VEHICLE AUTHORIZATION FOR OPERATION OVER CELLULAR NETWORKS," filed Feb. 23, 2021; and claims priority to Greece Provisional Patent Application No. 20200100097 by FACCIN et al., entitled "A MECHANISM FOR UNMANNED VEHICLE AUTHORIZATION FOR OPERATION OVER CELLULAR NETWORKS," filed Feb. 24, 2020, each of which is assigned to the assignee hereof, and each of which is expressly incorporated by reference herein.

FIELD OF TECHNOLOGY

The following relates generally to wireless communications and more specifically to authorizing unmanned vehicles for operation in a network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may include, or be coupled with, an unmanned aerial vehicle (UAV). A wireless communications system may provide services that support aerial operations of the UAV via the connection between the UE and the wireless communication system. However, challenges are present in supporting aerial operations for UAVs using wireless communication systems.

SUMMARY

The described techniques relate to improved methods, systems, devices, and apparatuses that support authorizing unmanned vehicles for operation in a network. Operations for authenticating an unmanned aerial vehicle (UAV) and authorizing flight operations for the UAV (which may be referred to as a UAV service supplier (USS) authentication and authorization (USAA) procedure) may be coupled with a procedure for accessing a wireless network. In some examples, the USAA operations may be coupled with a registration procedure for registering with a wireless network. In some examples, the USAA operations may be coupled with a data session establishment procedure for establishing a data connection using a wireless network. In some examples, the USAA operations may be split between the registration procedure and the data session establishment procedure. In some examples, the USAA operations may be coupled with an attachment procedure for registering with and establishing a data session with a wireless network.

A method of wireless communications at a network is described. The method may include receiving a message from a wireless device that is coupled with an aerial vehicle, the message including a network identifier for the wireless device, an aerial identifier for the aerial vehicle, and operational information for the aerial vehicle, establishing a control plane connection with the wireless device based on the network identifier, sending, in a control plane, a request to an aerial function management system for verification of the aerial vehicle based on the aerial identifier, where the request includes the aerial identifier and the operational information, receiving, in the control plane, a response from the aerial function management system including an approval of a flight path for the aerial vehicle, and establishing a data session for the wireless device based on the approval of the flight path.

An apparatus for wireless communications at a network is described. The apparatus may include a processor, memory coupled with the processor, and instructions stored in the memory. The instructions may be executable by the processor to cause the apparatus to receive a message from a wireless device that is coupled with an aerial vehicle, the message including a network identifier for the wireless device, an aerial identifier for the aerial vehicle, and operational information for the aerial vehicle, establish a control plane connection with the wireless device based on the network identifier, send, in a control plane, a request to an aerial function management system for verification of the aerial vehicle based on the aerial identifier, where the request includes the aerial identifier and the operational information, receive, in the control plane, a response from the aerial function management system including an approval of a flight path for the aerial vehicle, and establish a data session for the wireless device based on the approval of the flight path.

Another apparatus for wireless communications at a network is described. The apparatus may include means for receiving a message from a wireless device that is coupled with an aerial vehicle, the message including a network identifier for the wireless device, an aerial identifier for the aerial vehicle, and operational information for the aerial vehicle, establishing a control plane connection with the wireless device based on the network identifier, sending, in a control plane, a request to an aerial function management system for verification of the aerial vehicle based on the aerial identifier, where the request includes the aerial identifier and the operational information, receiving, in the control plane, a response from the aerial function management system including an approval of a flight path for the aerial vehicle, and establishing a data session for the wireless device based on the approval of the flight path.

A non-transitory computer-readable medium storing code for wireless communications at a network is described. The code may include instructions executable by a processor to receive a message from a wireless device that is coupled with an aerial vehicle, the message including a network identifier for the wireless device, an aerial identifier for the aerial vehicle, and operational information for the aerial vehicle, establish a control plane connection with the wireless device based on the network identifier, send, in a control plane, a request to an aerial function management system for verification of the aerial vehicle based on the aerial identifier, where the request includes the aerial identifier and the operational information, receive, in the control plane, a response from the aerial function management system including an approval of a flight path for the aerial vehicle, and establish a data session for the wireless device based on the approval of the flight path.

Some examples of the method, apparatuses, and non-transitory computer-readable medium described herein may further include operations, features, means, or instructions for determining an identity of the aerial function management system based on the aerial identifier.

Some examples of the method, apparatuses, and non-transitory computer-readable medium described herein may further include operations, features, means, or instructions for matching the aerial identifier with an entry in a list of aerial identifiers based on receiving the message, and initiating a procedure for the verification of the aerial vehicle based on the matching.

Some examples of the method, apparatuses, and non-transitory computer-readable medium described herein may further include operations, features, means, or instructions for verifying that the wireless device may have a subscription with the network based on the message, determining that the wireless device may be coupled with the aerial vehicle based on the subscription, and determining, based on the aerial identifier, a procedure for the verification of the aerial vehicle may be performed before the data session may be established for the wireless device.

Some examples of the method, apparatuses, and non-transitory computer-readable medium described herein may further include operations, features, means, or instructions for transmitting a second message to the wireless device, the second message indicating that the procedure for the verification of the aerial vehicle may be performed before the data session may be established and being configured to accept the registration for the wireless device, where the control plane connection may be established based on transmitting the second message.

Some examples of the method, apparatuses, and non-transitory computer-readable medium described herein may further include operations, features, means, or instructions for assigning a state to the wireless device in the control plane based on the aerial identifier, where user plane data that addresses the wireless device may be blocked while the state may be assigned to the wireless device, and removing the state upon establishing the data session.

In some examples of the method, apparatuses, and non-transitory computer-readable medium described herein, the operational information includes an identity of an operator, a characteristic of the aerial vehicle, an indication of a controller for the aerial vehicle, the flight path, or any combination thereof.

Some examples of the method, apparatuses, and non-transitory computer-readable medium described herein may further include operations, features, means, or instructions for transmitting a second message to the wireless device based on establishing the control plane connection, the second message configured to request information for the verification of the aerial vehicle, and receiving the aerial identifier for the aerial vehicle and the operational information for the aerial vehicle based on the second message.

Some examples of the method, apparatuses, and non-transitory computer-readable medium described herein may further include operations, features, means, or instructions for receiving a second response from the aerial function management system based on sending the request, the second response indicating a positive authentication of the aerial vehicle and being received before the response, and transmitting a second message to the wireless device, the second message configured to indicate the positive authentication of the aerial vehicle to the wireless device based on receiving the second response.

Some examples of the method, apparatuses, and non-transitory computer-readable medium described herein may further include operations, features, means, or instructions for receiving a third message from the wireless device based on transmitting the second message, the third message configured to request an establishment of the data session.

Some examples of the method, apparatuses, and non-transitory computer-readable medium described herein may further include operations, features, means, or instructions for sending a second request to the aerial function management system for authorization of the flight path based on the second message, where the response indicating the approval of the flight path may be received based on sending the second request.

In some examples of the method, apparatuses, and non-transitory computer-readable medium described herein, the second message includes the aerial identifier for the aerial vehicle, the operational information for the aerial vehicle, or both.

Some examples of the method, apparatuses, and non-transitory computer-readable medium described herein may further include operations, features, means, or instructions for generating a traffic filter for communications with the wireless device based on receiving the response indicating the approval of the flight path, where an exclusive communication path between the wireless device and a controller for the aerial vehicle may be established based on the traffic filter.

Some examples of the method, apparatuses, and non-transitory computer-readable medium described herein may further include operations, features, means, or instructions for receiving, in a data plane, a command for the aerial vehicle from a controller for the aerial vehicle based on establishing the data session, and transmitting, in the data plane, the command to the aerial vehicle.

A method of wireless communications at an aerial function management system is described. The method may include receiving, from a network, a request for a verification of an aerial vehicle that is coupled with a wireless device, the request including an aerial identifier for the aerial vehicle and operational information for the aerial vehicle, verifying an identity of the aerial vehicle based on the aerial identifier and the operational information, sending, to the network, a first response including a positive authentication of the aerial vehicle, where a procedure for establishing a data session is initiated between the network and the wireless device based on the first response, receiving, from the network, a second request for authorization of a flight path for the aerial vehicle based on sending the first response, and sending, to the network, a second response including an approval of the flight path based on the second request.

An apparatus for wireless communications at an aerial function management system is described. The apparatus may include a processor, memory coupled with the processor, and instructions stored in the memory. The instructions may be executable by the processor to cause the apparatus to receive, from a network, a request for a verification of an aerial vehicle that is coupled with a wireless device, the request including an aerial identifier for the aerial vehicle and operational information for the aerial vehicle, verify an identity of the aerial vehicle based on the aerial identifier and the operational information, send, to the network, a first response including a positive authentication of the aerial vehicle, where a procedure for establishing a data session is initiated between the network and the wireless device based on the first response, receive, from the network, a second request for authorization of a flight path for the aerial vehicle based on sending the first response, and send, to the network, a second response including an approval of the flight path based on the second request.

Another apparatus for wireless communications at an aerial function management system is described. The apparatus may include means for receiving, from a network, a request for a verification of an aerial vehicle that is coupled with a wireless device, the request including an aerial identifier for the aerial vehicle and operational information for the aerial vehicle, verifying an identity of the aerial vehicle based on the aerial identifier and the operational information, sending, to the network, a first response including a positive authentication of the aerial vehicle, where a procedure for establishing a data session is initiated between the network and the wireless device based on the first response, receiving, from the network, a second request for authorization of a flight path for the aerial vehicle based on sending the first response, and sending, to the network, a second response including an approval of the flight path based on the second request.

A non-transitory computer-readable medium storing code for wireless communications at an aerial function management system is described. The code may include instructions executable by a processor to receive, from a network, a request for a verification of an aerial vehicle that is coupled with a wireless device, the request including an aerial identifier for the aerial vehicle and operational information for the aerial vehicle, verify an identity of the aerial vehicle based on the aerial identifier and the operational information, send, to the network, a first response including a positive authentication of the aerial vehicle, where a procedure for establishing a data session is initiated between the network and the wireless device based on the first response, receive, from the network, a second request for authorization of a flight path for the aerial vehicle based on sending the first response, and send, to the network, a second response including an approval of the flight path based on the second request.

Some examples of the method, apparatuses, and non-transitory computer-readable medium described herein may further include operations, features, means, or instructions for verifying an authenticity of the request for the verification of the aerial vehicle.

In some examples of the method, apparatuses, and non-transitory computer-readable medium described herein, the request includes a first set of credentials for the aerial vehicle, and where the authenticity of the request may be verified based on the first set of credentials.

Some examples of the method, apparatuses, and non-transitory computer-readable medium described herein may further include operations, features, means, or instructions for identifying second operational information for the aerial vehicle and a second aerial identifier that may be stored at the aerial function management system based on receiving the request for the verification of the aerial vehicle.

In some examples of the method, apparatuses, and non-transitory computer-readable medium described herein, verifying the identity of the aerial vehicle may include operations, features, means, or instructions for comparing the operational information with the second operational information and the aerial identifier with the second aerial identifier, where the identity of the aerial vehicle may be authenticated based on the operational information matching with the second operational information and the aerial identifier matching with the second aerial identifier.

In some examples of the method, apparatuses, and non-transitory computer-readable medium described herein, verifying the identity of the aerial vehicle may include operations, features, means, or instructions for sending the aerial identifier and the operational information to a flight control system, and receiving a third response from the flight control system, the third response including the positive authentication of the aerial vehicle and being received before sending the first response.

A method of wireless communications at a wireless device that is coupled with an aerial vehicle is described. The method may include transmitting a first message to a network, the first message including a network identifier for the wireless device, an aerial identifier for the aerial vehicle, and operational information for the aerial vehicle, establishing a control plane connection with the network based on the network identifier, where a request is sent to an aerial function management system for verification of the aerial vehicle based on the aerial identifier, receiving, in a control plane, a second message from the network that indicates an approval of a flight path for the aerial vehicle, the second message configured to trigger an establishment of a data session between the wireless device and the network, and establishing the data session with the network based on the second message.

An apparatus for wireless communications at a wireless device that is coupled with an aerial vehicle is described. The apparatus may include a processor, memory coupled with the processor, and instructions stored in the memory. The instructions may be executable by the processor to cause the apparatus to transmit a first message to a network, the first message including a network identifier for the wireless device, an aerial identifier for the aerial vehicle, and operational information for the aerial vehicle, establish a control plane connection with the network based on the network identifier, where a request is sent to an aerial function management system for verification of the aerial vehicle based on the aerial identifier, receive, in a control plane, a second message from the network that indicates an approval of a flight path for the aerial vehicle, the second message configured to trigger an establishment of a data session between the wireless device and the network, and establish the data session with the network based on the second message.

Another apparatus for wireless communications at a wireless device that is coupled with an aerial vehicle is described. The apparatus may include means for transmitting a first message to a network, the first message including a network identifier for the wireless device, an aerial identifier for the aerial vehicle, and operational information for the aerial vehicle, establishing a control plane connection with the network based on the network identifier, where a request is sent to an aerial function management system for verification of the aerial vehicle based on the aerial identifier, receiving, in a control plane, a second message from the network that indicates an approval of a flight path for the aerial vehicle, the second message configured to trigger an establishment of a data session between the wireless device and the network, and establishing the data session with the network based on the second message.

A non-transitory computer-readable medium storing code for wireless communications at a wireless device that is coupled with an aerial vehicle is described. The code may include instructions executable by a processor to transmit a first message to a network, the first message including a network identifier for the wireless device, an aerial identifier for the aerial vehicle, and operational information for the aerial vehicle, establish a control plane connection with the network based on the network identifier, where a request is sent to an aerial function management system for verification of the aerial vehicle based on the aerial identifier, receive, in a control plane, a second message from the network that indicates an approval of a flight path for the aerial vehicle, the second message configured to trigger an establishment of a data session between the wireless device and the network, and establish the data session with the network based on the second message.

Some examples of the method, apparatuses, and non-transitory computer-readable medium described herein may further include operations, features, means, or instructions for receiving, in the control plane, a third message from the network based on the request sent to the aerial function management system, the third message indicating a positive authentication of the aerial vehicle and being received before the second message, and transmitting, in the control plane, a fourth message to the network based on receiving the third message, the fourth message configured to request the establishment of the data session and being transmitted before the second message.

A method of wireless communications at a network is described. The method may include receiving a message from a wireless device that is coupled with an aerial vehicle, the message including a network identifier for the wireless device, an aerial identifier for the aerial vehicle, and operational information for the aerial vehicle, where the message is configured to establish a control plane connection and a data session with the network, determining that the wireless device is coupled with the aerial vehicle based on the network identifier being associated with an aerial subscription, sending a request to an aerial function management system for verification of the aerial vehicle based on the determining, where the request includes the aerial identifier and the operational information, receiving a response from the aerial function management system including a positive authentication of the aerial vehicle and an approval of a flight path for the aerial vehicle, and establishing the data session for the wireless device based on the positive authentication of the aerial vehicle and the approval of the flight path.

An apparatus for wireless communications at a network is described. The apparatus may include a processor, memory coupled with the processor, and instructions stored in the memory. The instructions may be executable by the processor to cause the apparatus to receive a message from a wireless device that is coupled with an aerial vehicle, the message including a network identifier for the wireless device, an aerial identifier for the aerial vehicle, and operational information for the aerial vehicle, where the message is configured to establish a control plane connection and a data session with the network, determine that the wireless device is coupled with the aerial vehicle based on the network identifier being associated with an aerial subscription, send a request to an aerial function management system for verification of the aerial vehicle based on the determining, where the request includes the aerial identifier and the operational information, receive a response from the aerial function management system including a positive authentication of the aerial vehicle and an approval of a flight path for the aerial vehicle, and establish the data session for the wireless device based on the positive authentication of the aerial vehicle and the approval of the flight path.

Another apparatus for wireless communications at a network is described. The apparatus may include means for receiving a message from a wireless device that is coupled with an aerial vehicle, the message including a network identifier for the wireless device, an aerial identifier for the aerial vehicle, and operational information for the aerial vehicle, where the message is configured to establish a control plane connection and a data session with the network, determining that the wireless device is coupled with the aerial vehicle based on the network identifier being associated with an aerial subscription, sending a request to an aerial function management system for verification of the aerial vehicle based on the determining, where the request includes the aerial identifier and the operational information, receiving a response from the aerial function management system including a positive authentication of the aerial vehicle and an approval of a flight path for the aerial vehicle, and establishing the data session for the wireless device based on the positive authentication of the aerial vehicle and the approval of the flight path.

A non-transitory computer-readable medium storing code for wireless communications at a network is described. The code may include instructions executable by a processor to receive a message from a wireless device that is coupled with an aerial vehicle, the message including a network identifier for the wireless device, an aerial identifier for the aerial vehicle, and operational information for the aerial vehicle, where the message is configured to establish a control plane connection and a data session with the network, determine that the wireless device is coupled with the aerial vehicle based on the network identifier being associated with an aerial subscription, send a request to an aerial function management system for verification of the aerial vehicle based on the determining, where the request includes the aerial identifier and the operational information, receive a response from the aerial function management system including a positive authentication of the aerial vehicle and an approval of a flight path for the aerial vehicle, and establish the data session for the wireless device based on the positive authentication of the aerial vehicle and the approval of the flight path.

Some examples of the method, apparatuses, and non-transitory computer-readable medium described herein may further include operations, features, means, or instructions for identifying the aerial function management system based on the aerial identifier.

Some examples of the method, apparatuses, and non-transitory computer-readable medium described herein may further include operations, features, means, or instructions for transmitting a second message to the wireless device based on receiving the response from the aerial function management system, the second message including the positive authentication of the aerial vehicle and the approval of the flight path and being configured to trigger an establishment of the data session.

Some examples of the method, apparatuses, and non-transitory computer-readable medium described herein may further include operations, features, means, or instructions for identifying an access point for routing commands between the wireless device and a controller for the aerial vehicle based on the message, releasing the data session based on identifying the access point, and establishing a second data session based on the access point, where an exclusive communication path may be established between the wireless device and the controller via the access point.

Some examples of the method, apparatuses, and non-transitory computer-readable medium described herein may further include operations, features, means, or instructions for generating a traffic filter for communications with the wireless device based on establishing the data session, where an exclusive communication path between the wireless device and a controller for the aerial vehicle may be established based on the traffic filter.

Some examples of the method, apparatuses, and non-transitory computer-readable medium described herein may further include operations, features, means, or instructions for verifying an authenticity of the response received from the aerial function management system, storing configuration information for the aerial vehicle based on verifying the authenticity, and transmitting a second message to the wireless device based on verifying the authenticity of the response, the second message including the positive authentication of the aerial vehicle and the approval of the flight path and being configured to trigger an establishment of the data session.

Some examples of the method, apparatuses, and non-transitory computer-readable medium described herein may further include operations, features, means, or instructions for sending a second message to a radio access network based on receiving the response from the aerial function management system, the second message including information for supporting a radio connection of aerial vehicles.

In some examples of the method, apparatuses, and non-transitory computer-readable medium described herein, the message include a first indication of an access point that provides aerial services and a configurable set of parameters that includes the aerial identifier, the operational information for the aerial vehicle, and a second indication of a controller for the aerial vehicle.

In some examples of the method, apparatuses, and non-transitory computer-readable medium described herein, the first indication of the access point may be included in an Evolved Packet System (EPS) Session Management (ESM) Container and the configurable set of parameters may be included in a protocol configuration option (PCO) field.

A method of wireless communications at an aerial function management system is described. The method may include receiving, from a network, a request for a verification of an aerial vehicle that is coupled with a wireless device while a procedure for establishing a data session is being performed between the network and the wireless device, the request including an aerial identifier for the aerial vehicle and operational information for the aerial vehicle, verifying an identity of the aerial vehicle and a flight path for the aerial vehicle based on the aerial identifier and the operational information included in the request, and sending, to the network, a response including a positive authentication of the aerial vehicle and an approval of the flight path based on the verifying.

An apparatus for wireless communications at an aerial function management system is described. The apparatus may include a processor, memory coupled with the processor, and instructions stored in the memory. The instructions may be executable by the processor to cause the apparatus to receive, from a network, a request for a verification of an aerial vehicle that is coupled with a wireless device while a procedure for establishing a data session is being performed between the network and the wireless device, the request including an aerial identifier for the aerial vehicle and operational information for the aerial vehicle, verify an identity of the aerial vehicle and a flight path for the aerial vehicle based on the aerial identifier and the operational information included in the request, and send, to the network, a response including a positive authentication of the aerial vehicle and an approval of the flight path based on the verifying.

Another apparatus for wireless communications at an aerial function management system is described. The apparatus may include means for receiving, from a network, a request for a verification of an aerial vehicle that is coupled with a wireless device while a procedure for establishing a data session is being performed between the network and the wireless device, the request including an aerial identifier for the aerial vehicle and operational information for the aerial vehicle, verifying an identity of the aerial vehicle and a flight path for the aerial vehicle based on the aerial identifier and the operational information included in the request, and sending, to the network, a response including a positive authentication of the aerial vehicle and an approval of the flight path based on the verifying.

A non-transitory computer-readable medium storing code for wireless communications at an aerial function management system is described. The code may include instructions executable by a processor to receive, from a network, a request for a verification of an aerial vehicle that is coupled with a wireless device while a procedure for establishing a data session is being performed between the network and the wireless device, the request including an aerial identifier for the aerial vehicle and operational information for the aerial vehicle, verify an identity of the aerial vehicle and a flight path for the aerial vehicle based on the aerial identifier and the operational information included in the request, and send, to the network, a response including a positive authentication of the aerial vehicle and an approval of the flight path based on the verifying.

Some examples of the method, apparatuses, and non-transitory computer-readable medium described herein may further include operations, features, means, or instructions for verifying an authenticity of the request for the verification of the aerial vehicle.

In some examples of the method, apparatuses, and non-transitory computer-readable medium described herein, the request includes a first set of credentials for the aerial vehicle, and where the authenticity of the request may be verified based on the first set of credentials.

Some examples of the method, apparatuses, and non-transitory computer-readable medium described herein may further include operations, features, means, or instructions for identifying second operational information for the aerial vehicle and a second aerial identifier that may be stored at the aerial function management system based on receiving the request for the verification of the aerial vehicle.

In some examples of the method, apparatuses, and non-transitory computer-readable medium described herein, verifying the identity of the aerial vehicle may include operations, features, means, or instructions for comparing the operational information with the second operational information and the aerial identifier with the second aerial identifier, where the identity of the aerial vehicle may be authenticated based on the operational information matching with the second operational information and the aerial identifier matching with the second aerial identifier.

In some examples of the method, apparatuses, and non-transitory computer-readable medium described herein, verifying the identity of the aerial vehicle may include operations, features, means, or instructions for sending the aerial identifier and the operational information to a flight control system, and receiving a second response from the flight control system, the second response including the positive authentication of the aerial vehicle and being received before sending the response.

A method of wireless communications at a wireless device that is coupled with an aerial vehicle is described. The method may include transmitting a first message to a network, the first message including a network identifier for the wireless device, an aerial identifier for the aerial vehicle, and operational information for the aerial vehicle, where the first message is configured to establish a data session with the network, and where a request is sent to an aerial function management system for verification of the aerial vehicle based on the first message, receiving a second message from the network based on transmitting the first message, the second message including a positive authentication of the aerial vehicle and an approval of a flight path for the aerial vehicle and being configured to trigger an establishment of the data session, and establishing the data session with the network based on receiving the second message.

An apparatus for wireless communications at a wireless device that is coupled with an aerial vehicle is described. The apparatus may include a processor, memory coupled with the processor, and instructions stored in the memory. The instructions may be executable by the processor to cause the apparatus to transmit a first message to a network, the first message including a network identifier for the wireless device, an aerial identifier for the aerial vehicle, and operational information for the aerial vehicle, where the first message is configured to establish a data session with the network, and where a request is sent to an aerial function management system for verification of the aerial vehicle based on the first message, receive a second message from the network based on transmitting the first message, the second message including a positive authentication of the aerial vehicle and an approval of a flight path for the aerial vehicle and being configured to trigger an establishment of the data session, and establish the data session with the network based on receiving the second message.

Another apparatus for wireless communications at a wireless device that is coupled with an aerial vehicle is described. The apparatus may include means for transmitting a first message to a network, the first message including a network identifier for the wireless device, an aerial identifier for the aerial vehicle, and operational information for the aerial vehicle, where the first message is configured to establish a data session with the network, and where a request is sent to an aerial function management system for verification of the aerial vehicle based on the first message, receiving a second message from the network based on transmitting the first message, the second message including a positive authentication of the aerial vehicle and an approval of a flight path for the aerial vehicle and being configured to trigger an establishment of the data session, and establishing the data session with the network based on receiving the second message.

A non-transitory computer-readable medium storing code for wireless communications at a wireless device that is coupled with an aerial vehicle is described. The code may include instructions executable by a processor to transmit a first message to a network, the first message including a network identifier for the wireless device, an aerial identifier for the aerial vehicle, and operational information for the aerial vehicle, where the first message is configured to establish a data session with the network, and where a request is sent to an aerial function management system for verification of the aerial vehicle based on the first message, receive a second message from the network based on transmitting the first message, the second message including a positive authentication of the aerial vehicle and an approval of a flight path for the aerial vehicle and being configured to trigger an establishment of the data session, and establish the data session with the network based on receiving the second message.

In some examples of the method, apparatuses, and non-transitory computer-readable medium described herein, the first message include a first indication of an access point that provides aerial services, the aerial identifier, the operational information for the aerial vehicle, and a second indication of a controller for the aerial vehicle.

Some examples of the method, apparatuses, and non-transitory computer-readable medium described herein may further include operations, features, means, or instructions for encapsulating the first indication of the access point in an Evolved Packet System (EPS) Session Management (ESM) Container and the aerial identifier, the operational information for the aerial vehicle, and the second indication of the controller for the aerial vehicle in a protocol configuration option (PCO) field.

Some examples of the method, apparatuses, and non-transitory computer-readable medium described herein may further include operations, features, means, or instructions for identifying an access point that provides aerial services, where the data session may be released based on the access point, and a second data session may be established based on the access point, where an exclusive communication path may be established between the wireless device and a controller for the aerial vehicle via the access point.

DETAILED DESCRIPTION

Figure 1:
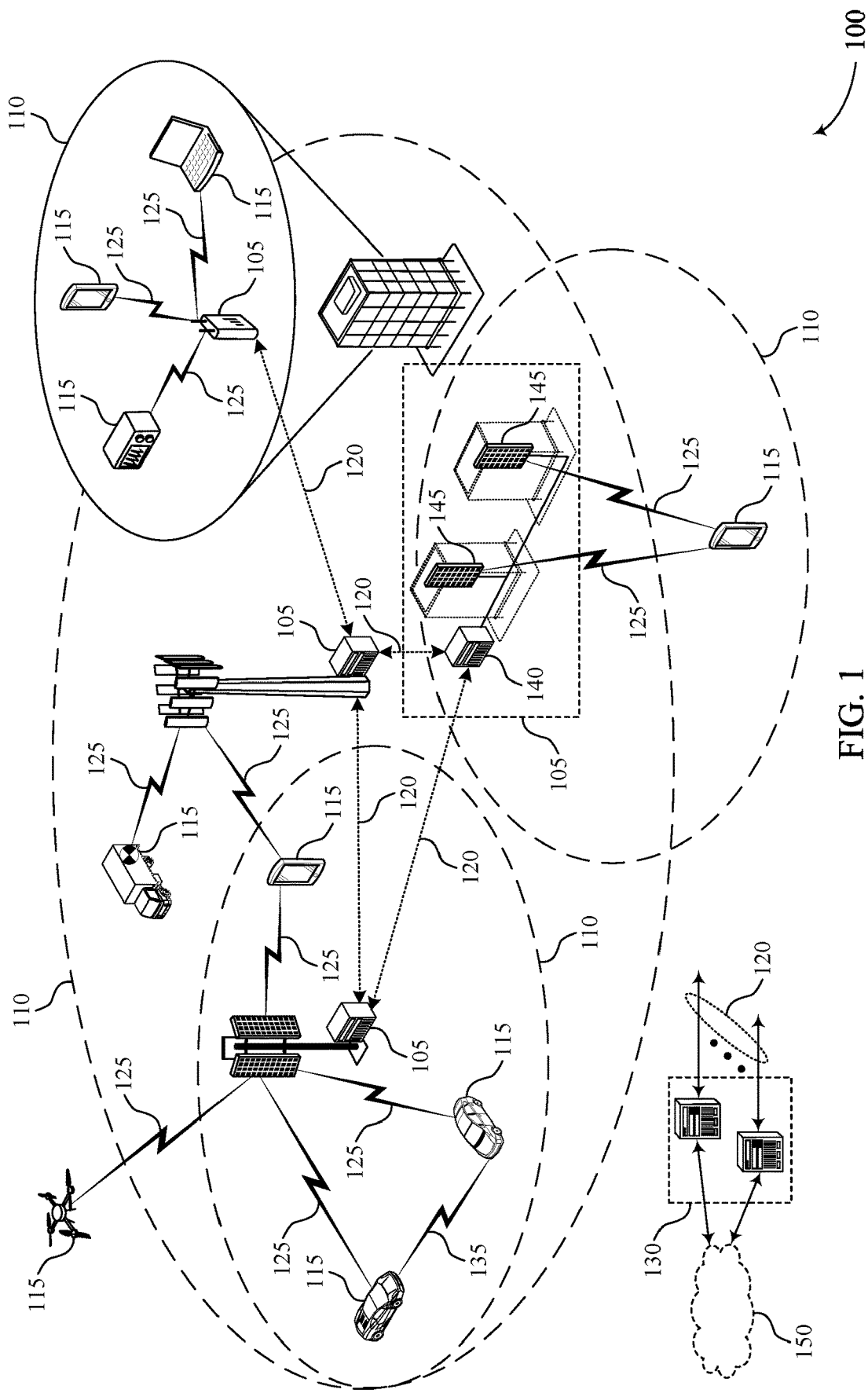
FIG. 1 illustrates an example of a wireless communications system that supports authorizing unmanned vehicles for operation in a network in accordance with various aspects of the present disclosure.

A wireless network may be capable of providing support for unmanned aerial vehicle (UAV) operation—e.g., may be configured to provide UAV-specific services that support UAV operation to a user equipment (UE) that is coupled with a UAV. However, external entities (e.g., government agencies) may be tasked with determining procedures a UAV may follow to obtain access to an airspace. In some cases, these procedures may be unknown to a wireless network and/or a wireless network may be unable to interact with the governing agency to ensure that a UAV has adhered to these procedures. Accordingly, to prevent violations of policies established by a governing agency, a wireless network may be unable to or prohibited from providing aerial services to UAVs.

To support the deployment of UAVs within a wireless network, mechanisms and procedures allowing direct interactions between a governing agency and the wireless network may be established. In some examples, a flight management system may be established as an interface between a governing agency and a wireless network and used to convey control and/or data information between the governing agency and wireless network. In some cases, the flight management system may be coupled with a wireless network as a sub-system of the wireless network. In other cases, the flight management system may act as a standalone interface that is positioned between a wireless network and a governing agency.

In some examples, operations for accessing airspace in accordance with agency policy may be coupled with procedures used for accessing the wireless network (e.g., access procedures may have a built-in capability for supporting UAV functions). In some examples, operations associated with agency procedure for authorizing and authenticating a UAV may be coupled with a network procedure for registering with a wireless network (e.g., a "registration procedure") and/or a procedure for establishing a data session with the wireless network (e.g., a "protocol data unit (PDU) session establishment procedure")—e.g., when a wireless network is a NR system. In some examples, operations associated with agency procedure for authorizing and authenticating a UAV may be coupled with a network procedure for registering with and establishing a data session with a wireless network (e.g., an "attachment procedure")—e.g., when a wireless network is a legacy network that does not have access procedures having built-in capabilities for authenticating UAVs or authorizing UAV functions.

By incorporating operations for accessing airspace into procedures used for accessing a wireless network, a duration and complexity associated with obtaining authentication and authorization for a UAV and confirming that a UAV has obtained authentication and authorization may be decreased. Also, authentication and authorization for a UAV seeking to access a wireless network may be obtained in real-time and on-the-fly. Additionally, security measures associated with authenticating and authorizing a UE may be simplified and made more secure.

Aspects of the disclosure are initially described in the context of a wireless communications system. Examples of communication devices performing operations for authorizing unmanned vehicles for operation in a network are then described. Aspects of the disclosure are further illustrated by and described with reference to apparatus diagrams, system diagrams, and flowcharts that relate to authorizing unmanned vehicles for operation in a network.

FIG. 1 illustrates an example of a wireless communications system that supports authorizing unmanned vehicles for operation in a network in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of one or more radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of one or more of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in some examples in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A wireless communications system 100 may provide support for the operation of unmanned vehicles (e.g., drones, UAVs), which may be autonomous and/or remotely controlled. For example, a wireless communications system 100 that is connected with an unmanned vehicle and a remote controller may act as an intermediary, relaying commands between a remote controller and an unmanned vehicle that is outside a line of sight of the remote controller. In some cases, to gain access to a wireless communications system 100, an unmanned vehicle may be coupled with a UE 115—e.g., a UE 115 may be included within or attached to an unmanned vehicle—and used to access and communicate with the wireless communications system 100. In some examples, information for controlling the unmanned vehicle may be transmitted to the UE 115, and the UE 115 may relay the information to a controller within the unmanned vehicle.

Before a UE 115 (e.g., a UE 115 that is coupled with an unmanned vehicle) is allowed to access services provided by a wireless communications system 100, the UE 115 may be provided with or assigned a unique "network identifier" by an operator of the wireless communications system. In some examples, a subscriber identification module (SIM) card located inside of a UE 115 may be used to store a unique network identity (e.g., an international mobile subscriber identity (IMSI)) for the UE 115, and the UE 115 may provide the unique network identity to the wireless communications system 100 during an access procedure. In some cases, the access procedure is referred to as a registration procedure—e.g., if the wireless communications system 100 is a NR system. In some cases, the access procedure is referred to as an attachment procedure—e.g., if the wireless communications system 100 is legacy (or existing) radio system, such as an LTE or 4G system. The wireless communications system 100 may use a network identity provided by a UE 115 to confirm that the UE 115 has a subscription for accessing the wireless communications system 100 before allowing the UE 115 to access services provided by the wireless communications system 100.

In some examples, a wireless communications system 100 may be configured to provide specialized services to support the operation of UAVs. Specialized services for UAVs may include a subscription based means for identifying and authorizing a UE 115 that is coupled with a UAV, procedures for reporting a height of the UE 115, specialized interference detection procedures, procedures for signaling flight path information, and/or location information reporting that includes a horizontal and vertical velocity of the UE 115. To access the specialized services, a UE 115 may be configured with a network identifier that identifies that the UE 115 is coupled with a UAV.

For security and safety reasons, the operation of some unmanned vehicles may be subject to regulations established by a governing agency for a jurisdiction in which the unmanned vehicle is planned to operate. For example, a governing agency that regulates airspace in a jurisdiction may stipulate UAVs (e.g., all UAVs or UAVs of a particular size and/or capability) to be certified before deployment. In some cases, a governing agency may use unique "aerial identifiers" of UAVs to verify the identities of UAVs. In some examples, a governing agency may use a unique serial number of a UAV as a means to identify a UAV—e.g., manufacturers may generate serial numbers for UAVs in accordance with a standardized process. In some examples, a governing agency may assign a unique aerial identification number to UAVs that are registered with the governing agency. And in some examples, an air traffic controller system may assign a unique aerial identification number to UAVs that seek access to airspace, which may be referred to as UAV unique identifiers (UUIDs). In some cases, UUIDs may be generated based on a serial number or assigned aerial identification number of the UAVs. In some cases, the governing agency may issue a prohibition against operating UAVs that have not been assigned at least one type of aerial identifier.

After an aerial identifier is established for a UAV, a governing agency may also stipulate an operator of a UAV to submit a flight plan for a UAV before a UAV will be approved for operation. In some examples, a UAV operator may submit a flight plan to the governing agency which may deny or approve the flight plan based on an analysis of a trajectory of the flight path, available airspace, safety concerns, and the like. In some cases, a UAV may be pre-approved for a flight path and the governing agency may confirm that the indicated flight path matches the pre-approved flight path before granting approval. In some cases, the governing agency may maintain one or more flight control servers that store information relating to approved UAVs and/or approved flight plans.

To support safe and smooth operation of UAVs in airspace shared with other aircraft, a governing agency may also establish standards enabling UAV identities to be remotely and continuously identified during operation—e.g., by the governing agency, authorized third-parties that monitor airspace, by other operating UAVs, and/or by other operating aircraft. In some examples, UAVs may be configured to broadcast a unique identity (e.g., a serial number, assigned identification number, and/or a UUID) in a remote identification (RID) message, where the broadcasted unique identity may be received by other aircraft and ground stations. In some cases, in addition to a unique identity, a UAV may broadcast operational information including, but not limited to, a latitude, longitude, altitude, trajectory of the UAV, an identification of the type of UAV, a timestamp, accuracy information for the latitude, longitude, and/or timestamp, an operational status of the UAV, a description of an operation being performed by the UAV, a height above takeoff, a pressure altitude of position, a speed in multiple directions, a location of the operator, an identity of the operator, and the like. Aircraft and ground stations may use the information received in a RID message to verify an identity of a UAV, avoid collisions, confirm a UAV is within an authorized area, identify rogue UAVs, and the like.

In some examples, a UAV may be configured to broadcast an RID message using out-of-band or non-networked technologies such as Bluetooth or Wi-Fi and using security measures to ensure an integrity and security of the RID message. In other examples, a UAV may be configured to transmit an RID message using a wireless network using authentication mechanisms to ensure an integrity and security of the RID message.

As discussed above, a wireless communications system 100 may be capable of providing support for UAV operation. However, interfaces allowing a wireless communications system 100 to interact directly with a governing agency may not be established—e.g., the wireless communications system 100 may be unable to access flight control servers storing information relating to approved UAVs and approved flight plans. Similarly, procedures for enabling the wireless communications system 100 to interact directly with a governing agency may not be established. Thus, a wireless communications system 100 may be unable to ensure that UAV operations adhere to regulations established by the governing agency. Accordingly, to prevent violations of policies established by the governing agency, a wireless communications system 100 may be unable to or prohibited from providing aerial functions to UAVs.

To support the deployment of UAVs within a wireless communications system 100, mechanisms and procedures allowing direct interactions between a governing agency and the wireless communications system 100 may be established. In some examples, a flight management system may be established as an interface between a governing agency and a wireless communications system 100. In some cases, the flight management system may be incorporated into a wireless communications system 100 as a sub-system. In other cases, the flight management system may act as an external intermediary between a wireless communications system 100 and a governing agency.

In some examples, operations for accessing airspace in accordance with agency policy may be incorporated into procedures used for accessing the wireless communications system 100 (e.g., access procedures may have a built-in capability for supporting UAV functions). In some examples, operations associated with agency procedure for authorizing and authenticating a UAV may be incorporated into a network procedure for registering with a wireless communications system 100 (e.g., a "registration procedure") and/or a procedure for establishing a data session with the wireless communications system 100 (e.g., a "PDU session establishment procedure")—e.g., when a wireless communications system 100 is a NR system. In some examples, operations associated with agency procedure for authorizing and authenticating a UAV (which may also be referred to as a "UAV service supplier (USS)-specific authentication and authorization (USAA) procedure") may be incorporated into a network procedure for registering with and establishing a data session with a wireless communications system (e.g., an "attachment procedure")—e.g., when a wireless communications system 100 is a legacy network that does not have access procedures having built-in capabilities for authenticating UAVs or authorizing UAV functions. In some examples, a UUID may be used to facilitate the union of network and air traffic procedures.

By incorporating operations for accessing airspace into procedures used for accessing a wireless network, a duration and complexity associated with obtaining authentication and authorization for a UAV and confirming that a UAV has obtained authentication and authorization may be decreased. Also, authentication and authorization for a UAV seeking to access a wireless network may be obtained in real-time and on-the-fly—e.g., rather than a UAV operator having to separately obtain authentication and authorization from a governing agency for an initial approval and/or each time operating parameters for a UAV are modified before accessing a cellular network. Additionally, security measures associated with authenticating and authorizing a UE may be simplified and made more secure—e.g., by building UAV-specific security measures directly into the network access procedures rather than establishing additional security measures to be independently adhered to by a flight control system and a wireless network system and/or by establishing secure links (e.g., wired links) between a wireless network and a flight control system.

Figure 2:
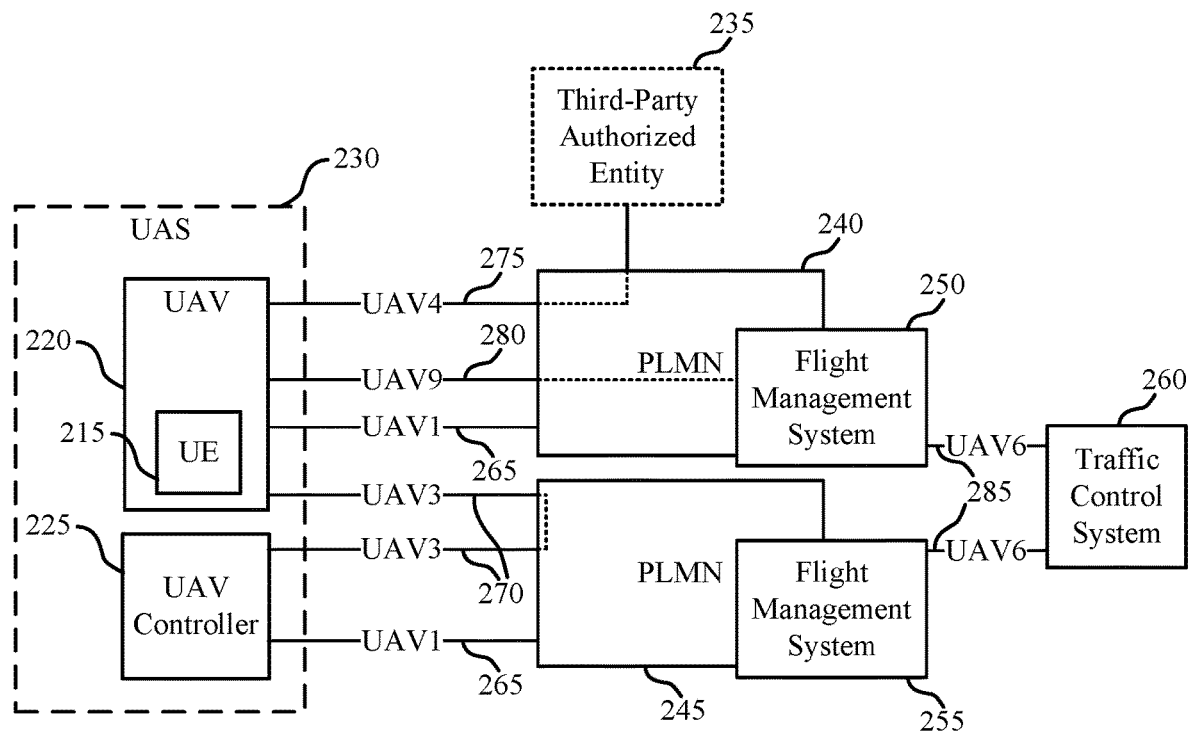
FIG. 2 illustrates aspects of a wireless communications system that supports authorizing unmanned vehicles for operation in a network in accordance with various aspects of the present disclosure.

FIG. 2 illustrates aspects of a wireless communications system that supports authorizing unmanned vehicles for operation in a network in accordance with various aspects of the present disclosure. Wireless communications system 200 may include UE 215 which may be coupled with UAV 220 and an example of a UE 115, as described with reference to FIG. 1. Wireless communications system 200 may also include UAV system (UAS) 230 that includes UAV 220 and UAV controller 225. Wireless communications system 200 may also include third-party authorized entity (TPAE) 235, first public land mobile network (PLMN) 240, second PLMN 245, first flight management system 250, second flight management system 255, and traffic control system 260.

UAV 220 may be an autonomous or remotely operated aerial vehicle (e.g., without a pilot on-board). Generally, UAV 220 may be a drone that does not carry passengers, but some UAVs may be designed to carry passengers. UAV 220 may be coupled with UE 215 and may use UE 215 to communicate with a wireless (e.g., cellular) network. In some cases, UE 215 is configured with a unique network identity that is used to verify that UE 215 has a subscription to access a wireless network.

UAV controller 225 may be configured to issue commands to UAV 220 and to receive data (e.g., telemetry) from UAV 220. UAV controller may also be coupled with a UE that is used to communicate with a wireless network.

TPAE 235 may be a privileged UAV controller that can be used to monitor the operation of UAVs and to take control of one or more UAVs via a wireless network.

First PLMN 240 may be a wireless network that is maintained and managed by a first operator. First PLMN 240 may include radio access network infrastructure (e.g., cell towers and backhaul networks), network components that support the operations of the radio access network (e.g., MME entities, AMF entities, etc.), and network components that support accessing a data network (e.g., session management function (SMF) entities, PDN GW entities, etc.). Second PLMN 245 may similarly be a wireless network that is maintained and managed by a second, different operator.

First flight management system 250 may be configured to act as an interface between first PLMN 240 and traffic control system 260. In some cases, first flight management system 250 is a sub-component of first PLMN 240. In other cases, first flight management system 250 is an external component to first PLMN 240. In some cases, first flight management system 250 may include a UAV flight management system (UFMS), a UAV flight control function (UFCF), and/or a UAV flight support function (UFSF). Second flight management system 255 may similarly be configured to act as an interface between second PLMN 245 and traffic control system 260.

Traffic control system 260 may be configured to manage traffic in an airspace—e.g., by approving and scheduling UAV operation. Traffic control system 260 may be configured to identify UAVs, UAV operators, and/or UAV pilots that are flown in an airspace monitored by traffic control system 260. Traffic control system 260 may also provide flight plan management services, issue flight permissions and directives, and manage traffic in an airspace. Additionally, traffic control system 260 may be configured to surveil and track UAVs, monitor to ensure that UAVs remain in compliance with issued flight plans, provide meteorological information, provide information about obstacles, and to provide collision avoidance services. Traffic control system 260 may also be configured to inform UAVs of emergency situations and to record historical UAV flight information—e.g., for subsequent incident investigations.

Traffic control system 260 may include a UAV service supplier (USS) entity that is configured to support the safe and efficient use of a particular airspace by providing services to a UAV operator in accordance with a broader traffic control plan established by traffic control system 260. In some cases, USS entities interface with other USS entities, where each USS entity may obtain approval by a governing agency before being cleared for deployment. In some cases, traffic control system 260 may also be referred to as a UAV traffic management (UTM) system.

Wireless communications system 200 may also include one or more UAV-specific interfaces that are used to relay UAV-specific information between UAS 230, TPAE 235, first PLMN 240, second PLMN 245, first flight management system 250, second flight management system 255, and traffic control system 260. Wireless communications system 200 may include first interface 265 (or UAV1), second interface 270 (or UAV3), third interface 275 (or UAV4), fourth interface 280 (or UAV9), and fifth interface 285 (or UAV 6).

First interface 265 may be configured to provide a connection between UAVs (e.g., UAV 220) and one or more PLMNs (e.g., first PLMN 240 and second PLMN 245). First interface 265 may also be configured to provide a connection between UAV controllers (e.g., UAV controller 225) and one or more PLMNs (e.g., first PLMN 240 and second PLMN 245). In some cases, first interface 265 may be configured to convey control information for authorizing, authenticating, identifying, and/or tracking a UAV and/or UAV controller.

Second interface 270 may be configured to provide a connection between UAVs and UAV controllers (e.g., UAV 220 and UAV controller 225). In some cases, second interface 270 may be configured to convey data information (e.g., command and control) between a UAV and UAV controller.

Third interface 275 may be configured to provide a connection between UAVs and TPAEs (e.g., UAV 220 and TPAE 235). In some cases, third interface 275 may be configured to convey data information (e.g., command and control) and control information (e.g., RID messages and UAV tracking) between a UAV and TPAE.

Fourth interface 280 may be configured to provide a connection between UAVs, UAV controllers, and flight management systems (e.g., UAV 220, UAV controller 225, first flight management system 250, second flight management system 255). In some cases, fourth interface 280 may further provide a connection between UAVs, UAV controllers, flight management systems, and traffic control systems (e.g., traffic control system 260). In some cases, fourth interface 280 may be configured to convey control information for authorizing, authenticating, identifying, and/or tracking a UAV and/or UAV controller. In some cases, fourth interface 280 may be configured to convey data information (e.g., command and control)—e.g., if traffic control system 260 takes control of UAV 220.

Fifth interface 285 may be configured to provide a connection between PLMNs, flight management systems, and traffic control systems (e.g., first PLMN 240, second PLMN 245, first flight management system 250, second flight management system 255, and traffic control system 260). In some cases, fifth interface 285 may be configured to convey control information for authorizing, authenticating, identifying, and/or tracking a UAV and/or UAV controller. In some cases, fifth interface 285 may be configured to convey data information (e.g., command and control)—e.g., if traffic control system 260 takes control of UAV 220.

As discussed above, to support the safe and secure deployment of UAVs within a wireless communications system, mechanisms and procedures allowing direct interactions between a governing agency and a wireless communications system may be determined. In some examples, a flight management system (e.g., first flight management system 250 and/or second flight management system 255) may be established as an interface between the governing agency and a wireless network. In some examples, operations for authorizing and authenticating a UAV in accordance with a governing agency protocol (e.g., a USAA procedure) may be incorporated into a procedure for accessing a wireless network.

In some examples, UAV 220 and/or UAV controller 225 may seek access to a wireless network. In some examples, UAV 220 and UAV controller 225 use a UAV1 interface to access a wireless network. For example, UAV controller 225 may use first interface 265 to access second PLMN 245. In some examples, UAV 220 and UAV controller 225 may seek access to a same PLMN (e.g., first PLMN 240) and may both use a same UAV1 interface to access the same PLMN. To access the wireless network, UAV 220 and/or UAV controller 225 may transmit, via a UAV1 or UAV9 interface, a message (e.g., an RID message) that includes a network identifier for a coupled UE (e.g., UE 215), an aerial identifier for the device itself (e.g., for UAV 220 or UAV controller 225), and other flight information that may include information such as an operator identifier, a flight path, and the like. Based on a radio access technology used by a PLMN, UAV 220 and/or UAV controller 225 may transmit the message during a particular network access procedure. For example, if first PLMN 240 is configured to use a nascent radio access technology (e.g., 5G or NR), the message may be transmitted during a registration procedure and/or a PDU session establishment procedure. Alternatively, if first PLMN 240 is configured to use a legacy radio access technology (e.g., 4G or LTE), the message may be transmitted during an attachment procedure. In some examples, before accessing the wireless network, UAV 220 may obtain a UUID and a set of one or more credentials from first flight management system 250 or traffic control system 260. UAV 220 may use the UUID and set of credentials during a USAA procedure. In some cases, the set of credentials may enable first flight management system 250 to verify that UAV 220 is the actual UAV corresponding to the UUID.

After receiving a message requesting access to a wireless network from UE 215, first PLMN 240 may determine that UE 215 is coupled with UAV 220 and may initiate an authentication and authorization procedure that involves accessing traffic control system 260 via first flight management system 250 and using a UAV6 interface. Procedures for accessing a wireless network that include operations for authorizing and authenticating a UAV via a flight management system are described in more detail herein.

In some cases, first flight management system 250 may determine that UAV 220 is authenticated and authorized for flight operations and second flight management system 255 may determine that UAV controller 225 is authenticated and authorized for flight operations. After determining that the authentication and authorization procedure for UAV 220 and UAV controller 225 has successfully completed, first PLMN 240 and/or second PLMN 245 may establish a data session with UAV 220 and/or UAV controller 225, and UAV controller 225 may exchange data (e.g., command and control) with UAV 220 via second interface 270.

In some examples, a USAA procedure may be performed dynamically—e.g., each time UAV 220 connects to a wireless network. In some examples, while connecting to a wireless network, a USAA procedure that uses first flight management system 250 and traffic control system 260 may be performed so long as the wireless network stores a valid authorization for UAV 220. In some examples, the USAA procedure may be performed a single time—e.g., when UAV 220 obtains a UUID and set of credentials—and first flight management system 250 may store the UUID and set of credentials. In such cases, first flight management system 250 may authenticate and authorize UAV 220 without interacting with traffic control system 260.

Figure 3:
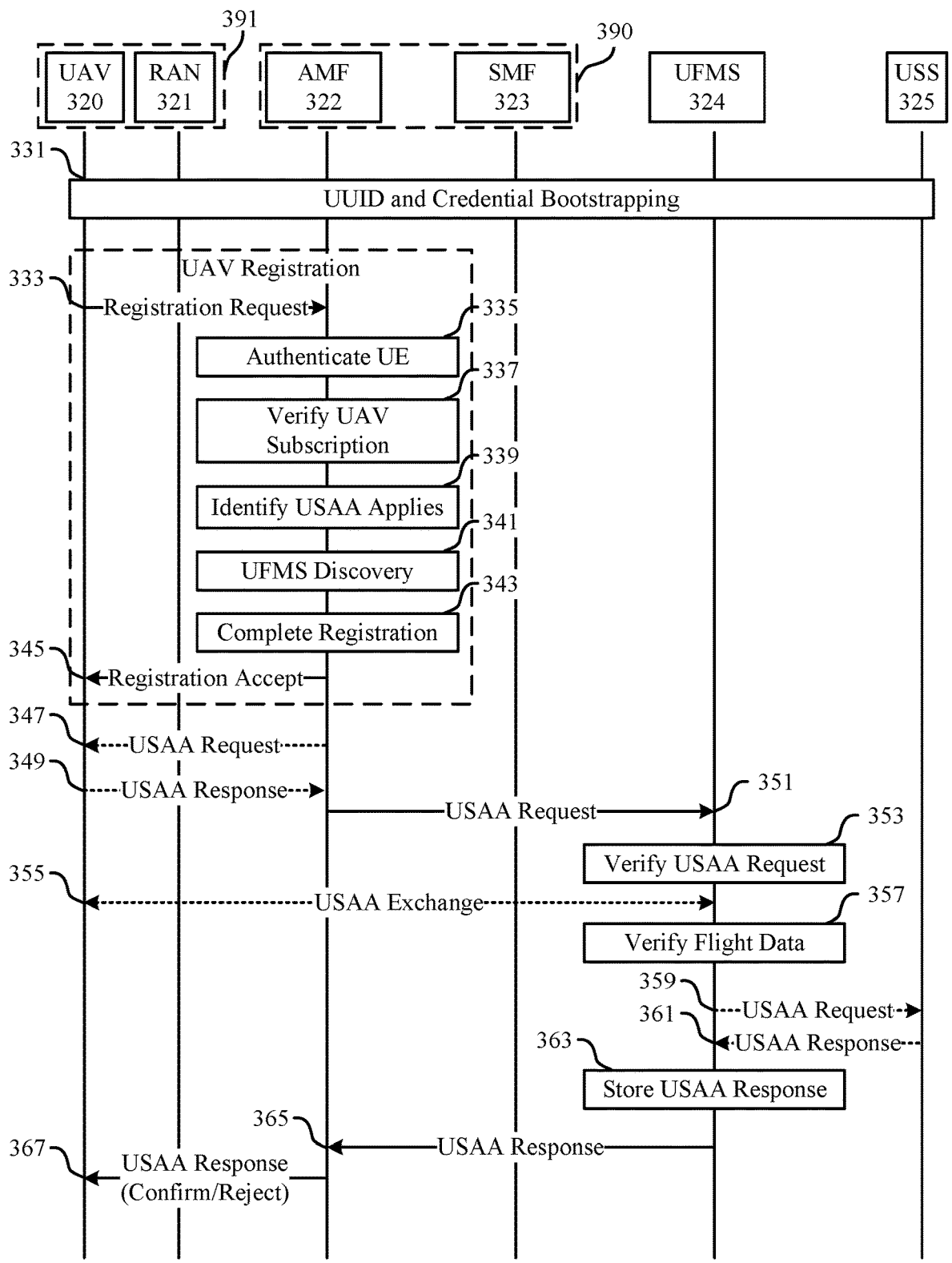
FIG. 3 illustrates aspects of a process for authorizing unmanned vehicles for operation in a network in accordance with various aspects of the present disclosure.

FIG. 3 illustrates aspects of a process for authorizing unmanned vehicles for operation in a network in accordance with various aspects of the present disclosure. Process flow 300 may be performed by UAV 320, which may be an example of UAV described herein with reference to FIGS. 1 and 2. Process flow 300 may be also be performed by radio access network (RAN) 321, AMF 322, SMF 323, UFMS 324, and USS 325. In some cases, core network 390 of a PLMN is configured in accordance with a NR system (e.g., a 5G system) and includes AMF 322 and SMF 323. In some cases, core network 390 also includes UFMS 324. In some cases, a flight management system (e.g., first flight management system 250 of FIG. 2) includes UFMS 324. In some cases, a traffic control system (e.g., traffic control system 260 of FIG. 2) includes USS 325. In some cases, radio access system 391 includes UAV 720 and RAN 721.

In some examples, process flow 300 illustrates control plane operations for authenticating and authorizing UAV 320 that are incorporated into, or performed as part of, a procedure for registering with a wireless network. In some cases, a UAV controller may perform a similar procedure.

At block 331, a UE that is coupled with UAV 320 may perform a procedure for obtaining a UUID and credentials used to protect communications between UAV 320 and UFMS 324. In some examples, the UE may obtain the UUID from UFMS 324, where the UUID may be a temporary identity used by UFMS 324 and USS 325 to uniquely identify UAV 320. In some cases, the set of credentials (e.g., security keys and certificates) may be used to protect the UUID when UAV 320 broadcasts an RID message and to enable other UAVs and monitoring entities to verify a validity of flight information or tracking information broadcast by UAV 320. In some cases, the UE is assigned multiple UUID and credential combinations—e.g., the UE may be assigned a first UUID and first credentials for in-coverage operations and a second UUID and second credential for out-of-coverage operations. In some cases, a UUID and credential combination may be referred to as solely a UUID. In some examples, the UUID and credentials may be provided by UFMS 324. In other examples, the UUID and credential may be provided by USS 325.

At arrow 333, a UE coupled with UAV 320 may transmit via RAN 321 a registration request message to register with the wireless network. The registration request message may convey UE parameters, such as a subscription permanent identifier (SUPI) and credentials for authenticating the SUPI. The registration message may also convey UAV parameters, such as a UUID and flight data. The flight data may include a latitude, longitude, altitude, trajectory of the UAV, an identification of the type of UAV, a timestamp, accuracy information for the latitude, longitude, and/or timestamp, an operational status of the UAV, a description of an operation being performed by the UAV, a height above takeoff, a pressure altitude of position, a speed in a latitudinal and longitudinal directions, a location of the operator, an operator identity and the like. In some cases, the registration message may also include information about a controller for UAV 320—e.g., the registration message may include a UUID of the controller, a location of the controller, and/or identifying information for the controller, such as a pilot identity. In some cases, the registration request may be configured to register the UE for a network slice for aerial operations.

At block 335, AMF 322 may retrieve a network profile for the UE (e.g., subscriber profile associated with the credentials of the UE) and authenticate the UE. In some cases, AMF 322 may also verify that the UE has a subscription for accessing general services (e.g., voice, data, messaging, etc.) provided by the wireless network. And at block 337, AMF 322 may verify that the identified network profile for the UE also has a valid subscription giving the UE access to aerial services provided by the wireless network.

At block 339, AMF 322 may determine whether a USAA procedure is to be performed before the wireless network is permitted to provide the UE with aerial services based on verifying that the UE has a valid subscription for aerial services. In some cases, the subscription indicates that a USAA procedure is to be performed for the UE before the UE is given access to the wireless network. In some cases, AMF 322 determines that a USAA procedure may be bypassed for UAV 320—e.g., if AMF 322 stores an indication that a previous USAA procedure performed for UAV 320 was successfully completed and is still valid.

At block 341, AMF 322 may identify an identity of UFMS 324 based on identifying information (e.g., a UUID or SUPI) signaled by the UE. And at block 343, AMF 322 may complete the network registration procedure. In some cases, AMF 322 may select a specific network slice for aerial operations for the UE, based on the subscription information for the UE. In some examples, AMF 322 may register the UE to a "forbidden" area or mode that solely enables control plane communications with AMF 322 (e.g., does not enable data communications or PDN connections or sessions via a PDN GW). For example, the UE may be assigned to a state in which user plane data is blocked.

At arrow 345, AMF 322 may transmit via RAN 321 a registration accept message to the UE indicating that the registration request was accepted, and that the UE has been registered with the wireless network. In some cases, the registration accept message may include an indication that a USAA procedure is pending or is to be performed before the UE may gain access to aerial services. In some cases, the registration accept message indicates that a USAA procedure is pending if the USAA procedure is being performed as part of the registration request. In some cases, the UE may establish a control plane connection with the wireless network based on receiving the registration accept message.

At arrow 347, AMF 322 may transmit via RAN 321 a USAA request message to the UE requesting that the UE provide the wireless network with information for authenticating and authorizing UAV 320 for flight operations.

At arrow 349, the UE may transmit via RAN 321 a USAA response message to AMF 322 that includes information for authenticating the UAV 320 based on the UUID and authorizing the UE for flight operations. The USAA response message may include a UUID and flight data for UAV 320.

At arrow 351, AMF 322 may send a USAA request message to UFMS 324 requesting that UFMS 324 authenticate and/or authorize UAV 320 for flight operations. In some cases, the USAA request may include a UUID and flight data for UAV 320. In some cases, AMF 322 obtains the UUID and flight data for including in the USAA request from the registration request message transmitted at arrow 333—e.g., when AMF 322 does not transmit USAA request at arrow 347. In other cases, AMF 322 obtains the UUID and flight data from the USAA response message transmitted at arrow 349. In some cases, the USAA request message is transmitted using one or more security keys used to protect and verify the USAA request message.

At block 353, UFMS 324 may verify that the USAA request message received from AMF 322 is valid—e.g., using the one or more security keys. In some cases, UFMS 324 may use stored information for UAV 320 (e.g., a stored UUID) to determine if the received USAA message is valid.

At arrow 355, UFMS 324 and UAV 320 may exchange USAA information. In some examples, UFMS 324 may send a USAA request message to UAV 320, and UAV 320 may send a USAA response message to UFMS 324. In some cases—e.g., if UFMS 324 obtains the information for performing the USAA in either the registration request message transmitted at arrow 333 or the USAA response message transmitted at arrow 349—UAV 320 and UFMS 324 may refrain from exchanging USAA information.

At block 357, UFMS 324 may attempt to verify the flight data received from UAV 320 based on flight data that was previously received from USS 325 and is stored at UFMS 324 for UAV 320. In some cases, UFMS 324 may authenticate an identity of UAV 320 based on a UUID and/or flight data that is stored for UAV 320. For example, UFMS 324 may use information such as an operator identity, UAV type, operator location, and flight path to authenticate the identity of UAV 320. In some cases, UFMS 324 may confirm an authorized association between UAV 320 and a controller for UAV 320.

At arrow 359, UFMS 324 may send a USAA request message to USS 325. In some cases, the USAA request message includes a UUID and flight data for UAV 320 and requests USS to perform a USAA procedure. In some examples, UFMS 324 may send the USAA request message after determining that no information for UAV 320 is stored at UFMS 324. In some examples, UFMS 324 may send the USAA request message after a USAA procedure performed by UFMS 324 fails.

At arrow 361, USS 325 may send a USAA response message to UFMS 324. In some cases, the USAA response message may include an indication of whether the USAA procedure was successful and/or flight data for UAV 320 (if the procedure was successful). In some cases, the USAA response message may include an indication of a duration for which an authentication and authorization is valid—e.g., the USAA response message may indicate that UAV 320 is authenticated and authorized for a lifetime of UAV 320. In some cases, USS 325 may revoke a persistent authentication and authorization at any time. In some cases, before sending the USAA response message, USS 325 may determine whether to approve one or more aspects associated with an indicated flight (e.g., flight parameters, flight path) for UAV 320. In some cases, the one or more aspects a UAV (e.g., UAV 320), a UAV type, a UAV category, a UAV service supplier, a flight schedule, a mission type, a location associated with a flight path, a pilot identity, an operator identity, operating parameters associated with a flight path, conditional validity information, or any combination thereof.

In some cases, UFMS 324 may be unable to approve a flight path without first receiving an approval of the flight path from USS 325.

In some cases, USS 325 may provide conditional validity information for an authentication and authorization—e.g., USS 325 may indicate information about a controller for UAV 320, a UAV type and category, a mission type, a location, a pilot identity, an operator identity, a flight plan, etc. In such cases, if the wireless network determines that the flight/mission parameters for UAV 320 do not satisfy the conditions (e.g., that the UAV 320 deviates from the approved conditions), the wireless network may trigger a USAA procedure for UAV 320. Having the wireless network initiate a USAA procedure based on a conditional authentication and approval may reduce a processing load on USS 325.

At block 363, UFMS 324 may store the USAA response message generated by UFMS 324 or received from USS 325. In some examples, UFMS 324 may store flight data for UAV 320 that is received from USS 325.

At arrow 365, UFMS 324 may send a USAA response message to AMF 322. In some cases, the USAA response message may include an indication of whether the USAA procedure was successful and/or flight data for UAV 320 (if the procedure was successful). In some cases, the USAA response message includes configuration information for the UE—e.g., the message may include information directing the UE to report a location continuously or at intervals.

At arrow 367, AMF 322 may transmit via RAN 321 either a USAA confirmation message (if the USAA procedure is successful) or a USAA rejection message (if the USAA procedure is unsuccessful) to the UE coupled with UAV 320. In some cases, the UE may establish a PDU session with the wireless network based on receiving a USAA confirmation message. And a controller for UAV 320 that has similarly performed a successful USAA procedure may transmit command and control information to UAV 320 using the wireless network. In some examples, AMF 322 may provide information to RAN 321 directing RAN 321 to enable services that support aerial operations after determining that a USAA procedure is successful. In some examples, after receiving an indication that the USAA procedure for UAV 320 was successful, the UE and AMF 322 may establish a PDU session that is configured to convey UAV-specific information.

Certain of the operations discussed above may be omitted, performed concurrently with other operations, and/or performed in a different order than provided above. In some examples, the operations described at arrow 351 to arrow 367 may be performed during the UAV registration procedure—e.g., the performance of the operations may be initiated after the operation described at block 341.

Figure 4:
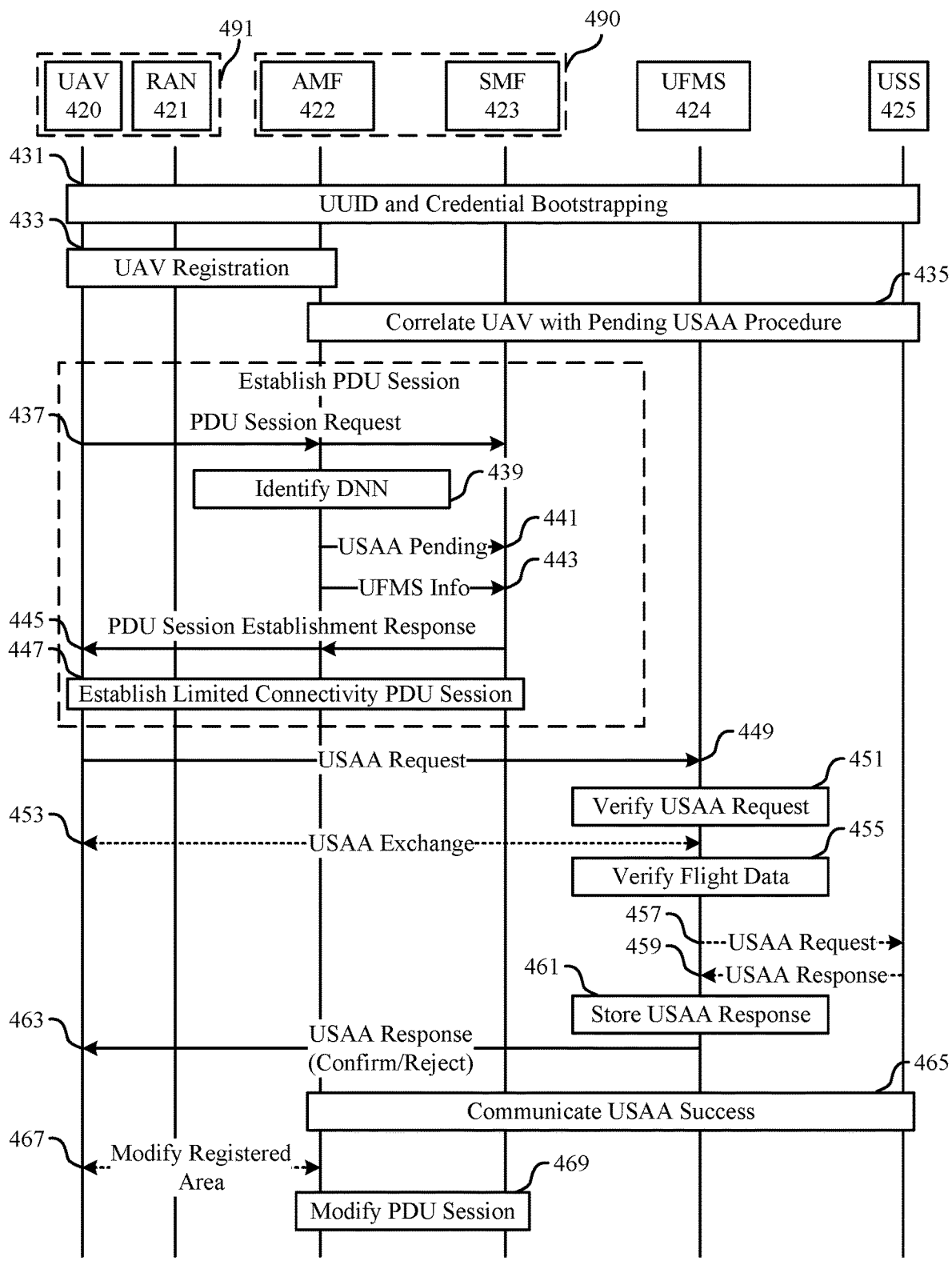
FIG. 4 illustrates aspects of a process for authorizing unmanned vehicles for operation in a network in accordance with various aspects of the present disclosure.

FIG. 4 illustrates aspects of a process for authorizing unmanned vehicles for operation in a network in accordance with various aspects of the present disclosure. Process flow 400 may be performed by UAV 420, which may be an example of UAV herein with reference to FIGS. 1 through 3. Process flow 400 may be also be performed by RAN 421, AMF 422, SMF 423, UFMS 424, and USS 425, which may be examples of a RAN, AMF, SMF, UFMS, and USS as described with reference to FIG. 3. Core network 490 may be an example of core network 390 of FIG. 3. Radio access system 491 may be an example of radio access system 391 of FIG. 3.

In some examples, process flow 400 illustrates data plane operations for authenticating and authorizing UAV 420 that are incorporated into, or performed as part of, a procedure for registering with a wireless network. In some cases, a UAV controller may perform a similar procedure. By using a data plane to perform a USAA procedure, a UE that is coupled with a UAV may use a data session connection (e.g., via an access point that provides a connection to UFMS 424) to communicate with a flight management system rather than a proprietary or dedicated connection between the UE, AMF 422, or SMF 423 and the UFMS 424. In some cases, using a data plane to perform a USAA procedure, may enable the USAA procedure to be performed without a direct or dedicated link being configured between the UFMS and the wireless network—e.g., an access point can be used to connect the wireless (or core) network with the UFMS and/or USS. In some cases, an access point that provides a connection to UFMS 424 may also be referred to as an Access Point Name (APN).

At block 431, a UE that is coupled with UAV 420 may obtain a UUID and a set of one or more credentials, as similarly described with reference to block 331 of FIG. 3.

At block 433, the UE may perform a procedure for registering with the wireless network. In some examples, while registering with the wireless network, the UE and AMF 422 perform the operations described at arrow 333 to arrow 345, and AMF 422 determines that a USAA procedure is to be performed for the UE, as described with reference to FIG. 3. In some cases, AMF 422 may register the UE in a "forbidden area" (e.g., may register the UE for limited communication via the wireless network such as communication terminated at entities of the wireless network core network) that, for example, enables the UE to communicate with AMF 422 (e.g., only with AMF 422). For example, the UE may be assigned to a state in which user plane data for the UE is blocked.

At block 435, AMF 422, SMF 423, UFMS 424, and USS may establish a correlation between the UE and the pending USAA procedure. In some cases, to correlate the UE to the USAA request, the UE provides a network-specific identifier that UFMS 424 and/or USS 425 may use to target signaling to the wireless network. In some cases, to correlate the UE to the USAA request, AMF 422 signals a correlation ID (e.g., a general public subscription identifier (GPSI)) to UFMS 424. In some cases, UFMS 424 signals the correlation ID (e.g., GPSI) to USS 422.

At arrow 437, the UE may transmit a PDU session request message to AMF 422. At block 439, AMF 422 may identify an APN that is configured to support the sole signaling of data for a USAA procedure—e.g., the PDU session may not support the transmission of other types of data such as command and control. At arrow 441, AMF 422 may indicate to SMF 423 that a USAA procedure is pending for the UE. At arrow 443, AMF 422 may provide information about UFMS 424 to SMF 423. In some example, AMF 422 may indicate to SMF 423 that UFMS 424 is configured to perform a USAA procedure for UAV 420.

At arrow 445, SMF 423 may send a PDU session establishment response message to AMF 422, which may transmit via RAN 421 a PDU session establishment response message to the UE. At block 447, the UE and SMF 423 may establish a limited connectivity PDU session that enables the UE to exchange data with the UFMS 424 (e.g., only with the UFMS 424).

At arrow 449, the UE may transmit via RAN 421 and a data network a USAA request message to UFMS 424. In some cases, the USAA request message includes a UUID and flight data for UAV 420. In some cases, to correlate the UE to the USAA request, the USAA request message includes a correlation ID received from AMF 422 during a registration procedure. In some cases, the UFMS 424 may signal the correlation ID to USS 425.

At block 451, UFMS 424 may verify the received USAA request message, as similarly described with reference to block 353 of FIG. 3. In some cases, the UFMS may map the received correlation ID received from the UE to the UUID. At arrow 453, the UE and UFMS 424 may exchange USAA request and USAA response messages, as similarly described with reference to arrow 355 of FIG. 3. At block 455, UFMS 424 may attempt to verify flight data for UAV 420 based on stored flight data, as similarly described with reference to block 357 of FIG. 3. At arrow 457, UFMS 424 may send a USAA request message to USS 425, as similarly described with reference to arrow 359 of FIG. 3. At arrow 459, UFMS 424 may receive a USAA response message from USS 425, as similarly described with reference to arrow 361 of FIG. 3. At block 461, UFMS 424 may store the USAA response, as similarly described with reference to block 363 of FIG. 3.

At arrow 463, UFMS 424 may send via a data network and RAN 421 a USAA either a USAA confirmation message or a USAA rejection message. In some cases, the USAA information exchanged between the UE and UFMS 424 may be communicated via the limited connectivity PDU session established at block 447.

At block 465, UFMS 424 and/or USS 425 may communicate to the wireless network that the USAA procedure was successful.

At arrow 467, AMF 422 may modify the registered area for the UE so that the UE is able to perform control plane communications with additional entities other than AMF 422.

At block 469, AMF 422 and SMF 423 may modify the established limited connectivity PDU session so that the UE may perform communications with entities other than UFMS 424. In some cases, the modified PDU session may enable the UE to perform communications with a controller for UAV 420 (e.g., only a controller for UAV 420). In some examples, AMF 322 may provide information to RAN 421 directing RAN 421 to enable services that support aerial operations after determining that a USAA procedure is successful.

Certain of the operations discussed above may be omitted, performed concurrently with other operations, and/or performed in a different order than provided above.

Figure 5:
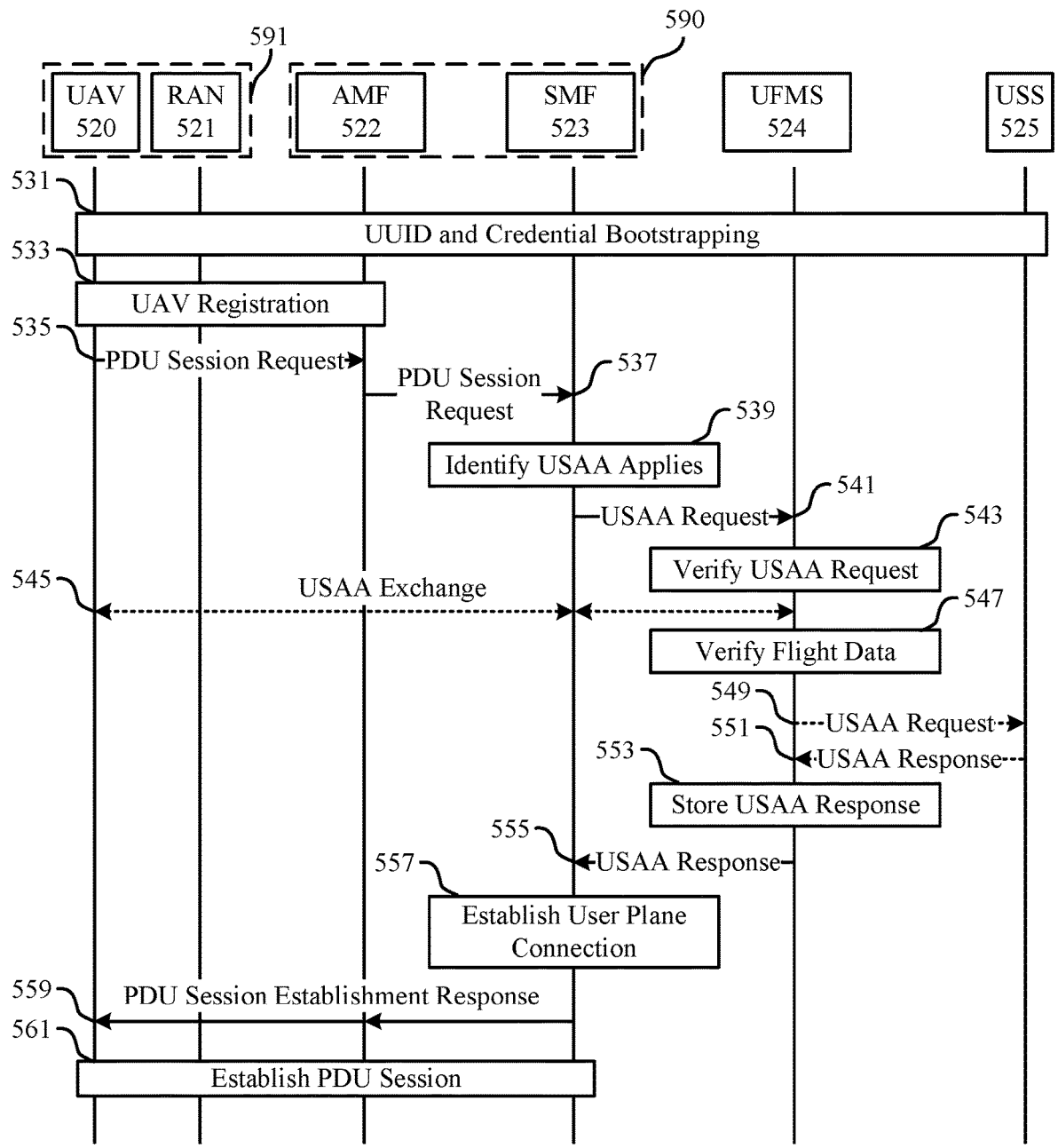
FIG. 5 illustrates aspects of a process for authorizing unmanned vehicles for operation in a network in accordance with various aspects of the present disclosure.

FIG. 5 illustrates aspects of a process for authorizing unmanned vehicles for operation in a network in accordance with various aspects of the present disclosure. Process flow 500 may be performed by UAV 520, which may be an example of UAV described herein with reference to FIGS. 1 through 4. Process flow 500 may be also be performed by RAN 521, AMF 522, SMF 523, UFMS 524, and USS 525, which may be examples of a RAN, AMF, SMF, UFMS, and USS as described with reference to FIGS. 3 and 4. Core network 590 may be an example of core network 390 or core network 490 of FIGS. 3 and 4. Radio access system 591 may be an example of radio access system 391 and radio access system 491 of FIGS. 3 and 4.

In some examples, process flow 500 illustrates operations for authenticating and authorizing UAV 520 that are incorporated into, or performed as part of, a procedure for establishing a data session with a wireless network. In some cases, a UAV controller may perform a similar procedure.

At block 531, a UE that is coupled with UAV 520 may obtain a UUID and a set of one or more credentials, as similarly described with reference to block 331 of FIG. 3. At block 533, the UE may perform a procedure for registering with the wireless network, as similarly described with reference to block 433 of FIG. 4.

At arrow 535, the UE may transmit via RAN 521 a PDU session request message to AMF 522 requesting permission to establish a PDU session (e.g., a PDN connection) with the wireless network. In some cases, the PDU session request message may indicate a data network that is configured for a USAA operation.

At arrow 537, AMF 522 may send a PDU session request message to SMF 523 requesting that SMF 523 establish a PDU session for the UE. In some cases, the PDU session request message may indicate a data network that is configured for a USAA operation.

At block 539, SMF 523 may determine that a USAA procedure is to be performed for the UAV 520 before SMF 523 establishes a PDU session for the UE. And at arrow 541, SMF 523 may send a USAA request message to UFMS 524. In some cases, the USAA request message may include a UUID and/or flight data for UAV 520.

At block 543, UFMS 524 may verify the received USAA request message, as similarly described with reference to block 353 of FIG. 3. At arrow 545, the UE, SMF 523, and UFMS 524 may exchange USAA request and USAA response messages, as similarly described with reference to arrow 355 of FIG. 3. At block 547, UFMS 524 may attempt to verify flight data for UAV 520 based on stored flight data, as similarly described with reference to block 357 of FIG. 3. At arrow 549, UFMS 524 may send a USAA request message to USS 525, as similarly described with reference to arrow 359 of FIG. 3. At arrow 551, UFMS 524 may receive a USAA response message from USS 525, as similarly described with reference to arrow 361 of FIG. 3. At block 553, UFMS 524 may store the USAA response, as similarly described with reference to block 363 of FIG. 3.

At arrow 555, UFMS 524 may send a USAA response message to SMF 523 indicating whether UAV 520 has been authenticated and authorized for flight operations.

At block 557, SMF 523 may establish a user plane connection that provides a data communication path between the UE, UFMS 524, and a controller for UAV 520. In some cases, SMF 523 establishes the user plane connection after receiving a USAA response message (e.g., only after receiving a USAA response message) that indicates that the UAV 520 has been authenticated and authorized for flight operations. In some examples, the user plane connection may be established so that an exclusive communication path between the indicated controller and the UE is created. In some cases, the exclusive communication path may include UFMS 524 and/or USS 525.

In some examples, the exclusive communication path is established based on the information about the controller provided by the UE in the PDU session request message transmitted at arrow 535. In some cases, the exclusive communication path is established based on address information (e.g., one or more IP addresses, domain names, port numbers, etc.) provided by UFMS 524 and/or USS 525 in the USAA response message sent at arrow 555. The address information may enable the communication of user plane packets between the UE and the controller for UAV 520. In some cases, UFMS 524 and/or USS 525 generates the address information based on information about the controller included in the PDU session request message transmitted at arrow 535. In some cases, the address information causes user plane packets sent between the UE and the controller to pass through UFMS 524. In some cases, SMF 523 establishes packet filters for the user plane connection (e.g., based on the address information) that ensure that the UE is capable of (e.g., configured for) communications with UFMS 524 and the controller (e.g., with only UFMS 524 and the controller).

At arrow 559, SMF 523 may transmit via AMF 522 and RAN 521, a PDU session establishment response message to the UE. And at block 561, the UE may establish a PDU session with the wireless network in accordance with the user plane connection established by SMF 523. In some cases, the PDU session is released and a new PDU session that supports the communication of command and control between UAV 520 and a controller for UAV 520 is established. In other cases, the PDU session is modified to support the communication of command and control between UAV 520 and a controller for UAV 520 is established.

Certain of the operations discussed above may be omitted, performed concurrently with other operations, and/or performed in a different order than provided above.

Figure 6:
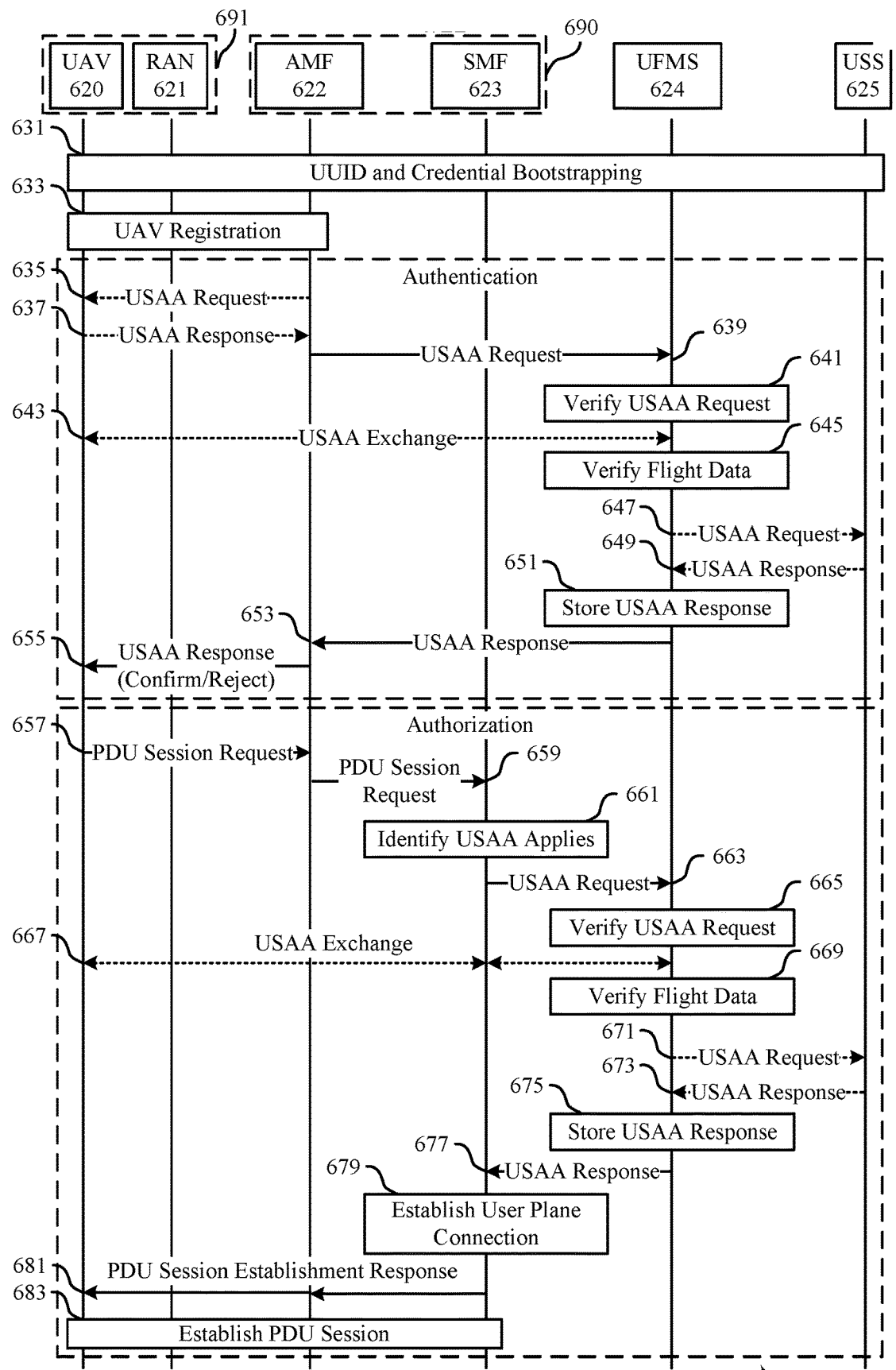
FIG. 6 illustrates aspects of a process for authorizing unmanned vehicles for operation in a network in accordance with various aspects of the present disclosure.

FIG. 6 illustrates aspects of a process for authorizing unmanned vehicles for operation in a network in accordance with various aspects of the present disclosure. Process flow 600 may be performed by UAV 620, which may be an example of UAV herein with reference to FIGS. 1 through 5. Process flow 600 may be also be performed by RAN 621, AMF 622, SMF 623, UFMS 624, and USS 625, which may be examples of a RAN, AMF, SMF, UFMS, and USS as described with reference to FIGS. 3 through 5. Core network 690 may be an example of core network 390, core network 490, or core network 590 of FIGS. 3 through 5. Radio access system 691 may be an example of radio access system 391, radio access system 491, or radio access system 591 of FIGS. 3 through 5.

In some examples, process flow 600 illustrates operations for authenticating and authorizing UAV 620 that are incorporated into a procedure for registering with and a procedure for establishing a data session a wireless network. In some cases, a UAV controller may perform a similar procedure.

At block 631, a UE that is coupled with UAV 620 may obtain a UUID and a set of one or more credentials, as similarly described with reference to block 331 of FIG. 3. At block 633, the UE may perform a procedure for registering with the wireless network, as similarly described with reference to block 433 of FIG. 4.

At arrow 635, AMF 622 may transmit via RAN 621 a USAA request message to the UE requesting that the UE provide the wireless network with information for authenticating and authorizing UAV 620 for flight operations.

At arrow 637, the UE may transmit via RAN 621 a USAA response message to AMF 622 that includes information for authenticating the UAV 620 based on the UUID and authorizing the UE for flight operations. The USAA response message may include a UUID and flight data for UAV 620.

At arrow 639, AMF 622 may send a USAA request message to UFMS 624 requesting that UFMS 624 authenticate and/or authorize UAV 620 for flight operations. In some cases, the USAA request may include a UUID and flight data for UAV 620. In some cases, AMF 622 obtains the UUID and flight data for including in the USAA request from the registration request message transmitted at during the UAV registration procedure—e.g., when AMF 322 does not transmit USAA request at arrow 635. In other cases, AMF 322 obtains the UUID and flight data from the USAA response message transmitted at arrow 637. In some cases, the USAA request message is transmitted using one or more security keys used to protect and verify the USAA request message.

At block 641, UFMS 624 may verify that the USAA request message received from AMF 622 is valid—e.g., using the one or more security keys. In some cases, UFMS 624 may use stored information for UAV 620 (e.g., a stored UUID) to determine if the received USAA message is valid.

At arrow 643, the UE and UFMS 624 may exchange USAA information. In some examples, UFMS 624 may send a USAA request message to UAV 620, and UAV 620 may send a USAA response message to UFMS 624. In some cases—e.g., if UFMS 624 obtains the information for performing the USAA in either the registration request message transmitted during the registration procedure or the USAA response message transmitted at arrow 637—UAV 620 and UFMS 624 may refrain from exchanging USAA information.

At block 645, UFMS 624 may attempt to verify the flight data received from UAV 620. In some cases, UFMS 624 may compare the received flight data with flight data that is stored for UAV 620. In some cases, UFMS 624 may authenticate an identity of UAV 620 based on a UUID and/or flight data that is stored for UAV 620. For example, UFMS 624 may use information such as an operator identity, UAV type, operator location, and flight path to authenticate the identity of UAV 620. In some cases, UFMS 624 may confirm an authorized association between UAV 620 and a controller for UAV 620.

At arrow 647, UFMS 624 may send a USAA request message to USS 625. In some cases, the USAA request message includes a UUID and flight data for UAV 620 and requests USS to perform a USAA procedure. In some examples, UFMS 624 may send the USAA request message after determining that no information for UAV 620 is stored at UFMS 624. In some examples, UFMS 624 may send the USAA request message after an attempt to authenticate UAV 620 fails.

At arrow 649, USS 625 may send a USAA response message to UFMS 624. In some cases, the USAA response message may include an indication of whether UAV 620 is authentic. In some cases, the USAA response message may include an indication of a duration for which an authentication is valid—e.g., the USAA response message may indicate that UAV 620 is authenticated for a lifetime of UAV 620. In some cases, USS 625 may revoke a persistent authentication at any time.

In some cases, USS 625 may provide conditional validity information for an authentication procedure—e.g., USS 625 may indicate information about a controller for UAV 620, a UAV type and category, a mission type, a location, a pilot identity, an operator identity, a flight plan, etc. In such cases, if the wireless network determines that the flight/mission parameters for UAV 620 do not satisfy the conditions (e.g., that the UAV 620 deviates from the approved conditions), the wireless network may trigger a USAA procedure for UAV 620. Having the wireless network initiate a USAA procedure based on a conditional authentication may reduce a processing load on USS 625.

At block 651, UFMS 624 may store the USAA response message generated by UFMS 624 or received from USS 625. In some examples, UFMS 624 may store flight data for UAV 620 that is received from USS 625.

At arrow 653, UFMS 624 may send a USAA response message to AMF 622. In some cases, the USAA response message may include an indication of whether the authentication procedure was successful and/or flight data for UAV 620 (if the procedure was successful).

At arrow 655, AMF 622 may transmit via RAN 621 either a USAA confirmation message (if the authentication procedure is successful) or a USAA rejection message (if the authentication procedure is unsuccessful) to the UE coupled with UAV 620. In some cases, the UE may establish a PDU session with the wireless network based on receiving a USAA confirmation message.

In some cases, the operations performed from arrow 635 to arrow 655 may be used to authenticate an identity of UAV 620. For example, UFMS 624 and/or USS 625 may use a received UUID and flight data (such as an operator identity, an operator location, an advertised type of UAV, a flight plan, etc.) to verify that UAV 620 is indeed the UAV associated with the received UUID. In some cases, the operations performed from arrow 635 to arrow 655 may be performed as part of the UAV registration procedure performed at block 633.

After receiving confirmation that the USAA procedure successfully authenticated an identity of UAV 620 and at arrow 657, the UE may transmit a PDU session request message to AMF 622 via RAN 621, as similarly described with reference to arrow 535 of FIG. 5.

At arrow 659, AMF 622 may transmit a PDU session request message to SMF 623, as similarly described with reference to arrow 537 of FIG. 5. In some cases, AMF 622 may also transmit an indication to SMF 623 that a USAA procedure is to be performed before a PDU session is established for the UE.

At block 661, SMF 623 may determine that a USAA procedure is to be performed for UAV 620, as similarly described with reference to block 539 of FIG. 5. In some cases, the USAA procedure is performed based on receiving an indication that a USAA procedure is to be performed in the PDU session request message received from AMF 622.

At arrow 663, SMF 623 may send a USAA request message to UFMS 624, as similarly described with reference to arrow 541 of FIG. 5. At block 665, UFMS may verify the received USAA request message, as similarly described with reference to block 543 of FIG. 5.

At arrow 667, the UE, SMF 623, and UFMS 624 may exchange USAA information, as similarly described with reference to arrow 545 of FIG. 5.

At block 669, UFMS 624 may attempt to verify flight data for UAV 520 based on stored flight data, as similarly described with reference to block 547 of FIG. 5. At arrow 671, UFMS 624 may send a USAA request message to USS 625, as similarly described with reference to arrow 549 of FIG. 5. At arrow 673, USS 625 may send a USAA response message to UFMS 624, as similarly described with reference to arrow 551 of FIG. 5. At block 675, UFMS 624 may store a USAA response, as similarly described with reference to block 553 of FIG. 5. At arrow 677, UFMS 624 may send a USAA response message to SMF 623, as similarly described with reference to arrow 555 of FIG. 5.

At block 679, SMF 623 may establish aspects of a user plane connection, as similarly described with reference to block 557 of FIG. 5. At arrow 681, SMF 623 may transmit via AMF 622 and RAN 621 a PDU session establishment response message to the UE, as similarly described with reference to arrow 559 of FIG. 5. And at block 683, the UE may establish a PDU session with the wireless network, as similarly described with reference to block 561 of FIG. 5.

In some cases, the operations performed from arrow 657 to arrow 681 may be used to authorize a flight plan for UAV 620 before a PDU session is established for the UE.

Certain of the operations discussed above may be omitted, performed concurrently with other operations, and/or performed in a different order than provided above.

Figure 7:
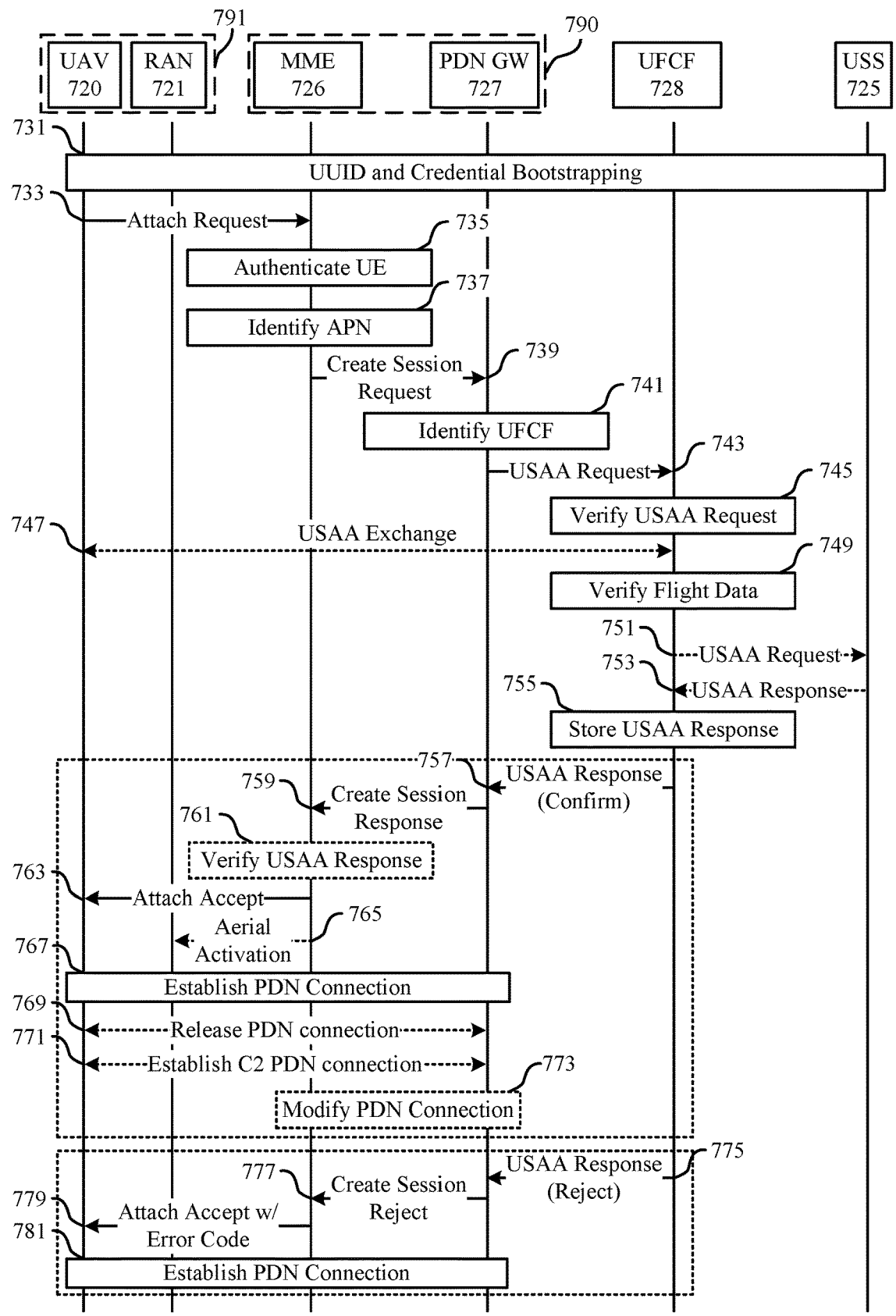
FIG. 7 illustrates aspects of a process for authorizing unmanned vehicles for operation in a network in accordance with various aspects of the present disclosure.

FIG. 7 illustrates aspects of a process for authorizing unmanned vehicles for operation in a network in accordance with various aspects of the present disclosure. Process flow 700 may be performed by UAV 720, which may be an example of UAV described herein with reference to FIGS. 1 through 6. Process flow 700 may be also be performed by RAN 721 and USS 725, which may be examples of a RAN and USS as described with reference to FIGS. 3 through 6. Process flow 700 may also be performed by MME 726, PDN GW 727, and UFCF 728. In some cases, core network 790 of a PLMN is configured in accordance with a legacy radio system (e.g., a 4G or LTE system) and includes MME 726 and PDN GW 727. In some cases, core network 790 also includes UFCF 728. In some cases, a flight management system (e.g., first flight management system 250 of FIG. 2) includes UFCF 728. In some cases, UFCF 728 may be an example of a UFMS as described with reference to FIGS. 3 through 6. Radio access system 791 may be an example of radio access system 391, radio access system 491, radio access system 591, or radio access system 691 of FIGS. 3 through 6.

In some examples, process flow 700 illustrates operations for authenticating and authorizing UAV 720 that are incorporated into a procedure for attaching with a wireless network. In some cases, a UAV controller may perform a similar procedure.

At block 731, a UE that is coupled with UAV 720 may obtain a UUID and a set of one or more credentials, as similarly described with reference to block 331 of FIG. 3.

At arrow 733, the UE may transmit via RAN 721 an attach request message to MME 726. In some cases, an attach request message may request that the wireless network establish a PDN connection for the UE. In some examples, the attach request message may include an EPS system management (ESM) container and a protocol configuration option (PCO) container. In some cases, a PCO container is a flexible data structure that can be used to convey previously undetermined (or otherwise unsupported) information and/or information types. In some cases, a name of an access point that is configured to support UAV operations (e.g., a UAV-APN) may be included in the ESM container. In some cases, a UAV-APN is associated with a default bearer that creates an exclusive communication path between the UE and UFCF 728. Also, a UUID and/or flight data for UAV 720 may be included in the PCO container. In some cases, the flight data includes a flight plan. In some cases, the flight data includes authorization information for a controller for UAV 720 and/or information about the controller, such as an address for user plane data to and from an UAV controller, e.g. a fully qualified domain name (FQDN), one or more IP addresses, etc.

At block 735, MME 726 may authenticate the UE and verify that the UE has a subscription for accessing the wireless network. In some cases, MME 726 may determine that the UE is associated with UAV 720. In some cases, MME 726 may be configured to decode the PCO information and obtain authorization information from UFCF 728 if a USAA procedure is successful.

At block 737, MME 726 may identify the access point indicated by the UE. In some cases, the access point is an access point configured to support UAV operation. In some cases, MME 726 identifies a particular access point based on determining that the UE has a subscription for aerial services.

At arrow 739, MME 726 may send a create session request message to PDN GW 727 requesting that PDN GW 727 establish a PDN connection with the UE. In some cases, the create session request message may include the PCO container and the encapsulated data.

At block 741, PDN GW 727 may identify UFCF 728 based on the information received in the create session request message. In some examples, PDN GW 727 identifies UFCF 728 based on a UUID for UAV 720.

At arrow 743, PDN GW may send a USAA request message to UFCF 728. In some cases, the USAA request may include the UUID and/or flight data for UAV 720.

At block 745, UFCF may verify the USAA request message, as similarly described with reference to block 353 of FIG. 3. At arrow 747, the UE and UFCF 728 may be exchanged USAA information, as similarly described with reference to arrow 355 of FIG. 3.

At block 749, UFCF 728 may attempt to verify flight data for UAV 720 based on stored flight data, as similarly described with reference to block 357 of FIG. 3. At arrow 751, UFCF 728 may send a USAA request message to USS 725, as similarly described with reference to arrow 359 of FIG. 3. At arrow 753, UFCF 728 may receive a USAA response message from USS 725, as similarly described with reference to arrow 361 of FIG. 3. At block 755, UFCF 728 may store the USAA response, as similarly described with reference to block 363 of FIG. 3.

In some cases, after a USAA procedure successfully authenticates UAV 720 and authorizes UAV 720 for flight operation and at arrow 757, UFCF 728 may send a USAA confirmation message to PDN GW 727 indicating that the USAA procedure was successfully completed for UAV 720. In some cases, the USAA confirmation message includes configuration information for the UE—e.g., the message may include information directing the UE to report a location continuously or at intervals. In some cases, the USAA confirmation message includes information for MME 726, such as confirmation of the USAA, information on the validity of the USAA, and/or possible quality of service (QoS) and RAN-related information.

At arrow 759, PDN GW 727 may send a create session response message to MME 726. In some cases, the create session response message includes a PCO container that includes a USAA response confirming that UAV 720 was successfully authenticated and authorized for flight operation. In some cases, before, concurrently with, or after sending the create session response message, PDN GW 727 may establish a user plane connection that provides a data communication path between the UE, UFCF 728, and a controller for UAV 720. In some cases, PDN GW 727 establishes the user plane connection after receiving a USAA response message (e.g., only after receiving a USAA response message) that indicates that the UAV 720 has been authenticated and authorized for flight operations. In some examples, the user plane connection may be established so that an exclusive communication path between the indicated controller and the UE is created. In some cases, the exclusive communication path may include UFCF 728 and/or USS 725.

In some examples, the exclusive communication path is established based on the information about the controller provided by the UE in the attach request message transmitted at arrow 733. In some cases, the exclusive communication path is established based on address information (e.g., one or more IP addresses, domain names, port numbers, etc.) provided by UFCF 728 and/or USS 725 in the USAA response message sent at arrow 757. The address information may enable the communication of user plane packets between the UE and the controller for UAV 720. In some cases, UFCF 728 and/or USS 725 generates the address information based on information about the controller included in the attach request message transmitted at arrow 733. In some cases, the address information causes user plane packets sent between the UE and the controller to pass through UFCF 728. In some cases, PDN GW 727 establishes packet filters for the user plane connection (e.g., based on the address information) that ensure that the UE is capable of (e.g., configured for) communications with UFMS 524 and the controller (e.g., with only UFMS 524 and the controller).

At block 761, MME 726 may verify the USAA response and may store the USAA response and configuration information for UAV 720.

At arrow 763, MME 726 may transmit via RAN 721 an attach accept message to the UE. In some cases, the attach accept message includes a PCO container that includes a USAA response confirming that an authentication and authorization of UAV 720 was successful.

At arrow 765, MME 726 may send an aerial services activation message to RAN 721, and RAN 721 may enable UAV-specific services to support a radio connection with the UE. In some cases, MME 726 sends the aerial services activation message based on determining that a USAA procedure was successfully performed.

At block 767, the UE may establish a PDN connection with the wireless network based on receiving the attach accept message. In some cases, establishing the PDN connection includes establishing a default bearer that enables communications between the UE and UFCF 728.

At arrow 769, the UE, MME 726, and PDN GW 727 may release the established PDN connection, and at arrow 771, the UE, MME 726, and PDN GW 727 may establish a Command & Control (C2) PDN connection. In some cases, establishing the C2 PDN connection includes establishing a PDN connection between the UE and the access point named in the attach request. The C2 PDN connection may be a connection used to convey data (e.g., command and control) between UAV 720 and a controller for UAV 720. In some cases, establishing the C2 PDN connection includes establishing a dedicated radio bearer that enables the communication of data between UAV 720 and a controller for UAV 720. In some examples, a first dedicated radio bearer is established for the communication of command and control data from the controller to UAV 720. In some examples, a second radio bearer is established for the communication of telemetry and video data from UAV 720 to the controller. In some cases, establishing the C2 PDN connection includes establishing a dedicated radio bearer that enables the communication of data between UAV 720 and UFCF 728. In some cases, MME 726 identifies an access point for the PDN connection that is known to MME 726 (e.g., known only to MME 726).

At block 773, instead of releasing and reestablishing a UAV-specific PDN connection, MME 726 and/or PDN GW 727 may modify the PDN connection to enable the communication of command and control data. In some examples, MME 726 and/or PDN GW 727 establishes packet filters that ensure that data for UAV 720 is communicated with authorized devices (e.g., only communicated with authorized devices; e.g., a controller for UAV 720). In some examples, PDN GW 727 establishes the packet filters based on an authorized association between UAV 720 and a controller for UAV 720 that is confirmed by UFCF 728.

In some cases, after a USAA procedure fails to authenticate UAV 720 and/or authorize UAV 720 for flight operation and at arrow 775, UFCF 728 may send a USAA rejection message to PDN GW 727 indicating that the USAA procedure failed for UAV 720.

At arrow 777, PDN GW 727 may send a create session reject message to MME 726. In some cases, the create session reject message includes a PCO container that includes a USAA response indicated that the authentication and authorization of UAV 720 failed.

At arrow 779, MME 726 may transmit via RAN 721 an attach accept message to the UE, where the attach accept message may include an error code for the PDN connection. In some cases, the attach accept message may include a PCO container that includes a USAA response indicating that the authentication and authorization of UAV 720 failed.

At block 781, the UE may attempt to establish a PDN connection with MME 726 and PDN GW 727. In some cases, a valid PDN connection may not be established—e.g., because the PDN connection may not address a valid access point. In some examples, the UE may determine that the USAA procedure failed based on a failure to establish a PDN connection. In some cases, the UE may initiate another USAA procedure based on an indication included in the attach accept message directing the UE to initiate the additional USAA procedure. In some cases, the UE may initiate another USAA procedure to a UAV-APN that is used to configure UUIDs and credentials. In other cases, the UE may initiate a procedure for establishing a PDN connection with MME 726, and MME 726 may use a default access point to perform a USAA procedure that allows connectivity between the UE and UFCF 728 (e.g., only allows connectivity between the UE and UFCF 728).

In some cases, MME 726 is modified to support the performance of certain operations. For example, MME 726 may be modified to support a capability for processing UUID and flight data received in the PCO container. MME 726 may also be modified to support a capability for processing a USAA response and performing operations (e.g., transmitting an aerial services activation message) based on the processed USAA response. In some cases, a subset of MMEs in a wireless network are modified to support this functionality for the UAVs that connect to the wireless network. In some examples, a particular data control network identity is assigned to all of the UAVs in a wireless network, and MMEs (e.g., only MMEs) that have a connection to the particular data control networks may be modified to support the additional functionalities. In some examples, an RRC message (e.g., RRC message 5) is modified to include an indication of a type of device (e.g., UAV), and RAN 721 is configured to select an MME that is configured to support UAVs.

Certain of the operations discussed above may be omitted, performed concurrently with other operations, and/or performed in a different order than provided above.

Figure 8:
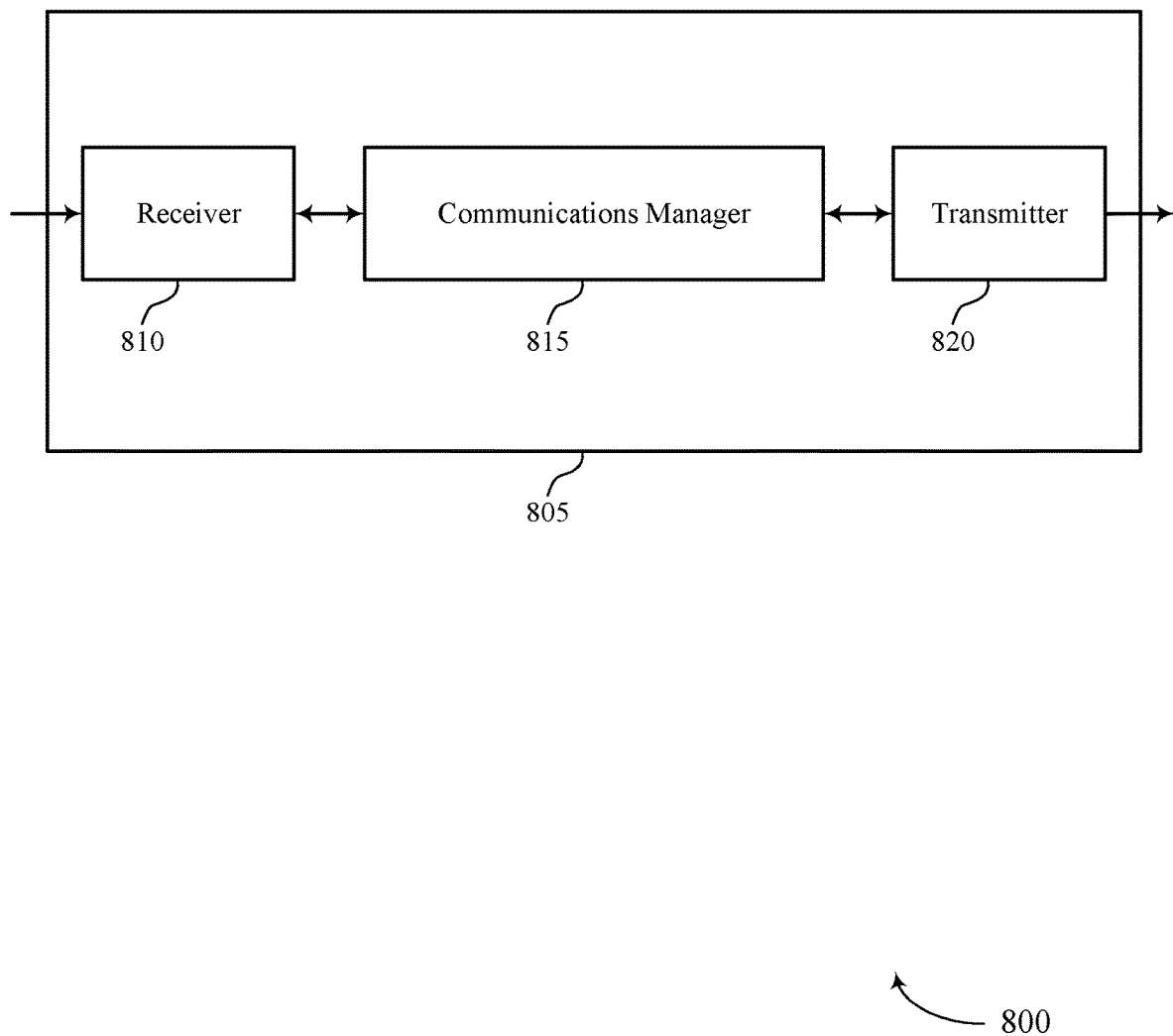
FIGS. 8 and 9 show block diagrams of devices that support authorizing unmanned vehicles for operation in a network in accordance with aspects of the present disclosure.

FIG. 8 shows a block diagram 800 of a device 805 that supports authorizing unmanned vehicles for operation in a network in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to authorizing unmanned vehicles for operation in a network, etc.). Information may be passed on to other components of the device 805. The receiver 810 may be an example of aspects of the transceiver 1120 described with reference to FIG. 11. The receiver 810 may utilize a single antenna or a set of one or more antennas.

The communications manager 815 may transmit a first message to a network, the first message including a network identifier for the wireless device, an aerial identifier for the aerial vehicle, and operational information for the aerial vehicle, establish a control plane connection with the network based on the network identifier, where a request is sent to an aerial function management system for verification of the aerial vehicle based on the aerial identifier, receive, in a control plane, a second message from the network that indicates an approval of flight parameters (e.g., a flight path) for the aerial vehicle, the second message configured to trigger an establishment of a data session between the wireless device and the network, and establish the data session with the network based on the second message.

The communications manager 815 may also transmit a first message to a network, the first message including a network identifier for the wireless device, an aerial identifier for the aerial vehicle, and operational information for the aerial vehicle, where the first message is configured to establish a data session with the network, and where a request is sent to an aerial function management system for verification of the aerial vehicle based on the first message, receive a second message from the network based on transmitting the first message, the second message including an approval of the aerial vehicle (e.g., a positive authentication of the aerial vehicle), an approval of the flight parameters for the aerial vehicle) and being configured to trigger an establishment of the data session, and establish the data session with the network based on receiving the second message. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of one or more antennas.

Figure 9:
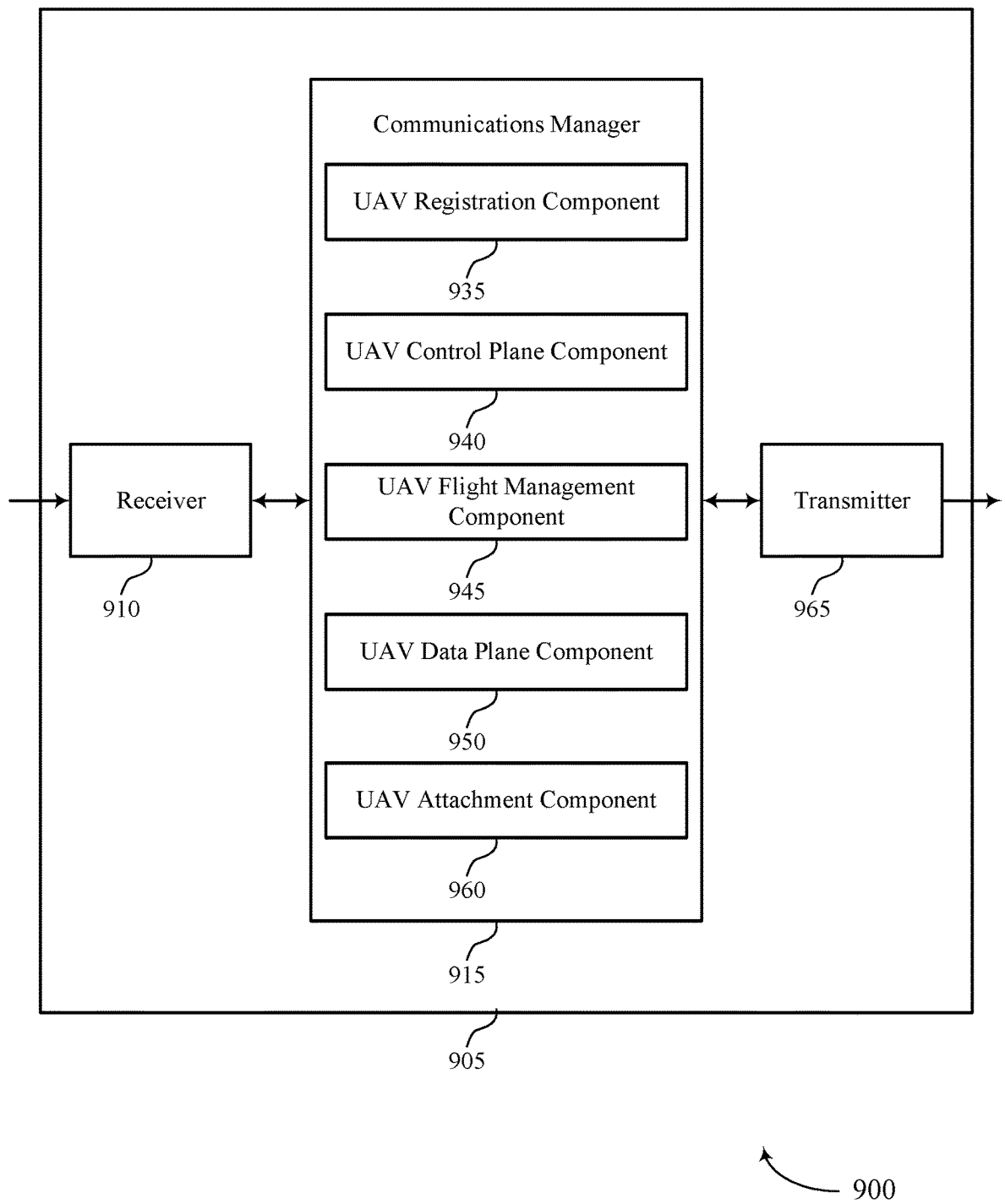

FIG. 9 shows a block diagram 900 of a device 905 that supports authorizing unmanned vehicles for operation in a network in accordance with aspects of the present disclosure. The device 905 may be an example of aspects of a device 805, or a UE 115 as described herein. The device 905 may include a receiver 910, a communications manager 915, and a transmitter 965. The device 905 may also include a processor. Each of these components may be in communication with one another (e.g., via one or more buses).

The receiver 910 may receive information such as packets, user data, or control information associated with various information channels (e.g., control channels, data channels, and information related to authorizing unmanned vehicles for operation in a network, etc.). Information may be passed on to other components of the device 905. The receiver 910 may be an example of aspects of the transceiver 1120 described with reference to FIG. 11. The receiver 910 may utilize a single antenna or a set of one or more antennas.

The communications manager 915 may be an example of aspects of the communications manager 815 as described herein. The communications manager 915 may include a UAV registration component 935, a UAV control plane component 940, a UAV flight management component 945, a UAV data plane component 950, and a UAV attachment component 960. The communications manager 915 may be an example of aspects of the communications manager 1110 described herein.

In a first example, the UAV registration component 935 may transmit a first message to a network, the first message including a network identifier for the wireless device, an aerial identifier for the aerial vehicle, and operational information for the aerial vehicle.

The UAV control plane component 940 may establish a control plane connection with the network based on the network identifier, where a request is sent to an aerial function management system for verification of the aerial vehicle based on the aerial identifier.

The UAV flight management component 945 may receive (e.g., in a control plane) a second message from the network that indicates an approval of the aerial vehicle (e.g., an indication of a positive authentication of the aerial vehicle, an approval of a flight path for the aerial vehicle), the second message configured to trigger an establishment of a data session between the wireless device and the network.

The UAV data plane component 950 may establish the data session with the network based on the second message.

In a second example, the UAV attachment component 960 may transmit a first message to a network, the first message including a network identifier for the wireless device, an aerial identifier for the aerial vehicle, and operational information for the aerial vehicle, where the first message is configured to establish a data session with the network, and where a request is sent to an aerial function management system for verification of the aerial vehicle based on the first message.

The UAV flight management component 945 may receive (e.g., in response to the first message) a second message from the network that indicates an approval of the aerial vehicle (e.g., an indication of a positive authentication of the aerial vehicle, an approval of a flight path for the aerial vehicle), the second message configured to trigger an establishment of a data session between the wireless device and the network.

The UAV data plane component 950 may establish the data session with the network based on receiving the second message.

The transmitter 965 may transmit signals generated by other components of the device 905. In some examples, the transmitter 965 may be collocated with a receiver 910 in a transceiver module. For example, the transmitter 965 may be an example of aspects of the transceiver 1120 described with reference to FIG. 11. The transmitter 965 may utilize a single antenna or a set of one or more antennas.

Figure 10:
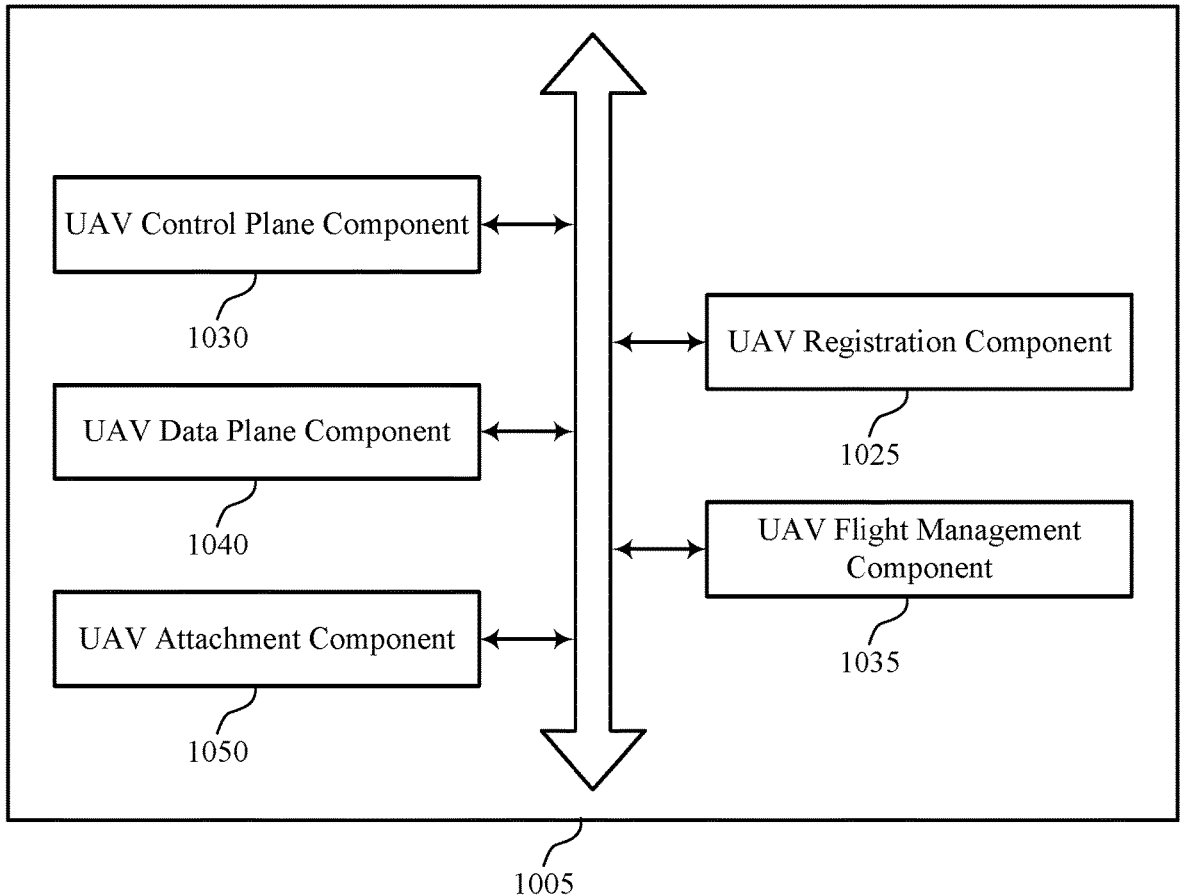
FIG. 10 shows a block diagram of a communications manager that supports authorizing unmanned vehicles for operation in a network in accordance with aspects of the present disclosure.

FIG. 10 shows a block diagram 1000 of a communications manager 1005 that supports authorizing unmanned vehicles for operation in a network in accordance with aspects of the present disclosure. The communications manager 1005 may be an example of aspects of a communications manager 815, a communications manager 915, or a communications manager 1110 described herein. The communications manager 1005 may include a UAV registration component 1025, a UAV control plane component 1030, a UAV flight management component 1035, a UAV data plane component 1040, and a UAV attachment component 1050. Each of these modules may communicate, directly or indirectly, with one another (e.g., via one or more buses).

The UAV registration component 1025 may transmit a first message to a network, the first message including a network identifier for the wireless device, an aerial identifier for the aerial vehicle, and operational information for the aerial vehicle.

The UAV control plane component 1030 may establish a control plane connection with the network based on the network identifier, where a request is sent to an aerial function management system for verification of the aerial vehicle based on the aerial identifier.

In some examples, the UAV control plane component 1030 may receive a second message from the network based on transmitting the first message, the second message including a positive authentication of the aerial vehicle and an approval of a flight path for the aerial vehicle and being configured to trigger an establishment of the data session.

The UAV flight management component 1035 may receive, in a control plane, a second message from the network that indicates an approval of a flight path for the aerial vehicle, the second message configured to trigger an establishment of a data session between the wireless device and the network.

In some examples, the UAV flight management component 1035 may receive, in the control plane, a third message from the network based on the request sent to the aerial function management system, the third message indicating a positive authentication of the aerial vehicle and being received before the second message.

In some examples, the UAV flight management component 1035 may identify an access point that provides aerial services, where the data session is released based on the access point, and a second data session is established based on the access point, where an exclusive communication path is established between the wireless device and a controller for the aerial vehicle via the access point.

The UAV data plane component 1040 may establish the data session with the network based on the second message.

In some examples, the UAV data plane component 1040 may establish the data session with the network based on receiving the second message.

In some examples, the UAV data plane component 1040 may transmit, in the control plane, a fourth message to the network based on receiving the third message, the fourth message configured to request the establishment of the data session and being transmitted before the second message.

The UAV attachment component 1050 may transmit a first message to a network, the first message including a network identifier for the wireless device, an aerial identifier for the aerial vehicle, and operational information for the aerial vehicle, where the first message is configured to establish a data session with the network, and where a request is sent to an aerial function management system for verification of the aerial vehicle based on the first message.

In some examples, the UAV attachment component 1050 may encapsulate the first indication of the access point in an Evolved Packet System (EPS) Session Management (ESM) Container and the aerial identifier, the operational information for the aerial vehicle, and the second indication of the controller for the aerial vehicle in a protocol configuration option (PCO) field.

In some cases, the first message include a first indication of an access point that provides aerial services, the aerial identifier, the operational information for the aerial vehicle, and a second indication of a controller for the aerial vehicle.

Figure 11:
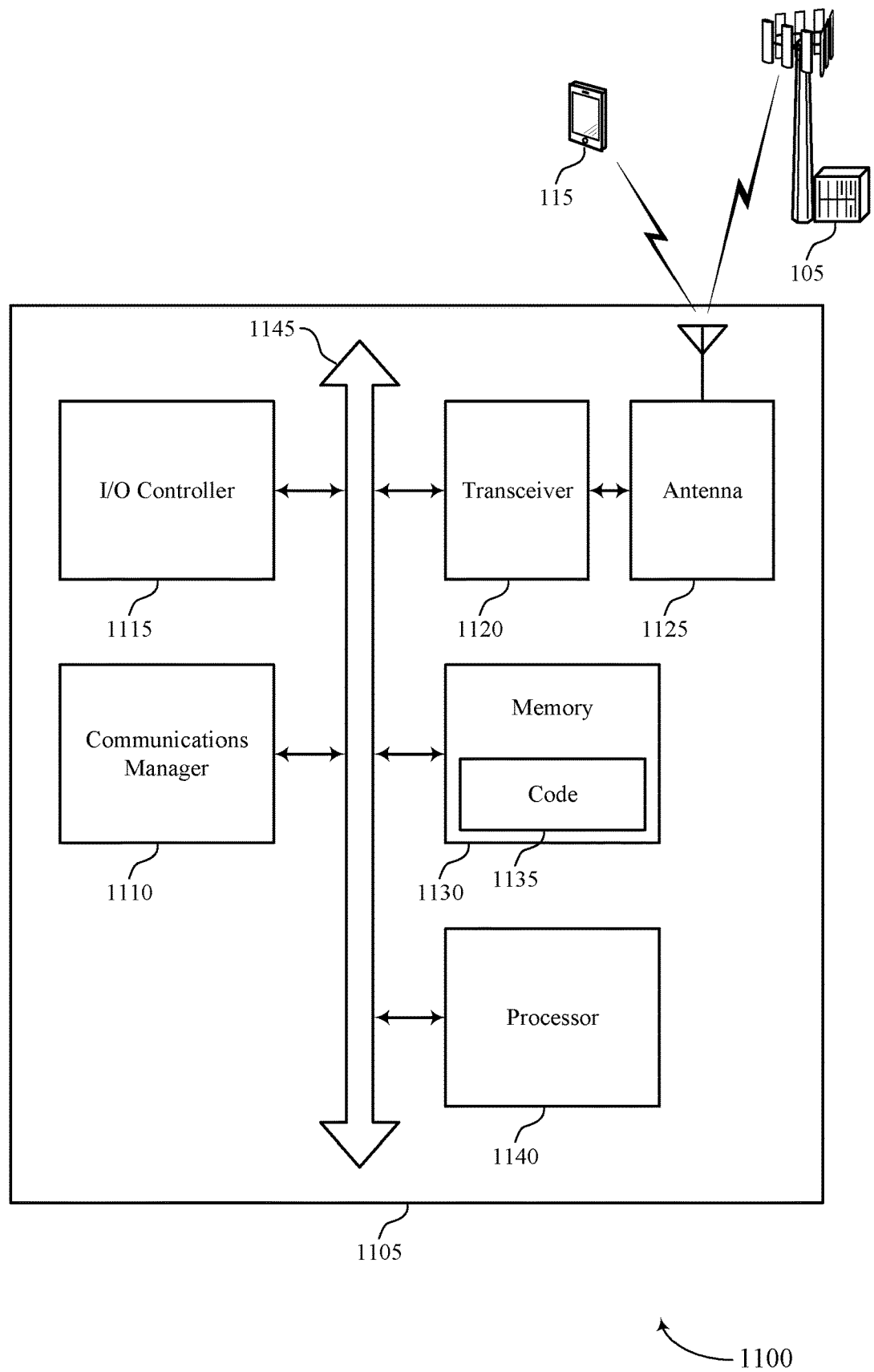
FIG. 11 shows a diagram of a system including a device that supports authorizing unmanned vehicles for operation in a network in accordance with aspects of the present disclosure.

FIG. 11 shows a diagram of a system 1100 including a device 1105 that supports authorizing unmanned vehicles for operation in a network in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 815 may transmit a first message to a network, the first message including a network identifier for the wireless device, an aerial identifier for the aerial vehicle, and operational information for the aerial vehicle, establish a control plane connection with the network based on the network identifier, where a request is sent to an aerial function management system for verification of the aerial vehicle based on the aerial identifier, receive, in a control plane, a second message from the network that indicates an approval of a flight path for the aerial vehicle, the second message configured to trigger an establishment of a data session between the wireless device and the network, and establish the data session with the network based on the second message.

The communications manager 815 may also transmit a first message to a network, the first message including a network identifier for the wireless device, an aerial identifier for the aerial vehicle, and operational information for the aerial vehicle, where the first message is configured to establish a data session with the network, and where a request is sent to an aerial function management system for verification of the aerial vehicle based on the first message, receive a second message from the network based on transmitting the first message, the second message including a positive authentication of the aerial vehicle and an approval of a flight path for the aerial vehicle and being configured to trigger an establishment of the data session, and establish the data session with the network based on receiving the second message.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting authorizing unmanned vehicles for operation in a network).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
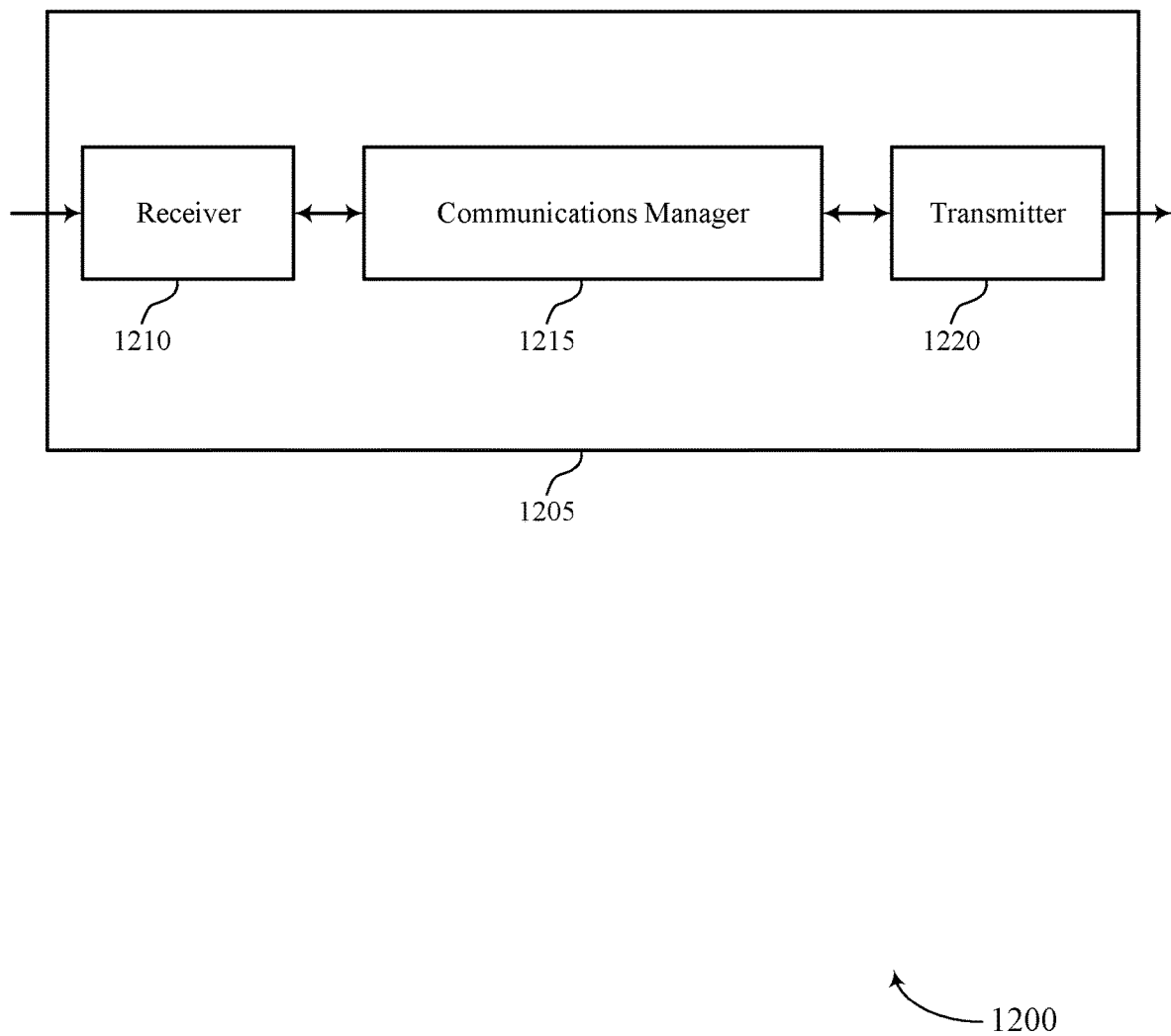
FIGS. 12 and 13 show block diagrams of devices that support authorizing unmanned vehicles for operation in a network in accordance with aspects of the present disclosure.

FIG. 12 shows a block diagram 1200 of a device 1205 that supports authorizing unmanned vehicles for operation in a network in accordance with aspects of the present disclosure. The device 1205 may be an example of aspects of a core network 130 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to authorizing unmanned vehicles for operation in a network, etc.). Information may be passed on to other components of the device 1205. The receiver 1210 may be an example of aspects of the transceiver 1520 described with reference to FIG. 15. The receiver 1210 may utilize a single antenna or a set of one or more antennas.

The communications manager 1215 may receive a message from a wireless device that is coupled with an aerial vehicle, the message including a network identifier for the wireless device, an aerial identifier for the aerial vehicle, and operational information for the aerial vehicle, establish a control plane connection with the wireless device based on the network identifier, send, in a control plane, a request to an aerial function management system for verification of the aerial vehicle based on the aerial identifier, where the request includes the aerial identifier and the operational information, receive, in the control plane, a response from the aerial function management system including an approval of a flight path for the aerial vehicle, and establish a data session for the wireless device based on the approval of the flight path.

The communications manager 1215 may also receive a message from a wireless device that is coupled with an aerial vehicle, the message including a network identifier for the wireless device, an aerial identifier for the aerial vehicle, and operational information for the aerial vehicle, where the message is configured to establish a control plane connection and a data session with the network, determine that the wireless device is coupled with the aerial vehicle based on the network identifier being associated with an aerial subscription, send a request to an aerial function management system for verification of the aerial vehicle based on the determining, where the request includes the aerial identifier and the operational information, receive a response from the aerial function management system including a positive authentication of the aerial vehicle and an approval of a flight path for the aerial vehicle, and establish the data session for the wireless device based on the positive authentication of the aerial vehicle and the approval of the flight path. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of one or more antennas.

Figure 13:
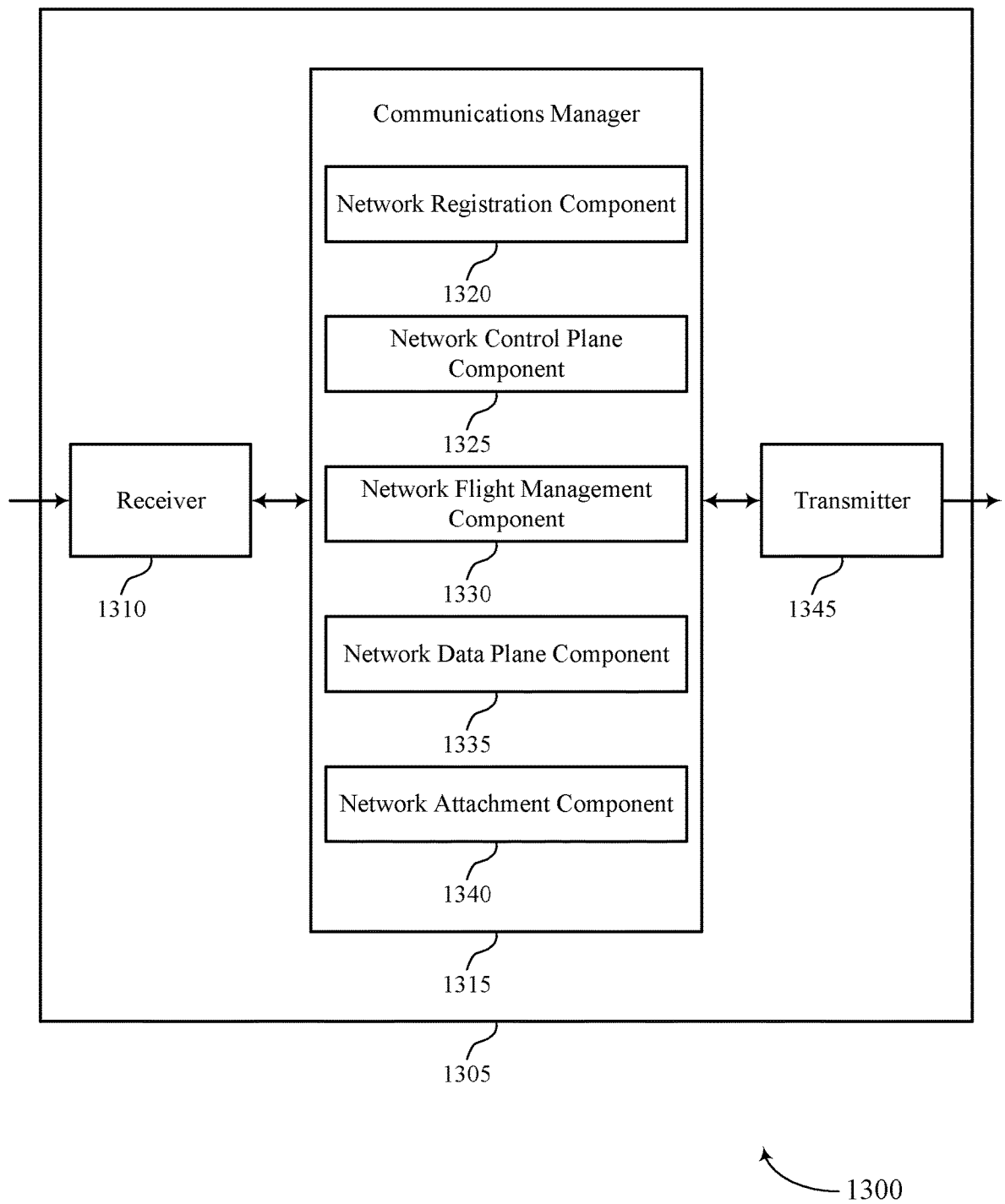

FIG. 13 shows a block diagram 1300 of a device 1305 that supports authorizing unmanned vehicles for operation in a network in accordance with aspects of the present disclosure. The device 1305 may be an example of aspects of a device 1205, or core network 130 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to authorizing unmanned vehicles for operation in a network, etc.). Information may be passed on to other components of the device 1305. The receiver 1310 may be an example of aspects of the transceiver 1520 described with reference to FIG. 15. The receiver 1310 may utilize a single antenna or a set of one or more antennas.

The communications manager 1315 may be an example of aspects of the communications manager 1215 as described herein. The communications manager 1315 may include a network registration component 1320, a network control plane component 1325, a network flight management component 1330, a network data plane component 1335, and a network attachment component 1340. The communications manager 1315 may be an example of aspects of the communications manager 1510 described herein.

The network registration component 1320 may receive a message from a wireless device that is coupled with an aerial vehicle, the message including a network identifier for the wireless device, an aerial identifier for the aerial vehicle, and operational information for the aerial vehicle.

The network control plane component 1325 may establish a control plane connection with the wireless device based on the network identifier.

The network flight management component 1330 may send, in a control plane, a request to an aerial function management system for verification of the aerial vehicle based on the aerial identifier, where the request includes the aerial identifier and the operational information and receive, in the control plane, a response from the aerial function management system including an approval of a flight path for the aerial vehicle.

The network data plane component 1335 may establish a data session for the wireless device based on the approval of the flight path.

The network attachment component 1340 may receive a message from a wireless device that is coupled with an aerial vehicle, the message including a network identifier for the wireless device, an aerial identifier for the aerial vehicle, and operational information for the aerial vehicle, where the message is configured to establish a control plane connection and a data session with the network.

The network registration component 1320 may determine that the wireless device is coupled with the aerial vehicle based on the network identifier being associated with an aerial subscription.

The network flight management component 1330 may send a request to an aerial function management system for verification of the aerial vehicle based on the determining, where the request includes the aerial identifier and the operational information and receive a response from the aerial function management system including a positive authentication of the aerial vehicle and an approval of a flight path for the aerial vehicle.

The network data plane component 1335 may establish the data session for the wireless device based on the positive authentication of the aerial vehicle and the approval of the flight path.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of one or more antennas.

Figure 14:
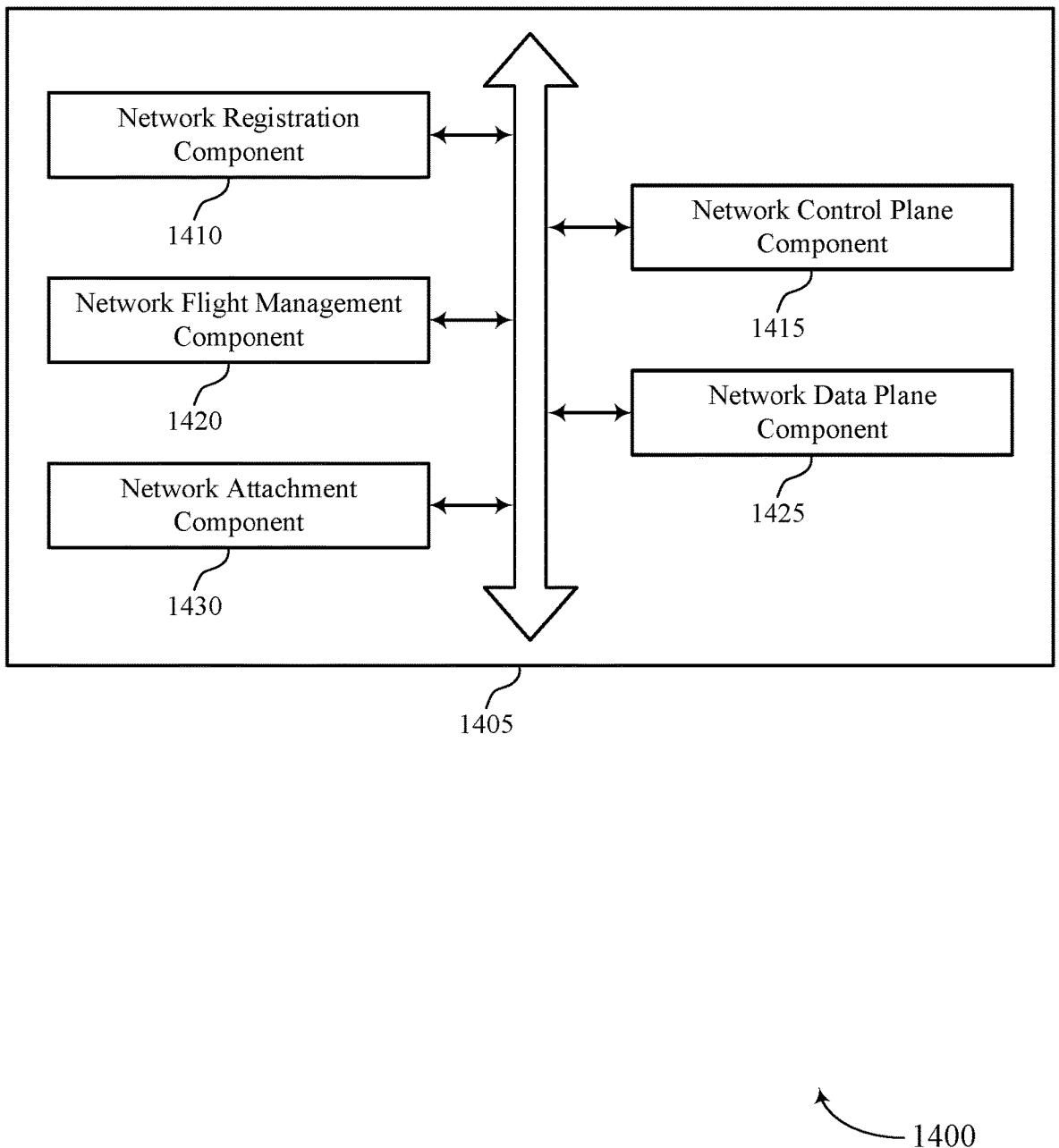
FIG. 14 shows a block diagram of a communications manager that supports authorizing unmanned vehicles for operation in a network in accordance with aspects of the present disclosure.

FIG. 14 shows a block diagram 1400 of a communications manager 1405 that supports authorizing unmanned vehicles for operation in a network in accordance with aspects of the present disclosure. The communications manager 1405 may be an example of aspects of a communications manager 1215, a communications manager 1315, or a communications manager 1510 described herein. The communications manager 1405 may include a network registration component 1410, a network control plane component 1415, a network flight management component 1420, a network data plane component 1425, and a network attachment component 1430. Each of these modules may communicate, directly or indirectly, with one another (e.g., via one or more buses).

The network registration component 1410 may receive a message from a wireless device that is coupled with an aerial vehicle, the message including a network identifier for the wireless device, an aerial identifier for the aerial vehicle, and operational information for the aerial vehicle.

In some examples, the network registration component 1410 may determine that the wireless device is coupled with the aerial vehicle based on the network identifier being associated with an aerial subscription.

In some examples, the network registration component 1410 may match the aerial identifier with an entry in a list of aerial identifiers based on receiving the message.

In some examples, the network registration component 1410 may verify that the wireless device has a subscription with the network based on the message.

In some examples, the network registration component 1410 may determine that the wireless device is coupled with the aerial vehicle based on the subscription.

In some examples, the network registration component 1410 may transmit a second message to the wireless device, the second message indicating that the procedure for the verification of the aerial vehicle is to be performed before the data session is established and being configured to accept the registration for the wireless device, where the control plane connection is established based on transmitting the second message.

In some cases, the operational information includes an identity of an operator, a characteristic of the aerial vehicle, an indication of a controller for the aerial vehicle, the flight path, or any combination thereof.

The network control plane component 1415 may establish a control plane connection with the wireless device based on the network identifier.

In some examples, the network control plane component 1415 may assign a state to the wireless device in the control plane based on the aerial identifier, where user plane data that addresses the wireless device is blocked while the state is assigned to the wireless device.

In some examples, the network control plane component 1415 may remove the state upon establishing the data session.

In some examples, the network control plane component 1415 may receive a third message from the wireless device based on transmitting the second message, the third message configured to request an establishment of the data session.

The network flight management component 1420 may send, in a control plane, a request to an aerial function management system for verification of the aerial vehicle based on the aerial identifier, where the request includes the aerial identifier and the operational information.

In some examples, the network flight management component 1420 may receive, in the control plane, a response from the aerial function management system including an approval of a flight path for the aerial vehicle.

In some examples, sending a request to an aerial function management system for verification of the aerial vehicle based on the determining, where the request includes the aerial identifier and the operational information.

In some examples, the network flight management component 1420 may receive a response from the aerial function management system including a positive authentication of the aerial vehicle and an approval of a flight path for the aerial vehicle.

In some examples, the network flight management component 1420 may determine an identity of the aerial function management system based on the aerial identifier.

In some examples, the network flight management component 1420 may initiate a procedure for the verification of the aerial vehicle based on the matching.

In some examples, the network flight management component 1420 may determine, based on the aerial identifier, a procedure for the verification of the aerial vehicle is to be performed before the data session is established for the wireless device.

In some examples, the network flight management component 1420 may transmit a second message to the wireless device based on establishing the control plane connection, the second message configured to request information for the verification of the aerial vehicle.

In some examples, the network flight management component 1420 may receive the aerial identifier for the aerial vehicle and the operational information for the aerial vehicle based on the second message.

In some examples, the network flight management component 1420 may receive a second response from the aerial function management system based on sending the request, the second response indicating a positive authentication of the aerial vehicle and being received before the response.

In some examples, the network flight management component 1420 may transmit a second message to the wireless device, the second message configured to indicate the positive authentication of the aerial vehicle to the wireless device based on receiving the second response.

In some examples, the network flight management component 1420 may send a second request to the aerial function management system for authorization of the flight path based on the second message, where the response indicating the approval of the flight path is received based on sending the second request.

In some examples, the network flight management component 1420 may identify the aerial function management system based on the aerial identifier.

In some examples, the network flight management component 1420 may transmit a second message to the wireless device based on receiving the response from the aerial function management system, the second message including the positive authentication of the aerial vehicle and the approval of the flight path and being configured to trigger an establishment of the data session.

In some examples, the network flight management component 1420 may identify an access point for routing commands between the wireless device and a controller for the aerial vehicle based on the message.

In some examples, the network flight management component 1420 may verify an authenticity of the response received from the aerial function management system.

In some examples, the network flight management component 1420 may store configuration information for the aerial vehicle based on verifying the authenticity.

In some examples, the network flight management component 1420 may transmit a second message to the wireless device based on verifying the authenticity of the response, the second message including the positive authentication of the aerial vehicle and the approval of the flight path and being configured to trigger an establishment of the data session.

In some examples, the network flight management component 1420 may send a second message to a radio access network based on receiving the response from the aerial function management system, the second message including information for supporting a radio connection of aerial vehicles.

In some cases, the second message includes the aerial identifier for the aerial vehicle, the operational information for the aerial vehicle, or both.

The network data plane component 1425 may establish a data session for the wireless device based on the approval of the flight path.

In some examples, the network data plane component 1425 may establish the data session for the wireless device based on the positive authentication of the aerial vehicle and the approval of the flight path.

In some examples, the network data plane component 1425 may generate a traffic filter for communications with the wireless device based on receiving the response indicating the approval of the flight path, where an exclusive communication path between the wireless device and a controller for the aerial vehicle is established based on the traffic filter.

In some examples, the network data plane component 1425 may receive, in a data plane, a command for the aerial vehicle from a controller for the aerial vehicle based on establishing the data session.

In some examples, the network data plane component 1425 may transmit, in the data plane, the command to the aerial vehicle.

In some examples, the network data plane component 1425 may release the data session based on identifying the access point.

In some examples, the network data plane component 1425 may establish a second data session based on the access point, where an exclusive communication path is established between the wireless device and the controller via the access point.

In some examples, the network data plane component 1425 may generate a traffic filter for communications with the wireless device based on establishing the data session, where an exclusive communication path between the wireless device and a controller for the aerial vehicle is established based on the traffic filter.

The network attachment component 1430 may receive a message from a wireless device that is coupled with an aerial vehicle, the message including a network identifier for the wireless device, an aerial identifier for the aerial vehicle, and operational information for the aerial vehicle, where the message is configured to establish a control plane connection and a data session with the network.

In some cases, the message include a first indication of an access point that provides aerial services and a configurable set of parameters that includes the aerial identifier, the operational information for the aerial vehicle, and a second indication of a controller for the aerial vehicle.

In some cases, the first indication of the access point is included in an Evolved Packet System (EPS) Session Management (ESM) Container and the configurable set of parameters is included in a protocol configuration option (PCO) field.

Figure 15:
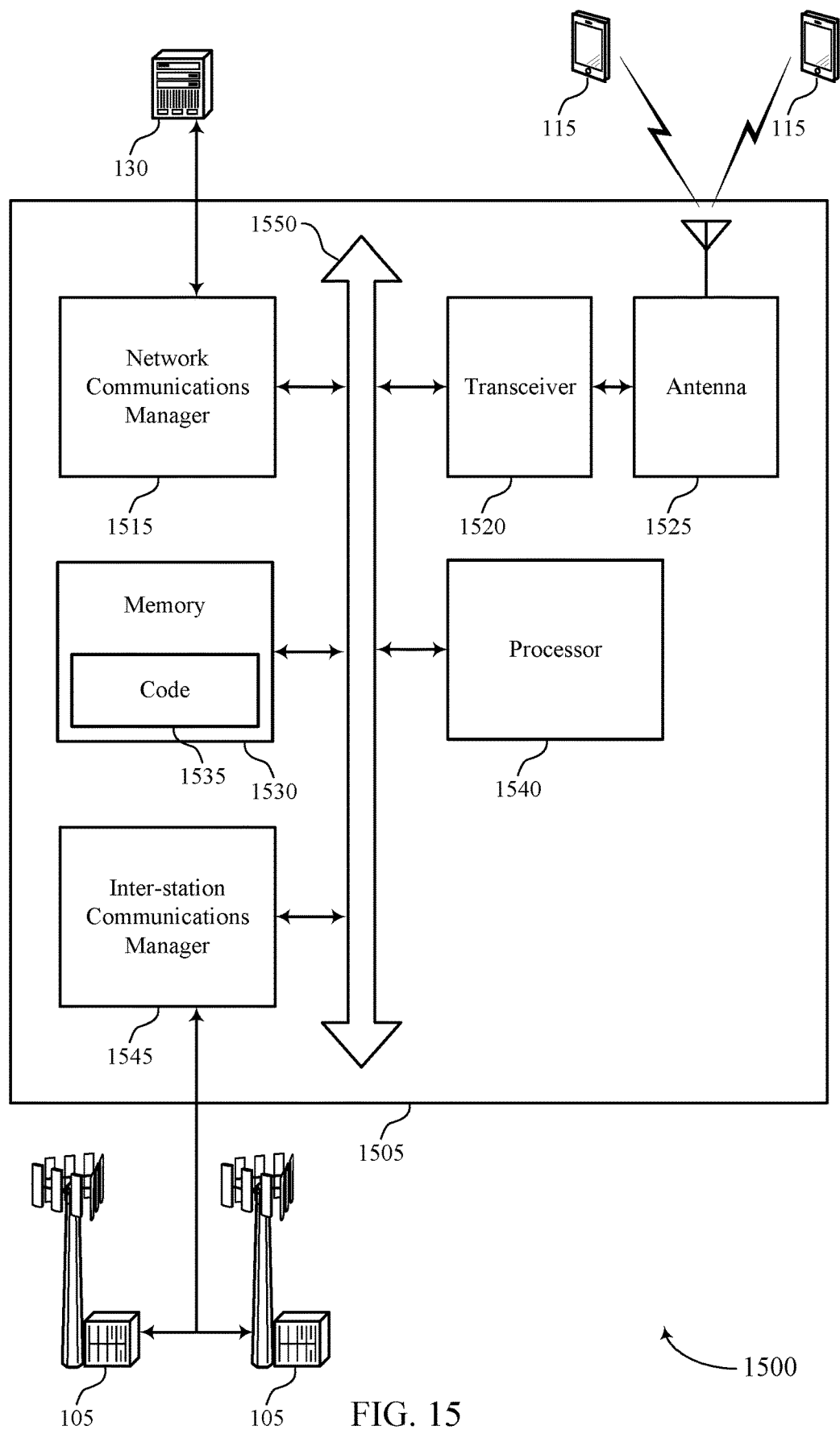
FIG. 15 shows a diagram of a system including a device that supports authorizing unmanned vehicles for operation in a network in accordance with aspects of the present disclosure.

FIG. 15 shows a diagram of a system 1500 including a device 1505 that supports authorizing unmanned vehicles for operation in a network in accordance with aspects of the present disclosure. The device 1505 may be an example of or include the components of device 1205, device 1305, a base station 105, as described herein. The device 1505 may include components for bi-directional voice and data communications including components for transmitting and receiving communications, including a network communications manager 1515, a transceiver 1520, an antenna 1525, memory 1530, a processor 1540, and an inter-station communications manager 1545. These components may be in electronic communication via one or more buses (e.g., bus 1550).

In some cases, the core network 130 may include a communications manager 1510. The communications manager 1510 may receive a message from a wireless device that is coupled with an aerial vehicle, the message including a network identifier for the wireless device, an aerial identifier for the aerial vehicle, and operational information for the aerial vehicle, establish a control plane connection with the wireless device based on the network identifier, send, in a control plane, a request to an aerial function management system for verification of the aerial vehicle based on the aerial identifier, where the request includes the aerial identifier and the operational information, receive, in the control plane, a response from the aerial function management system including an approval of a flight path for the aerial vehicle, and establish a data session for the wireless device based on the approval of the flight path.

The communications manager 1510 may also receive a message from a wireless device that is coupled with an aerial vehicle, the message including a network identifier for the wireless device, an aerial identifier for the aerial vehicle, and operational information for the aerial vehicle, where the message is configured to establish a control plane connection and a data session with the network, determine that the wireless device is coupled with the aerial vehicle based on the network identifier being associated with an aerial subscription, send a request to an aerial function management system for verification of the aerial vehicle based on the determining, where the request includes the aerial identifier and the operational information, receive a response from the aerial function management system including a positive authentication of the aerial vehicle and an approval of a flight path for the aerial vehicle, and establish the data session for the wireless device based on the positive authentication of the aerial vehicle and the approval of the flight path.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting authorizing unmanned vehicles for operation in a network).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
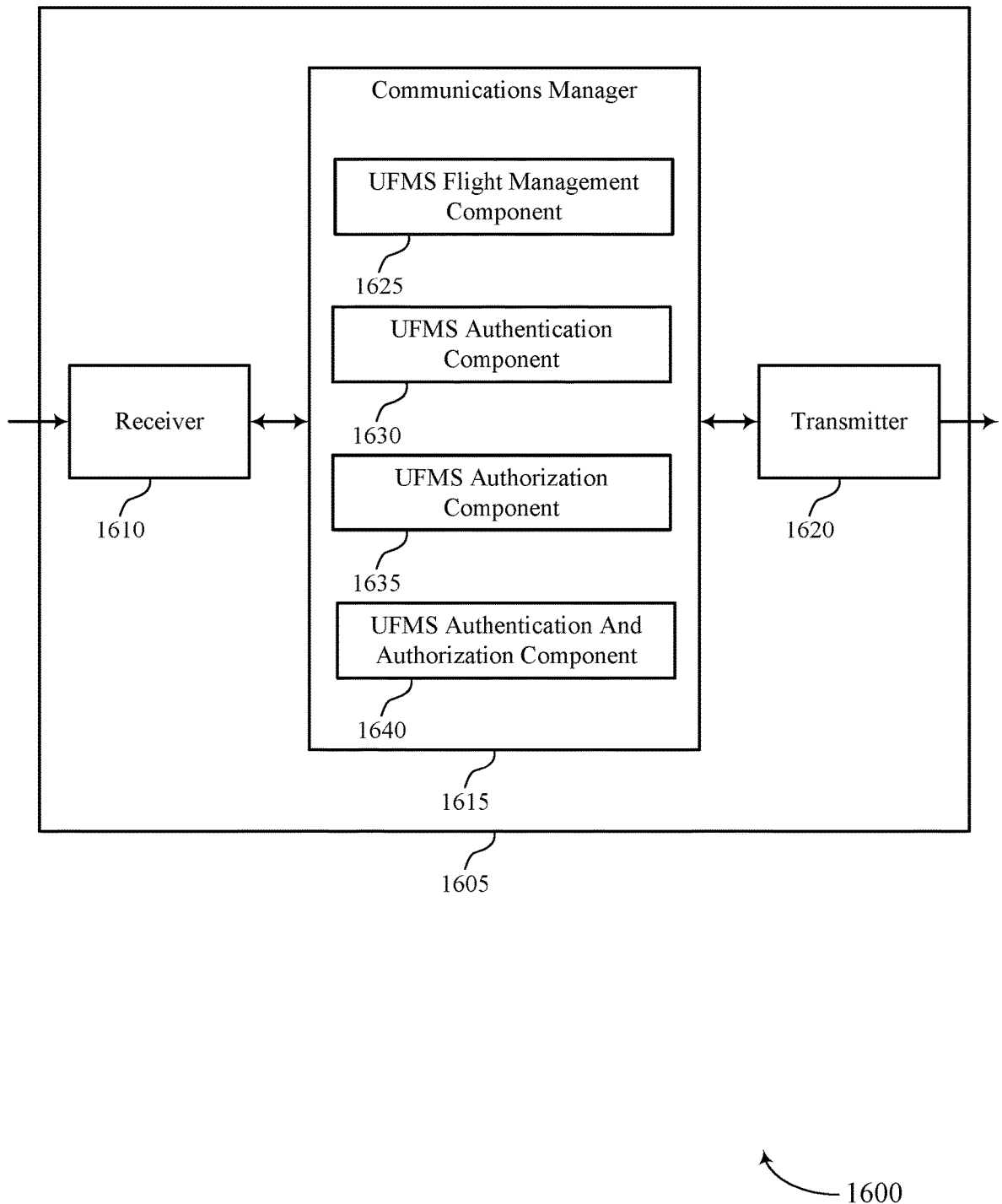
FIG. 16 shows a block diagram of a device that supports authorizing unmanned vehicles for operation in a network in accordance with aspects of the present disclosure.

FIG. 16 shows a block diagram 1600 of a device 1605 that supports authorizing unmanned vehicles for operation in a network in accordance with aspects of the present disclosure. The device 1605 may be an example of aspects of a flight management system as described herein. In some cases, device 1605 may be incorporated into the system 1500, as described with reference to FIG. 15. In some examples, device 1605 may be incorporated into core network 130. In other cases, device 1605 may be external to the system 1500, as described with reference to FIG. 15. In some examples, device 1605 may act as an intermediary device between core network 130 and a flight control system.

The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to authorizing unmanned vehicles for operation in a network, etc.). Information may be passed on to other components of the device 1605. The receiver 1610 may utilize a single antenna or a set of one or more antennas.

The communications manager 1615 may include a UFMS flight management component 1625, a UFMS authentication component 1630, a UFMS authorization component 1635, and a UFMS authentication and authorization component 1640. Each of these modules may communicate, directly or indirectly, with one another (e.g., via one or more buses).

The UFMS flight management component 1625 may receive, from a network, a request for a verification of an aerial vehicle that is coupled with a wireless device, the request including an aerial identifier for the aerial vehicle and operational information for the aerial vehicle.

In some examples, the UFMS flight management component 1625 may receive, from a network, a request for a verification of an aerial vehicle that is coupled with a wireless device while a procedure for establishing a data session is being performed between the network and the wireless device, the request including an aerial identifier for the aerial vehicle and operational information for the aerial vehicle.

In some cases, the request includes a first set of credentials for the aerial vehicle, and where the authenticity of the request is verified based on the first set of credentials.

The UFMS authentication component 1630 may verify an identity of the aerial vehicle based on the aerial identifier and the operational information.

In some examples, the UFMS authentication component 1630 may send, to the network, a first response including a positive authentication of the aerial vehicle, where a procedure for establishing a data session is initiated between the network and the wireless device based on the first response.

In some examples, the UFMS authentication component 1630 may verify an authenticity of the request for the verification of the aerial vehicle.

In some examples, the UFMS authentication component 1630 may identify second operational information for the aerial vehicle and a second aerial identifier that is stored at the aerial function management system based on receiving the request for the verification of the aerial vehicle.

In some examples, the UFMS authentication component 1630 may compare the operational information with the second operational information and the aerial identifier with the second aerial identifier, where the identity of the aerial vehicle is authenticated based on the operational information matching with the second operational information and the aerial identifier matching with the second aerial identifier.

In some examples, the UFMS authentication component 1630 may send the aerial identifier and the operational information to a flight control system.

In some examples, the UFMS authentication component 1630 may receive a third response from the flight control system, the third response including the positive authentication of the aerial vehicle and being received before sending the first response.

In some examples, the UFMS authentication component 1630 may identify second operational information for the aerial vehicle and a second aerial identifier that is stored at the aerial function management system based on receiving the request for the verification of the aerial vehicle.

In some examples, the UFMS authentication component 1630 may compare the operational information with the second operational information and the aerial identifier with the second aerial identifier, where the identity of the aerial vehicle is authenticated based on the operational information matching with the second operational information and the aerial identifier matching with the second aerial identifier.

In some examples, the UFMS authentication component 1630 may send the aerial identifier and the operational information to a flight control system.

In some examples, the UFMS authentication component 1630 may receive a second response from the flight control system, the second response including the positive authentication of the aerial vehicle and being received before sending the response.

The UFMS authorization component 1635 may receive, from the network, a second request for authorization of a flight path for the aerial vehicle based on sending the first response.

In some examples, the UFMS authorization component 1635 may send, to the network, a second response including an approval of the flight path based on the second request.

The UFMS authentication and authorization component 1640 may verify an identity of the aerial vehicle and a flight path for the aerial vehicle based on the aerial identifier and the operational information included in the request.

In some examples, the UFMS authentication and authorization component 1640 may send, to the network, a response including a positive authentication of the aerial vehicle and an approval of the flight path based on the verifying.

In some examples, the UFMS authentication and authorization component 1640 may verify an authenticity of the request for the verification of the aerial vehicle.

In some cases, the request includes a first set of credentials for the aerial vehicle, and where the authenticity of the request is verified based on the first set of credentials.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. The transmitter 1620 may utilize a single antenna or a set of one or more antennas.

Figure 17:
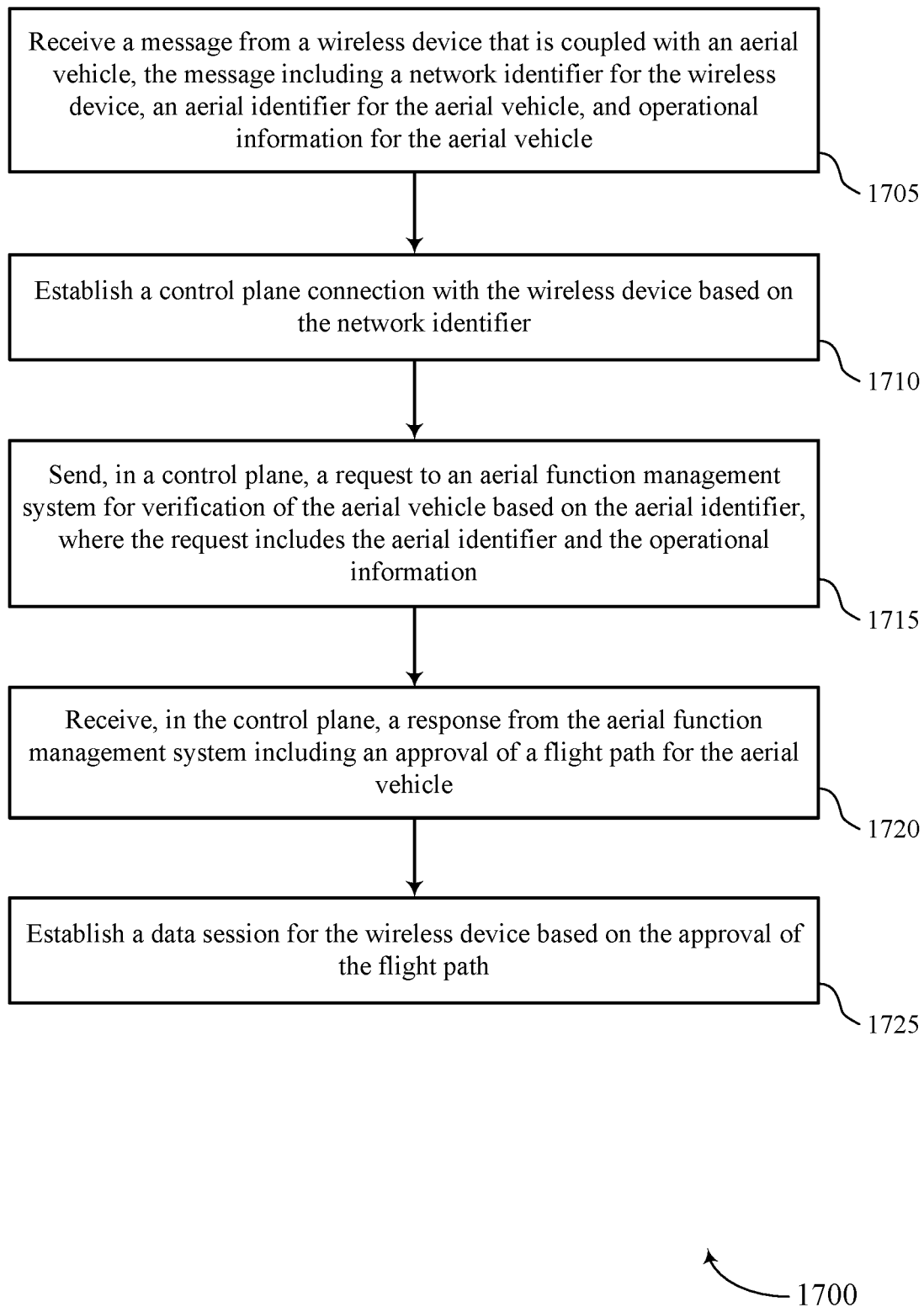
FIGS. 17 through 22 show flowcharts illustrating methods that support authorizing unmanned vehicles for operation in a network in accordance with aspects of the present disclosure.

FIG. 17 shows a flowchart illustrating a method 1700 that supports authorizing unmanned vehicles for operation in a network in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of one or more instructions to control the functional elements of the base station to perform the functions described herein. Additionally, or alternatively, a base station may perform aspects of the functions described herein using special-purpose hardware.

At 1705, the base station may receive a message from a wireless device that is coupled with an aerial vehicle, the message including a network identifier for the wireless device, an aerial identifier for the aerial vehicle, and operational information for the aerial vehicle. The operations of 1705 may be performed according to the methods described herein. In some examples, aspects of the operations of 1705 may be performed by a network registration component as described with reference to FIGS. 12 through 15.

At 1710, the base station may establish a control plane connection with the wireless device based on the network identifier. The operations of 1710 may be performed according to the methods described herein. In some examples, aspects of the operations of 1710 may be performed by a network control plane component as described with reference to FIGS. 12 through 15.

At 1715, the base station may send, in a control plane, a request to an aerial function management system for verification of the aerial vehicle based on the aerial identifier, where the request includes the aerial identifier and the operational information. The operations of 1715 may be performed according to the methods described herein. In some examples, aspects of the operations of 1715 may be performed by a network flight management component as described with reference to FIGS. 12 through 15.

At 1720, the base station may receive, in the control plane, a response from the aerial function management system including an approval of a flight path for the aerial vehicle. The operations of 1720 may be performed according to the methods described herein. In some examples, aspects of the operations of 1720 may be performed by a network flight management component as described with reference to FIGS. 12 through 15.

At 1725, the base station may establish a data session for the wireless device based on the approval of the flight path. The operations of 1725 may be performed according to the methods described herein. In some examples, aspects of the operations of 1725 may be performed by a network data plane component as described with reference to FIGS. 12 through 15.

Figure 18:
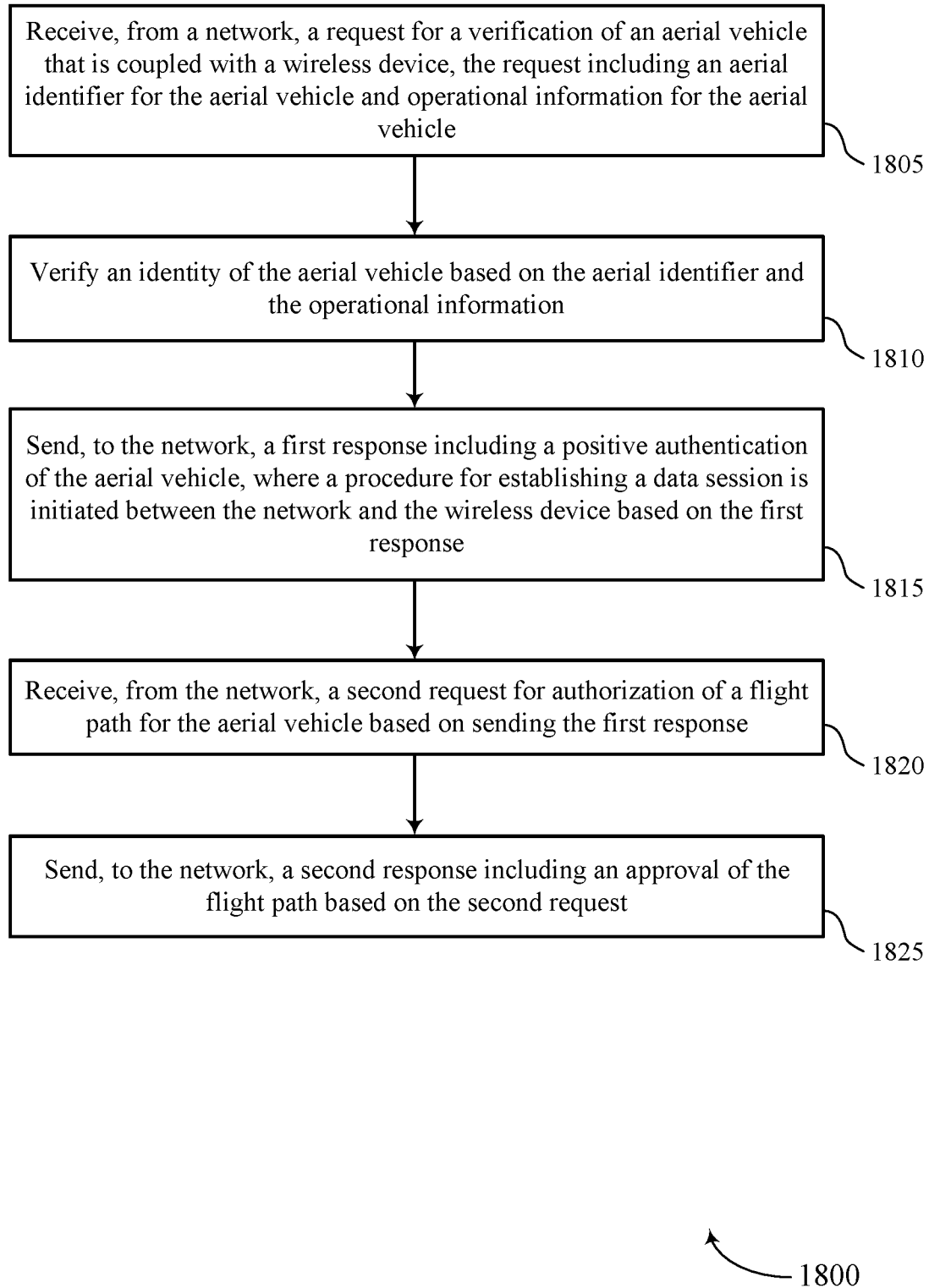

FIG. 18 shows a flowchart illustrating a method 1800 that supports authorizing unmanned vehicles for operation in a network in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of one or more instructions to control the functional elements of the UE to perform the functions described herein. Additionally, or alternatively, a UE may perform aspects of the functions described herein using special-purpose hardware.

At 1805, the UE may receive, from a network, a request for a verification of an aerial vehicle that is coupled with a wireless device, the request including an aerial identifier for the aerial vehicle and operational information for the aerial vehicle. The operations of 1805 may be performed according to the methods described herein. In some examples, aspects of the operations of 1805 may be performed by a UFMS flight management component as described with reference to FIGS. 8 through 11.

At 1810, the UE may verify an identity of the aerial vehicle based on the aerial identifier and the operational information. The operations of 1810 may be performed according to the methods described herein. In some examples, aspects of the operations of 1810 may be performed by a UFMS authentication component as described with reference to FIGS. 8 through 11.

At 1815, the UE may send, to the network, a first response including a positive authentication of the aerial vehicle, where a procedure for establishing a data session is initiated between the network and the wireless device based on the first response. The operations of 1815 may be performed according to the methods described herein. In some examples, aspects of the operations of 1815 may be performed by a UFMS authentication component as described with reference to FIGS. 8 through 11.

At 1820, the UE may receive, from the network, a second request for authorization of a flight path for the aerial vehicle based on sending the first response. The operations of 1820 may be performed according to the methods described herein. In some examples, aspects of the operations of 1820 may be performed by a UFMS authorization component as described with reference to FIGS. 8 through 11.

At 1825, the UE may send, to the network, a second response including an approval of the flight path based on the second request. The operations of 1825 may be performed according to the methods described herein. In some examples, aspects of the operations of 1825 may be performed by a UFMS authorization component as described with reference to FIGS. 8 through 11.

Figure 19:
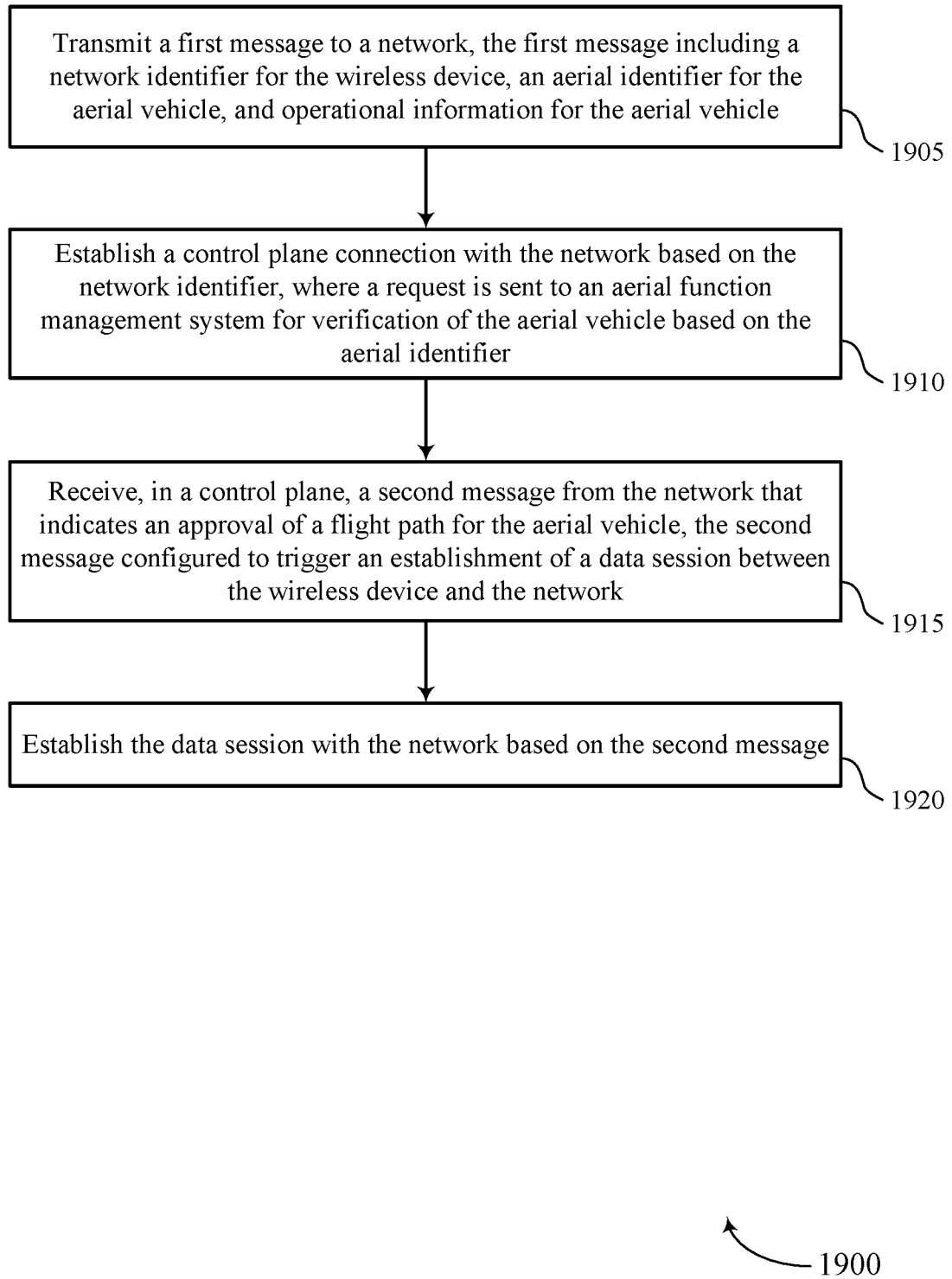

FIG. 19 shows a flowchart illustrating a method 1900 that supports authorizing unmanned vehicles for operation in a network in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of one or more instructions to control the functional elements of the UE to perform the functions described herein. Additionally, or alternatively, a UE may perform aspects of the functions described herein using special-purpose hardware.

At 1905, the UE may transmit a first message to a network, the first message including a network identifier for the wireless device, an aerial identifier for the aerial vehicle, and operational information for the aerial vehicle. The operations of 1905 may be performed according to the methods described herein. In some examples, aspects of the operations of 1905 may be performed by a UAV registration component as described with reference to FIGS. 8 through 11.

At 1910, the UE may establish a control plane connection with the network based on the network identifier, where a request is sent to an aerial function management system for verification of the aerial vehicle based on the aerial identifier. The operations of 1910 may be performed according to the methods described herein. In some examples, aspects of the operations of 1910 may be performed by a UAV control plane component as described with reference to FIGS. 8 through 11.

At 1915, the UE may receive, in a control plane, a second message from the network that indicates an approval of a flight path for the aerial vehicle, the second message configured to trigger an establishment of a data session between the wireless device and the network. The operations of 1915 may be performed according to the methods described herein. In some examples, aspects of the operations of 1915 may be performed by a UAV flight management component as described with reference to FIGS. 8 through 11.

At 1920, the UE may establish the data session with the network based on the second message. The operations of 1920 may be performed according to the methods described herein. In some examples, aspects of the operations of 1920 may be performed by a UAV data plane component as described with reference to FIGS. 8 through 11.

Figure 20:
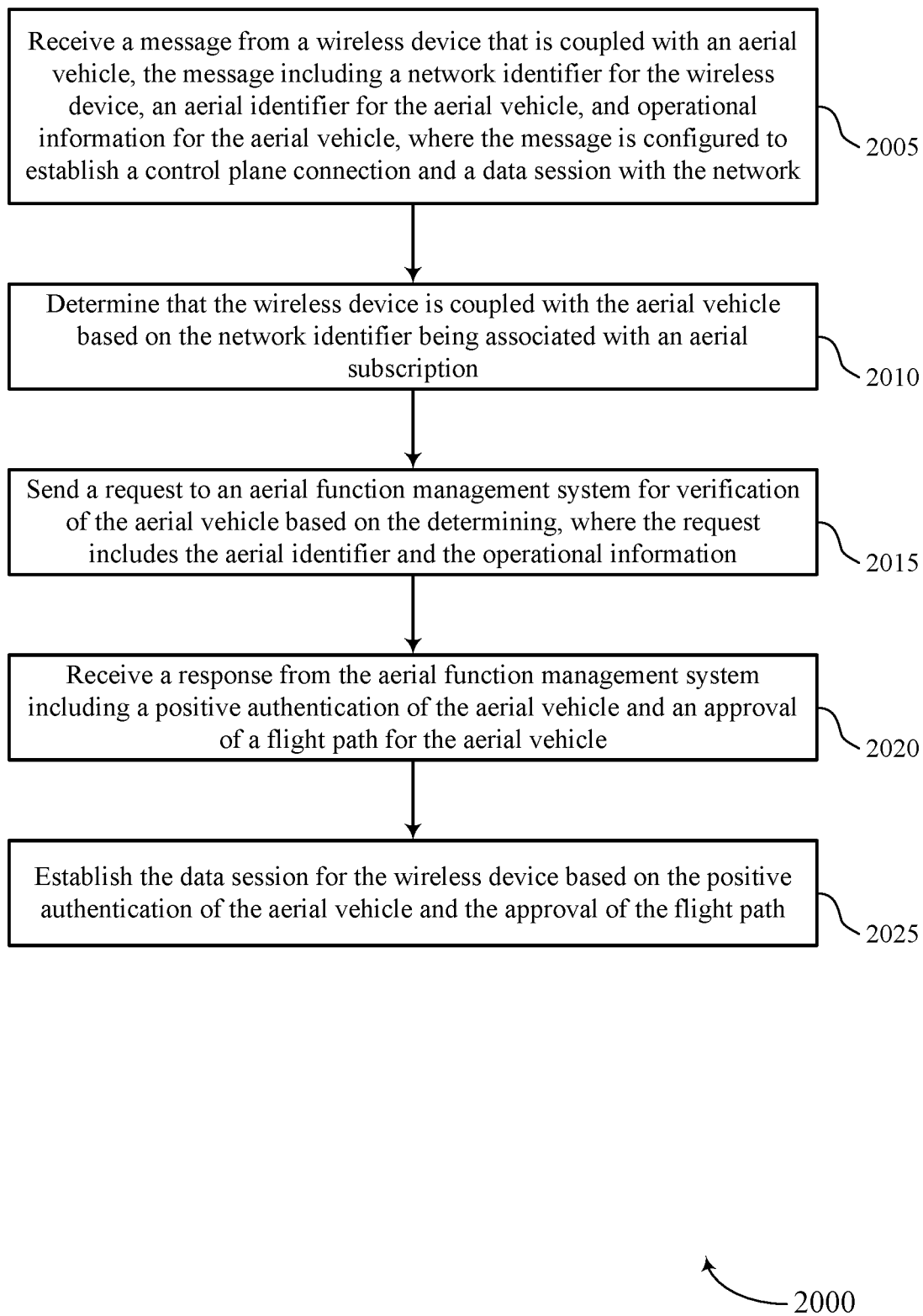

FIG. 20 shows a flowchart illustrating a method 2000 that supports authorizing unmanned vehicles for operation in a network in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of one or more instructions to control the functional elements of the base station to perform the functions described herein. Additionally, or alternatively, a base station may perform aspects of the functions described herein using special-purpose hardware.

At 2005, the base station may receive a message from a wireless device that is coupled with an aerial vehicle, the message including a network identifier for the wireless device, an aerial identifier for the aerial vehicle, and operational information for the aerial vehicle, where the message is configured to establish a control plane connection and a data session with the network. The operations of 2005 may be performed according to the methods described herein. In some examples, aspects of the operations of 2005 may be performed by a network attachment component as described with reference to FIGS. 12 through 15.

At 2010, the base station may determine that the wireless device is coupled with the aerial vehicle based on the network identifier being associated with an aerial subscription. The operations of 2010 may be performed according to the methods described herein. In some examples, aspects of the operations of 2010 may be performed by a network registration component as described with reference to FIGS. 12 through 15.

At 2015, the base station may send a request to an aerial function management system for verification of the aerial vehicle based on the determining, where the request includes the aerial identifier and the operational information. The operations of 2015 may be performed according to the methods described herein. In some examples, aspects of the operations of 2015 may be performed by a network flight management component as described with reference to FIGS. 12 through 15.

At 2020, the base station may receive a response from the aerial function management system including a positive authentication of the aerial vehicle and an approval of a flight path for the aerial vehicle. The operations of 2020 may be performed according to the methods described herein. In some examples, aspects of the operations of 2020 may be performed by a network flight management component as described with reference to FIGS. 12 through 15.

At 2025, the base station may establish the data session for the wireless device based on the positive authentication of the aerial vehicle and the approval of the flight path.

The operations of 2025 may be performed according to the methods described herein. In some examples, aspects of the operations of 2025 may be performed by a network data plane component as described with reference to FIGS. 12 through 15.

Figure 21:
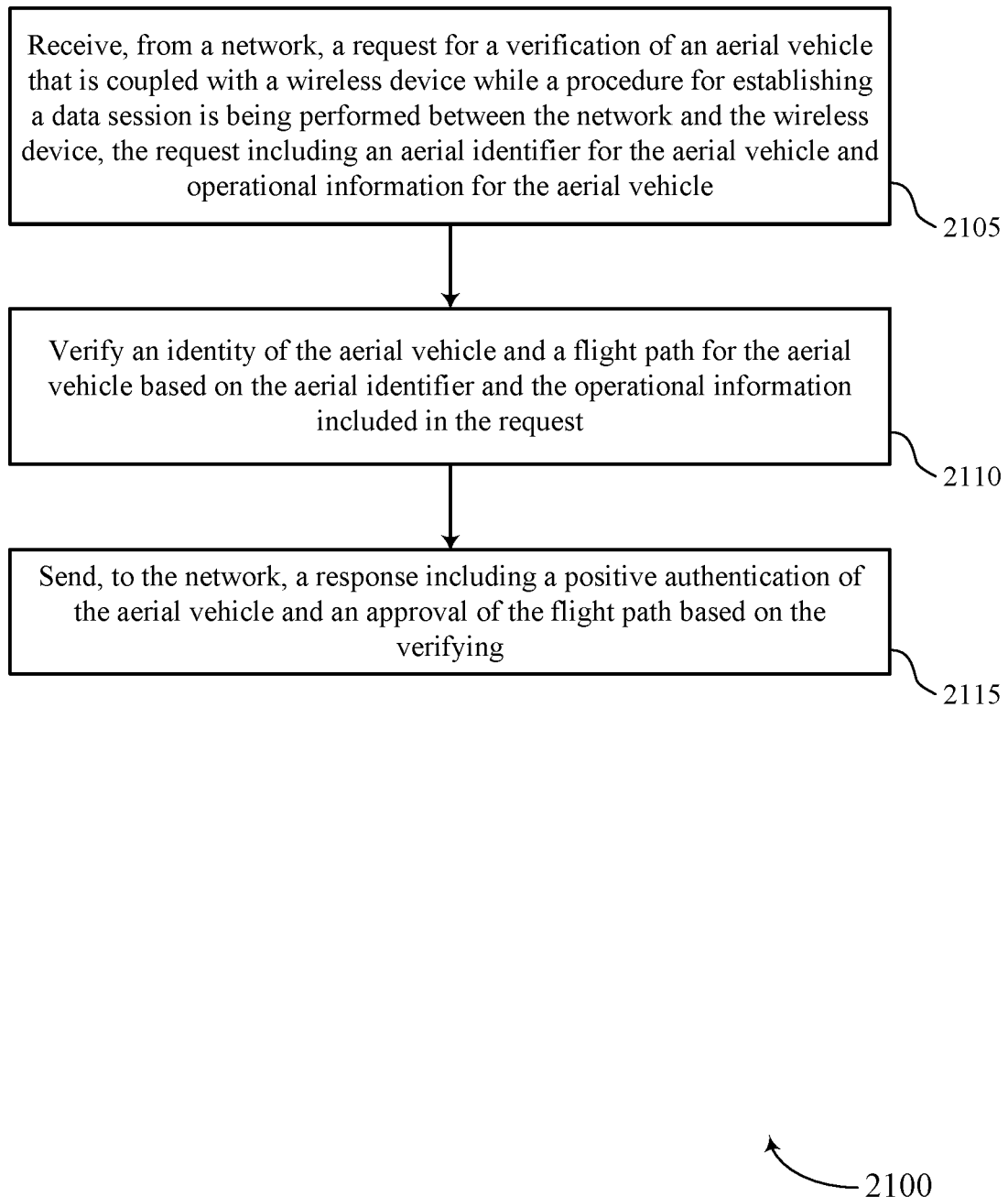

FIG. 21 shows a flowchart illustrating a method 2100 that supports authorizing unmanned vehicles for operation in a network in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of one or more instructions to control the functional elements of the UE to perform the functions described herein. Additionally, or alternatively, a UE may perform aspects of the functions described herein using special-purpose hardware.

At 2105, the UE may receive, from a network, a request for a verification of an aerial vehicle that is coupled with a wireless device while a procedure for establishing a data session is being performed between the network and the wireless device, the request including an aerial identifier for the aerial vehicle and operational information for the aerial vehicle. The operations of 2105 may be performed according to the methods described herein. In some examples, aspects of the operations of 2105 may be performed by a UFMS flight management component as described with reference to FIGS. 8 through 11.

At 2110, the UE may verify an identity of the aerial vehicle and a flight path for the aerial vehicle based on the aerial identifier and the operational information included in the request. The operations of 2110 may be performed according to the methods described herein. In some examples, aspects of the operations of 2110 may be performed by a UFMS authentication and authorization component as described with reference to FIGS. 8 through 11.

At 2115, the UE may send, to the network, a response including a positive authentication of the aerial vehicle and an approval of the flight path based on the verifying. The operations of 2115 may be performed according to the methods described herein. In some examples, aspects of the operations of 2115 may be performed by a UFMS authentication and authorization component as described with reference to FIGS. 8 through 11.

Figure 22:
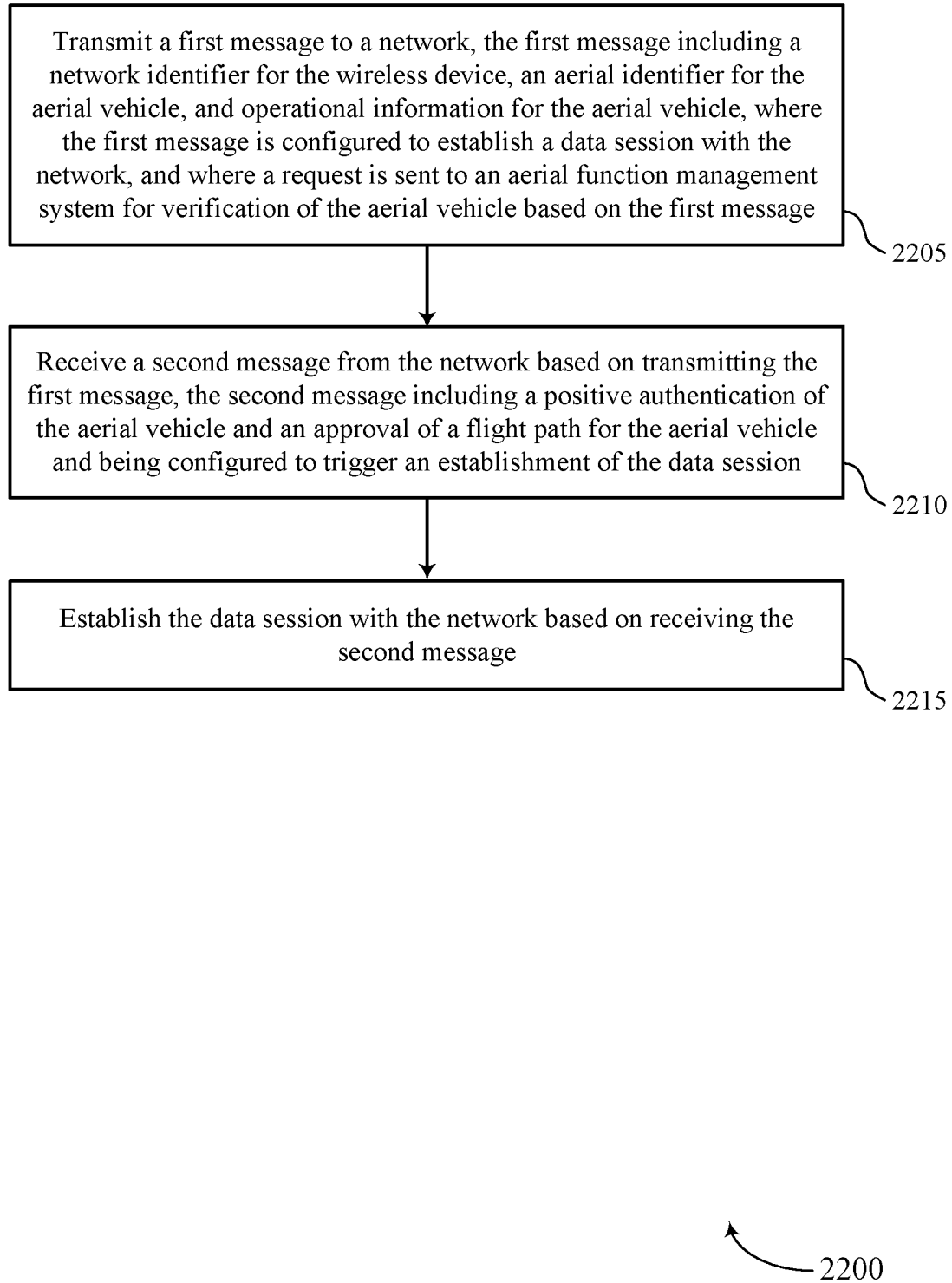

FIG. 22 shows a flowchart illustrating a method 2200 that supports authorizing unmanned vehicles for operation in a network in accordance with aspects of the present disclosure. The operations of method 2200 may be implemented by a UE 115 or its components as described herein. For example, the operations of method 2200 may be performed by a communications manager as described with reference to FIGS. 8 through 11. In some examples, a UE may execute a set of one or more instructions to control the functional elements of the UE to perform the functions described herein. Additionally, or alternatively, a UE may perform aspects of the functions described herein using special-purpose hardware.

At 2205, the UE may transmit a first message to a network, the first message including a network identifier for the wireless device, an aerial identifier for the aerial vehicle, and operational information for the aerial vehicle, where the first message is configured to establish a data session with the network, and where a request is sent to an aerial function management system for verification of the aerial vehicle based on the first message. The operations of 2205 may be performed according to the methods described herein. In some examples, aspects of the operations of 2205 may be performed by a UAV attachment component as described with reference to FIGS. 8 through 11.

At 2210, the UE may receive a second message from the network based on transmitting the first message, the second message including a positive authentication of the aerial vehicle and an approval of a flight path for the aerial vehicle and being configured to trigger an establishment of the data session. The operations of 2210 may be performed according to the methods described herein. In some examples, aspects of the operations of 2210 may be performed by a UAV control plane component as described with reference to FIGS. 8 through 11.

At 2215, the UE may establish the data session with the network based on receiving the second message. The operations of 2215 may be performed according to the methods described herein. In some examples, aspects of the operations of 2215 may be performed by a UAV data plane component as described with reference to FIGS. 8 through 11.

The following provides an overview of aspects of the present disclosure:

Aspect 1: A method for wireless communications at a network, comprising: receiving a message from a wireless device that is coupled with an aerial vehicle, the message comprising a network identifier for the wireless device, an aerial identifier for the aerial vehicle, and operational information for the aerial vehicle; determining that the wireless device is coupled with the aerial vehicle based at least in part on the network identifier being associated with an aerial subscription; sending a request to an aerial function management system for verification of the aerial vehicle based at least in part on the determining, wherein the request comprises the aerial identifier and the operational information; receiving a response from the aerial function management system comprising an approval of the aerial vehicle based at least in part on the aerial identifier and the operational information; and establishing a data session for the wireless device based at least in part on the approval of the aerial vehicle.

Aspect 2: The method of aspect 1, further comprising: identifying the aerial function management system based at least in part on the aerial identifier.

Aspect 3: The method of any of aspects 1 through 2, further comprising: transmitting a second message to the wireless device based at least in part on receiving the response from the aerial function management system, the second message comprising the approval of the aerial vehicle and being configured to trigger an establishment of the data session.

Aspect 4: The method of any of aspects 1 through 3, further comprising: identifying an access point for routing commands between the wireless device and a controller for the aerial vehicle based at least in part on the message; releasing the data session based at least in part on identifying the access point; and establishing a second data session based at least in part on the access point, wherein an exclusive communication path is established between the wireless device and the controller via the access point.

Aspect 5: The method of any of aspects 1 through 4, further comprising: generating a traffic filter for communications with the wireless device based at least in part on establishing the data session or receiving the response indicating the approval of the aerial vehicle, or both, wherein an exclusive communication path between the wireless device and a controller for the aerial vehicle is established based at least in part on the traffic filter.

Aspect 6: The method of any of aspects 1 through 5, further comprising: verifying an authenticity of the response received from the aerial function management system; storing configuration information for the aerial vehicle based at least in part on verifying the authenticity; and transmitting a second message to the wireless device based at least in part on verifying the authenticity of the response, the second message comprising the approval of the aerial vehicle and being configured to trigger an establishment of the data session.

Aspect 7: The method of any of aspects 1 through 6, further comprising: sending a second message to a radio access network based at least in part on receiving the response from the aerial function management system, the second message comprising information for supporting a radio connection of aerial vehicles.

Aspect 8: The method of any of aspects 1 through 7, wherein the message comprise a first indication of an access point that provides aerial services and a configurable set of parameters that comprises the aerial identifier, the operational information for the aerial vehicle, and a second indication of a controller for the aerial vehicle.

Aspect 9: The method of aspect 8, wherein the first indication of the access point is included in an Evolved Packet System (EPS) Session Management (ESM) Container and the configurable set of parameters is included in a protocol configuration option (PCO) field.

Aspect 10: The method of any of aspects 1 through 9, further comprising: determining an identity of the aerial function management system based at least in part on the aerial identifier; and establishing a control plane connection with the wireless device based at least in part on the network identifier.

Aspect 11: The method of aspect 10, further comprising: verifying that the wireless device has a subscription with the network based at least in part on the message; determining that the wireless device is coupled with the aerial vehicle based at least in part on the subscription; and determining, based at least in part on the aerial identifier, a procedure for the verification of the aerial vehicle is to be performed before the data session is established for the wireless device.

Aspect 12: The method of aspect 11, wherein the message is configured to request a registration with the network, the method further comprising: transmitting a second message to the wireless device, the second message indicating that the procedure for the verification of the aerial vehicle is to be performed before the data session is established and being configured to accept the registration for the wireless device, wherein the control plane connection is established based at least in part on transmitting the second message.

Aspect 13: The method of any of aspects 10 through 12, further comprising: assigning a state to the wireless device in a control plane based at least in part on the aerial identifier, wherein user plane data that addresses the wireless device is blocked while the state is assigned to the wireless device; and removing the state upon establishing the data session.

Aspect 14: The method of any of aspects 10 through 13, further comprising: transmitting a second message to the wireless device based at least in part on establishing the control plane connection, the second message configured to request information for the verification of the aerial vehicle; and receiving the aerial identifier for the aerial vehicle and the operational information for the aerial vehicle based at least in part on the second message.

Aspect 15: The method of any of aspects 1 through 14, further comprising: matching the aerial identifier with an entry in a list of aerial identifiers based at least in part on receiving the message; and initiating a procedure for the verification of the aerial vehicle based at least in part on the matching.

Aspect 16: The method of any of aspects 1 through 15, wherein the operational information comprises an identity of an operator, a characteristic of the aerial vehicle, an indication of a controller for the aerial vehicle, a flight path, or any combination thereof.

Aspect 17: The method of any of aspects 1 through 16, wherein receiving the response comprising the approval of the aerial vehicle comprises: receiving a first response indicating positive authentication of the aerial vehicle; and receiving second response indicating approval of a flight path for the aerial vehicle, the second response being received after the first response, and wherein the method further comprises: transmitting a second message to the wireless device, the second message configured to indicate the positive authentication of the aerial vehicle to the wireless device based at least in part on receiving the first response.

Aspect 18: The method of aspect 17, further comprising: receiving a third message from the wireless device based at least in part on transmitting the second message, the third message configured to request an establishment of the data session.

Aspect 19: The method of aspect 18, further comprising: sending a second request to the aerial function management system for authorization of the flight path based at least in part on the second message, wherein the second response indicating the approval of the flight path is received based at least in part on sending the second request.

Aspect 20: The method of any of aspects 1 through 19, further comprising: receiving, in a data plane, a command for the aerial vehicle from a controller for the aerial vehicle based at least in part on establishing the data session; and transmitting, in the data plane, the command to the aerial vehicle.

Aspect 21: A method for wireless communications at a wireless device that is coupled with an aerial vehicle, comprising: transmitting a first message to a network, the first message comprising a network identifier for the wireless device, an aerial identifier for the aerial vehicle, and operational information for the aerial vehicle; receiving a second message from the network based at least in part on transmitting the first message, the second message comprising an approval of the aerial vehicle by an aerial function management system and being configured to trigger an establishment of a data session; and establishing the data session with the network based at least in part on receiving the second message.

Aspect 22: The method of aspect 21, wherein the first message comprise a first indication of an access point that provides aerial services, the aerial identifier, the operational information for the aerial vehicle, and a second indication of a controller for the aerial vehicle.

Aspect 23: The method of aspect 22, further comprising: encapsulating the first indication of the access point in an Evolved Packet System (EPS) Session Management (ESM) Container and the aerial identifier, the operational information for the aerial vehicle, and the second indication of the controller for the aerial vehicle in a protocol configuration option (PCO) field.

Aspect 24: The method of any of aspects 21 through 23, further comprising: identifying an access point that provides aerial services, wherein the data session is released based at least in part on the access point, and a second data session is established based at least in part on the access point, wherein an exclusive communication path is established between the wireless device and a controller for the aerial vehicle via the access point.

Aspect 25: The method of any of aspects 21 through 24, further comprising: establishing a control plane connection with the network based at least in part on the network identifier.

Aspect 26: The method of aspect 25, further comprising: receiving, in a control plane, a third message from the network based at least in part on the request sent to the aerial function management system, the third message indicating a positive authentication of the aerial vehicle and being received before the second message; and transmitting, in the control plane, a fourth message to the network based at least in part on receiving the third message, the fourth message configured to request the establishment of the data session and being transmitted before the second message.

Aspect 27: An apparatus for wireless communications at a network, comprising a processor; memory coupled with the processor; and instructions stored in the memory and executable by the processor to cause the apparatus to perform a method of any of aspects 1 through 20.

Aspect 28: An apparatus for wireless communications at a network, comprising at least one means for performing a method of any of aspects 1 through 20.

Aspect 29: A non-transitory computer-readable medium storing code for wireless communications at a network, the code comprising instructions executable by a processor to perform a method of any of aspects 1 through 20.

Aspect 30: An apparatus for wireless communications at a wireless device that is coupled with an aerial vehicle, comprising a processor; memory coupled with the processor; and instructions stored in the memory and executable by the processor to cause the apparatus to perform a method of any of aspects 21 through 26.

Aspect 31: An apparatus for wireless communications at a wireless device that is coupled with an aerial vehicle, comprising at least one means for performing a method of any of aspects 21 through 26.

Aspect 32: A non-transitory computer-readable medium storing code for wireless communications at a wireless device that is coupled with an aerial vehicle, the code comprising instructions executable by a processor to perform a method of any of aspects 21 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications, comprising:
   receiving, at an access and mobility management function (AMF) or a session management function (SMF) of a core network of a public land mobile network, a registration request message from a wireless device that is coupled with an aerial vehicle, the registration request message comprising a network identifier for the wireless device, an aerial identifier for the aerial vehicle, and operational information for the aerial vehicle, wherein the aerial identifier is unique to the aerial vehicle and is associated with an aerial function management system external to the public land mobile network, and wherein the operational information comprises an identifier associated with the aerial function management system;
   verifying, at the AMF or the SMF, that the wireless device is associated with a subscription for aerial communication services provided by the public land mobile network based at least in part on the network identifier for the wireless device;
   determining, by the AMF or the SMF, that the wireless device is coupled with the aerial vehicle based at least in part on the verification that the wireless device is associated with the subscription for the aerial communication services provided by the public land mobile network;
   sending, based at least in part on the operational information, a request from the AMF or the SMF to the aerial function management system for verification of the aerial vehicle based at least in part on the determining, wherein the request comprises the aerial identifier;
   receiving, by the AMF or the SMF, a response from the aerial function management system comprising an approval of the aerial vehicle based at least in part on the aerial identifier; and
   transmitting, by the AMF or the SMF, a session establishment response message to establish a data session for the wireless device for the aerial communication services based at least in part on validation of the subscription for the aerial communication services and the approval of the aerial vehicle.

2. The method of claim 1, further comprising:
   identifying the aerial function management system based at least in part on the aerial identifier.

3. The method of claim 1, further comprising:
   identifying an access point for routing commands between the wireless device and a controller for the aerial vehicle based at least in part on the registration request message;
   releasing the data session based at least in part on identifying the access point; and
   establishing a second data session based at least in part on the access point, wherein an exclusive communication path is established between the wireless device and the controller via the access point.

4. The method of claim 1, further comprising:
   generating a traffic filter for communications with the wireless device based at least in part on establishing the data session or receiving the response indicating the approval of the aerial vehicle, or both, wherein an exclusive communication path between the wireless device and a controller for the aerial vehicle is established based at least in part on the traffic filter.

5. The method of claim 1, further comprising:
   verifying an authenticity of the response received from the aerial function management system;
   storing configuration information for the aerial vehicle based at least in part on verifying the authenticity; and
   transmitting a second message to the wireless device based at least in part on verifying the authenticity of the response, the second message comprising the approval of the aerial vehicle and being configured to trigger an establishment of the data session.

6. The method of claim 1, further comprising:
   sending a second message to a radio access network based at least in part on receiving the response from the aerial function management system, the second message comprising information for supporting a radio connection of aerial vehicles.

7. The method of claim 1, wherein the registration request message comprises a first indication of an access point that provides aerial services and a configurable set of parameters that comprises the aerial identifier, the operational information for the aerial vehicle, and a second indication of a controller for the aerial vehicle.

8. The method of claim 7, wherein the first indication of the access point is included in an Evolved Packet System (EPS) Session Management (ESM) Container and the configurable set of parameters is included in a protocol configuration option (PCO) field.

9. The method of claim 1, further comprising:
   determining an identity of the aerial function management system based at least in part on the aerial identifier; and
   establishing a control plane connection with the wireless device based at least in part on the network identifier.

10. The method of claim 9, further comprising:
determining, based at least in part on the aerial identifier, a procedure for the verification of the aerial vehicle is to be performed before the data session is established for the wireless device.

11. The method of claim 10, further comprising:
transmitting a second message to the wireless device, the second message indicating that the procedure for the verification of the aerial vehicle is to be performed before the data session is established and being configured to accept the registration for the wireless device, wherein the control plane connection is established based at least in part on transmitting the second message.

12. The method of claim 9, further comprising:
assigning a state to the wireless device in a control plane based at least in part on the aerial identifier, wherein user plane data that addresses the wireless device is blocked while the state is assigned to the wireless device; and
removing the state upon establishing the data session.

13. The method of claim 9, further comprising:
transmitting a second message to the wireless device based at least in part on establishing the control plane connection, the second message configured to request information for the verification of the aerial vehicle; and
receiving the aerial identifier for the aerial vehicle and the operational information for the aerial vehicle based at least in part on the second message.

14. The method of claim 1, further comprising:
matching the aerial identifier with an entry in a list of aerial identifiers based at least in part on receiving the registration request message; and
initiating a procedure for the verification of the aerial vehicle based at least in part on the matching.

15. The method of claim 1, wherein the operational information comprises an identity of an operator, a characteristic of the aerial vehicle, an indication of a controller for the aerial vehicle, a flight path, or any combination thereof.

16. The method of claim 1, wherein receiving the response comprising the approval of the aerial vehicle comprises:
receiving a first response indicating positive authentication of the aerial vehicle; and
receiving second response indicating approval of a flight path for the aerial vehicle, the second response being received after the first response,
and wherein the method further comprises:
transmitting a second message to the wireless device, the second message configured to indicate the positive authentication of the aerial vehicle to the wireless device based at least in part on receiving the first response.

17. The method of claim 16, further comprising:
receiving a third message from the wireless device based at least in part on transmitting the second message, the third message configured to request an establishment of the data session.

18. The method of claim 17, further comprising:
sending a second request to the aerial function management system for authorization of the flight path based at least in part on the second message, wherein the second response indicating the approval of the flight path is received based at least in part on sending the second request.

19. The method of claim 1, further comprising:
receiving, in a data plane, a command for the aerial vehicle from a controller for the aerial vehicle based at least in part on establishing the data session; and
transmitting, in the data plane, the command to the aerial vehicle.

20. A method for wireless communications at a wireless device that is coupled with an aerial vehicle, comprising:
generating, at the wireless device, a registration request message, the registration request message comprising a network identifier for the wireless device, an aerial identifier for the aerial vehicle, and operational information for the aerial vehicle, wherein the network identifier is associated with a subscription for aerial communication services provided by a public land mobile network, wherein the aerial identifier is unique to the aerial vehicle and is associated with an aerial function management system external to the public land mobile network, wherein the operational information comprises an identifier associated with the aerial function management system, and wherein a request is sent to the aerial function management system for verification of the aerial vehicle based at least in part on the registration request message;
transmitting the registration request message to an access and mobility management function (AMF) or a session management function (SMF) of a core network of the public land mobile network;
receiving a session establishment response message from the AMF or the SMF based at least in part on transmitting the registration request message, the session establishment response message comprising an approval of the aerial vehicle by the aerial function management system and being configured to trigger an establishment of a data session; and
establishing the data session for the aerial communication services with the public land mobile network based at least in part on validation of the subscription for the aerial communication services by the public land mobile network and receiving the session establishment response message comprising the approval of the aerial vehicle.

21. The method of claim 20, wherein the registration request message comprises a first indication of an access point that provides aerial services, the aerial identifier, the operational information for the aerial vehicle, and a second indication of a controller for the aerial vehicle.

22. The method of claim 21, further comprising:
encapsulating the first indication of the access point in an Evolved Packet System (EPS) Session Management (ESM) Container and the aerial identifier, the operational information for the aerial vehicle, and the second indication of the controller for the aerial vehicle in a protocol configuration option (PCO) field.

23. The method of claim 20, further comprising:
identifying an access point that provides aerial services, wherein the data session is released based at least in part on the access point, and a second data session is established based at least in part on the access point, wherein an exclusive communication path is established between the wireless device and a controller for the aerial vehicle via the access point.

24. The method of claim 20, further comprising:
establishing a control plane connection with the public land mobile network based at least in part on the network identifier.

25. The method of claim 24, further comprising:
receiving, in a control plane, a third message from the public land mobile network based at least in part on a request sent to the aerial function management system, the third message indicating a positive authentication of the aerial vehicle and being received before the second message; and
transmitting, in the control plane, a fourth message to the public land mobile network based at least in part on receiving the third message, the fourth message configured to request the establishment of the data session and being transmitted before the second message.

26. A system for wireless communications, comprising:
one or more memories storing processor-executable code; and
one or more processors coupled with the one or more memories and individually or collectively operable to execute the code to cause the system to:
receive, at an access and mobility management function (AMF) or a session management function (SMF) of a core network of a public land mobile network, a registration request message from a wireless device that is coupled with an aerial vehicle, the registration request message comprising a network identifier for the wireless device, an aerial identifier for the aerial vehicle, and operational information for the aerial vehicle, wherein the aerial identifier is unique to the aerial vehicle and is associated with an aerial function management system external to the public land mobile network, and wherein the operational information comprises an identifier associated with the aerial function management system;
verify, at the AMF or the SMF, that the wireless device is associated with a subscription for aerial communication services provided by the public land mobile network based at least in part on the network identifier for the wireless device;
determine, by the AMF or the SMF, that the wireless device is coupled with the aerial vehicle based at least in part on the verification that the wireless device is associated with the subscription for the aerial communication services provided by the public land mobile network;
send, based at least in part on the operational information, a request from the AMF or the SMF to the aerial function management system for verification of the aerial vehicle based at least in part on the determining, wherein the request comprises the aerial identifier;
receive a response from the aerial function management system comprising an approval of the aerial vehicle based at least in part on the aerial identifier; and
transmit, by the AMF or the SMF, a session establishment response message to establish a data session for the wireless device for the aerial communication services based at least in part on validation of the subscription for the aerial communication services and the approval of the aerial vehicle.

27. The apparatus of claim 26, wherein the one or more processors are individually or collectively further operable to execute the code to cause the apparatus to:
identify the aerial function management system based at least in part on the aerial identifier.

28. The apparatus of claim 26, wherein the one or more processors are individually or collectively further operable to execute the code to cause the apparatus to:
identify an access point for routing commands between the wireless device and a controller for the aerial vehicle based at least in part on the registration request message;
release the data session based at least in part on identifying the access point; and
establish a second data session based at least in part on the access point, wherein an exclusive communication path is established between the wireless device and the controller via the access point.

29. The apparatus of claim 26, wherein the one or more processors are individually or collectively further operable to execute the code to cause the apparatus to:
generate a traffic filter for communications with the wireless device based at least in part on establishing the data session or receiving the response indicating the approval of the aerial vehicle, or both, wherein an exclusive communication path between the wireless device and a controller for the aerial vehicle is established based at least in part on the traffic filter.

30. The apparatus of claim 26, wherein the one or more processors are individually or collectively further operable to execute the code to cause the apparatus to:
verify an authenticity of the response received from the aerial function management system;
store configuration information for the aerial vehicle based at least in part on verifying the authenticity; and
transmit a second message to the wireless device based at least in part on verifying the authenticity of the response, the second message comprising the approval of the aerial vehicle and being configured to trigger an establishment of the data session.

31. The apparatus of claim 26, wherein the one or more processors are individually or collectively further operable to execute the code to cause the apparatus to:
send a second message to a radio access network based at least in part on receiving the response from the aerial function management system, the second message comprising information for supporting a radio connection of aerial vehicles.

32. The apparatus of claim 26, wherein the registration request message comprises a first indication of an access point that provides aerial services and a configurable set of parameters that comprises the aerial identifier, the operational information for the aerial vehicle, and a second indication of a controller for the aerial vehicle.

33. The apparatus of claim 32, wherein the first indication of the access point is included in an Evolved Packet System (EPS) Session Management (ESM) Container and the configurable set of parameters is included in a protocol configuration option (PCO) field.

34. The apparatus of claim 26, wherein the one or more processors are individually or collectively further operable to execute the code to cause the apparatus to:
determine an identity of the aerial function management system based at least in part on the aerial identifier; and
establish a control plane connection with the wireless device based at least in part on the network identifier.

35. The apparatus of claim 34, wherein the one or more processors are individually or collectively further operable to execute the code to cause the apparatus to:
determine, based at least in part on the aerial identifier, a procedure for the verification of the aerial vehicle is to be performed before the data session is established for the wireless device.

36. The apparatus of claim 35, wherein the one or more processors are individually or collectively further operable to execute the code to cause the apparatus to:

transmit a second message to the wireless device, the second message indicating that the procedure for the verification of the aerial vehicle is to be performed before the data session is established and being configured to accept the registration for the wireless device, wherein the control plane connection is established based at least in part on transmitting the second message.

37. The apparatus of claim 34, wherein the one or more processors are individually or collectively further operable to execute the code to cause the apparatus to:

assign a state to the wireless device in a control plane based at least in part on the aerial identifier, wherein user plane data that addresses the wireless device is blocked while the state is assigned to the wireless device; and remove the state upon establishing the data session.

38. The apparatus of claim 34, wherein the one or more processors are individually or collectively further operable to execute the code to cause the apparatus to:

transmit a second message to the wireless device based at least in part on establishing the control plane connection, the second message configured to request information for the verification of the aerial vehicle; and receive the aerial identifier for the aerial vehicle and the operational information for the aerial vehicle based at least in part on the second message.

39. The apparatus of claim 26, wherein the one or more processors are individually or collectively further operable to execute the code to cause the apparatus to:

match the aerial identifier with an entry in a list of aerial identifiers based at least in part on receiving the registration request message; and initiate a procedure for the verification of the aerial vehicle based at least in part on the matching.

40. The apparatus of claim 26, wherein the operational information comprises an identity of an operator, a characteristic of the aerial vehicle, an indication of a controller for the aerial vehicle, a flight path, or any combination thereof.

41. The apparatus of claim 26, wherein response comprises a first response and a second response, and wherein the one or more processors are individually or collectively further operable to execute the code to cause the apparatus to:

receive the first response indicating positive authentication of the aerial vehicle;

receive the second response indicating approval of a flight path for the aerial vehicle, the second response being received after the first response; and transmit a second message to the wireless device, the second message configured to indicate the positive authentication of the aerial vehicle to the wireless device based at least in part on receiving the first response.

42. The apparatus of claim 41, wherein the one or more processors are individually or collectively further operable to execute the code to cause the apparatus to:

receive a third message from the wireless device based at least in part on transmitting the second message, the third message configured to request an establishment of the data session.

43. The apparatus of claim 42, wherein the one or more processors are individually or collectively further operable to execute the code to cause the apparatus to:

send a second request to the aerial function management system for authorization of the flight path based at least in part on the second message, wherein the response indicating the approval of the flight path is received based at least in part on sending the second request.

44. The apparatus of claim 42, wherein the second message comprises the aerial identifier for the aerial vehicle, the operational information for the aerial vehicle, or both.

45. The apparatus of claim 26, wherein the one or more processors are individually or collectively further operable to execute the code to cause the apparatus to:

receive, in a data plane, a command for the aerial vehicle from a controller for the aerial vehicle based at least in part on establishing the data session; and transmit, in the data plane, the command to the aerial vehicle.

46. A wireless device for wireless communications, the wireless device coupled with an aerial vehicle and comprising:

one or more memories storing processor-executable code; and one or more processors coupled with the one or more memories and individually or collectively operable to execute the code to cause the wireless device to:

generate a registration request message, the registration request message comprising a network identifier for the wireless device, an aerial identifier for the aerial vehicle, and operational information for the aerial vehicle, wherein the network identifier is associated with a subscription for aerial communication services provided by a public land mobile network, wherein the aerial identifier is unique to the aerial vehicle and is associated with an aerial function management system external to the public land mobile network, wherein the operational information comprises an identifier associated with the aerial function management system, and wherein a request is sent to the aerial function management system for verification of the aerial vehicle based at least in part on the registration request message;

transmit the registration request message to an access and mobility management function (AMF) or a session management function (SMF) of a core network of the public land mobile network;

receive a session establishment response message from the AMF or the SMF based at least in part on transmitting the registration request message, the session establishment response message comprising an approval of the aerial vehicle by the aerial function management system and being configured to trigger an establishment of a data session; and establish the data session for the aerial communication services with the public land mobile network based at least in part on validation of the subscription for the aerial communication services by the public land mobile network and receiving the session establishment response message comprising the approval of the aerial vehicle.

47. The wireless device of claim 46, wherein the registration request message comprises a first indication of an access point that provides aerial services, the aerial identifier, the operational information for the aerial vehicle, and a second indication of a controller for the aerial vehicle.

48. The wireless device of claim 47, wherein the one or more processors are individually or collectively further operable to execute the code to cause the wireless device to:

encapsulate the first indication of the access point in an Evolved Packet System (EPS) Session Management (ESM) Container and the aerial identifier, the operational information for the aerial vehicle, and the second indication of the controller for the aerial vehicle in a protocol configuration option (PCO) field.

49. The wireless device of claim 46, wherein the one or more processors are individually or collectively further operable to execute the code to cause the wireless device to:
identify an access point that provides aerial services, wherein the data session is released based at least in part on the access point, and a second data session is established based at least in part on the access point, wherein an exclusive communication path is established between the wireless device and a controller for the aerial vehicle via the access point.

50. The wireless device of claim 46, wherein the one or more processors are individually or collectively further operable to execute the code to cause the wireless device to:
establish a control plane connection with the public land mobile network based at least in part on the network identifier.

51. The wireless device of claim 50, wherein the one or more processors are individually or collectively further operable to execute the code to cause the wireless device to:
receive, in a control plane, a third message from the public land mobile network based at least in part on the request sent to the aerial function management system, the third message indicating positive authentication of the aerial vehicle and being received before the second message; and
transmit, in the control plane, a fourth message to the public land mobile network based at least in part on receiving the third message, the fourth message configured to request the establishment of the data session and being transmitted before the second message.

\* \* \* \* \*